United States Patent [19]

Nakatsuka

[11] Patent Number: 5,689,342
[45] Date of Patent: Nov. 18, 1997

[54] IMAGE PROCESSING METHOD AND APPARATUS WHICH ORDERS TEXT AREAS WHICH HAVE BEEN EXTRACTED FROM AN IMAGE

[75] Inventor: Tadanori Nakatsuka, Machida, Japan

[73] Assignee: Canon Kabushiki Kaisha, Tokyo, Japan

[21] Appl. No.: 558,184

[22] Filed: Nov. 15, 1995

[30] Foreign Application Priority Data

Nov. 17, 1994 [JP] Japan ................................. 6-283387
Nov. 17, 1994 [JP] Japan ................................. 6-283388
Dec. 21, 1994 [JP] Japan ................................. 6-318285
Jan. 31, 1995 [JP] Japan ................................. 7-013897

[51] Int. Cl.$^6$ ........................... H04N 1/387; G06K 9/00
[52] U.S. Cl. ........................ 358/296; 358/448; 358/462; 382/176
[58] Field of Search ................................. 358/296, 298, 358/406, 448, 462, 471, 474; 382/176–178, 180, 319

[56] References Cited

U.S. PATENT DOCUMENTS

| | | | |
|---|---|---|---|
| 3,805,237 | 4/1974 | Cobb et al. | 340/146.3 H |
| 5,048,096 | 9/1991 | Beato | 382/176 |
| 5,185,813 | 2/1993 | Tsujimoto | 382/176 |
| 5,278,920 | 1/1994 | Bernzott et al. | 382/176 |
| 5,588,072 | 12/1996 | Wang | 382/176 |

*Primary Examiner*—Eric Frahm
*Attorney, Agent, or Firm*—Fitzpatrick, Cella, Harper & Scinto

[57] ABSTRACT

An apparatus and method for automatically determining the order of reading a plurality of text areas, when an original constituted of the plurality of text areas is input as an image. For this purpose, the structure of text areas is analyzed hierarchically by dividing text areas into groups (plural text areas constituting one article) in consideration of the positional relation of the text areas with a separator, a figure and text areas, rather than simply ordering from top to bottom, so as to also cope with a complex layout such as a newspaper. Also, the connectivity of text areas is judged by making use of information, such as the text contents of the text areas or a connection mark in the text.

14 Claims, 43 Drawing Sheets

| FIG. 14A |
| FIG. 14B |

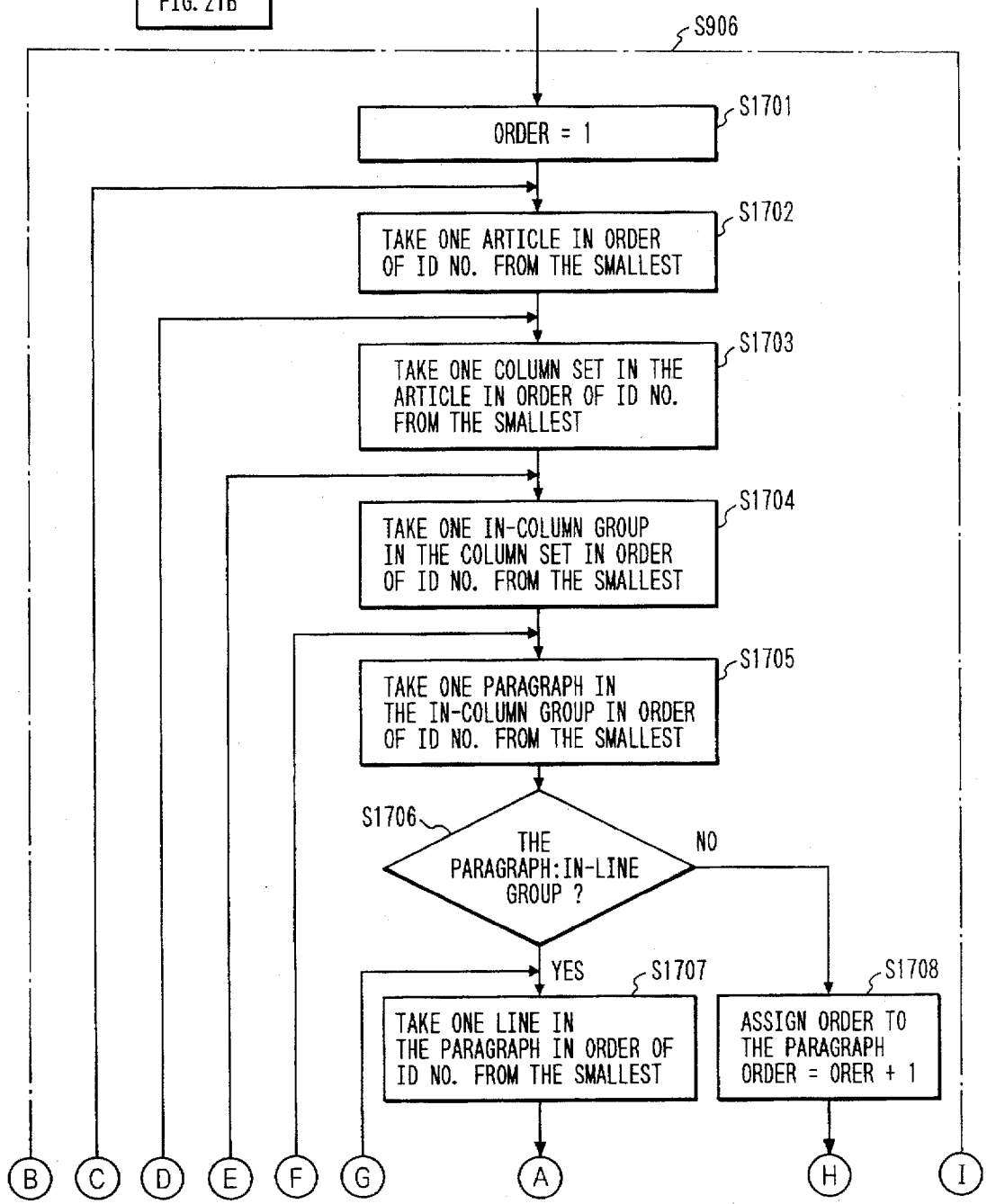

FIG. 28

| WORD | SYNONYM | SIMILARITY |
|---|---|---|
| TOMORROW | TOMORROW | 1.00 |
| | あした | 0.99 |
| | あす | 0.99 |
| | 明日 | 0.99 |
| | 明朝 | 0.45 |
| | 明晩 | 0.45 |
| HOTEL | HOTEL | 1.00 |
| | ホテル | 0.99 |
| | 旅館 | 0.90 |
| | 宿屋 | 0.72 |
| | 宿 | 0.72 |
| | 宿泊 | 0.20 |
| | 泊まる | 0.20 |
| | 外泊 | 0.12 |
| SEMICONDUCTOR | SEMICONDUCTOR | 1.00 |
| | 整流器 | 0.20 |
| | トランジスター | 0.20 |
| | 光電池 | 0.16 |
| DEMAND | DEMAND | 1.00 |
| | いりよう | 0.98 |
| | 供給 | 0.70 |
| INACTIVITY | INACTIVITY | 1.00 |
| | 低い | 0.60 |
| | さまよう | 0.35 |
| | LOW LEVEL | 0.06 |

FIG. 42
| SUBJECT | PREDICATE | RELATIVITY |
|---|---|---|
| 整備が | 進む | 1.25 |
|  | 遅れる | 1.25 |
|  | 整う | 1.32 |
| 選手が | 戦う | 1.00 |
|  | 走る | 1.11 |
|  | 飛ぶ | 1.09 |
|  | 集う | 1.09 |
|  | 休む | 1.10 |
FIG. 44
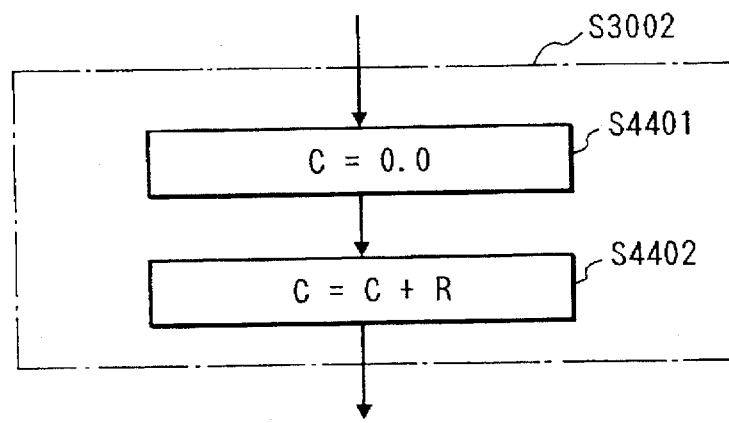
FIG. 45
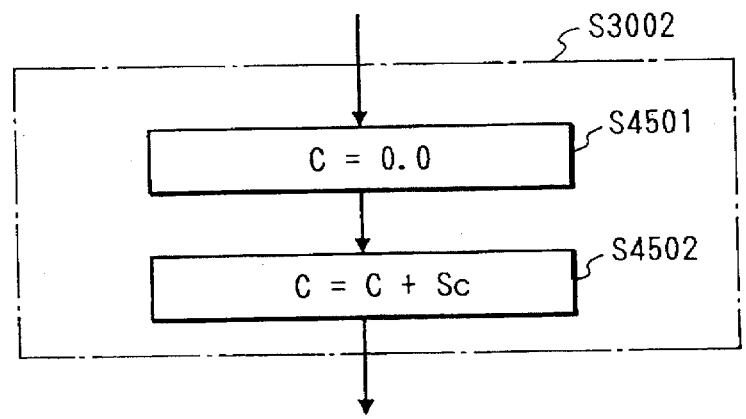

22 — 他の国については、経済改革の実態調査が遅れているため、調整が済み次第実行される予定だ。旧ソ連諸国は市場経済の移行に不可欠な統計や商法など経済関連法の整備が遅れており、IMF

25 — PHOTO

23 — の指導のもとで枠組みが作られる。金融財政面では財政赤字の縮小やインフレ抑制などの厳しい制限が課せられ、経済改革は西側経済の監視下に置かれることになる。

24 — IMF暫定委始まる 世界経済情勢などについて話し合う国際通貨基金の暫定委員会が二十七日午前、二日間の日程でワシントンで始まった。

IMAGE PROCESSING METHOD AND APPARATUS WHICH ORDERS TEXT AREAS WHICH HAVE BEEN EXTRACTED FROM AN IMAGE

BACKGROUND OF THE INVENTION

1. Field of the Invention

The present invention relates to an apparatus and method for discriminating the order of reading a plurality of text areas, especially those extracted from an input image in apparatuses such as an OCR, a copying machine, and a facsimile apparatus.

This invention is also directed to an apparatus and method for appending automatically the order of reading to a plurality of character areas contained in an input image.

2. Related Background Art

Conventionally, the order of reading was appended manually by the operator. Also, conventionally, the order of reading could be automatically appended only in a sequential manner from top to bottom, for example, according to the disposition of character areas.

With such a method, when an original of complex layout was input, the order might be inappropriately appended, or could not be appended in some cases.

SUMMARY OF THE INVENTION

According to the present invention, it is possible to correctly order a plurality of text areas present in an image without the intervention of the operator by inputting an image, extracting text areas from said input image, dividing the text areas into groups, and determining the ordering of the text areas within the groups.

According to the present invention, the cut line of an article can be correctly detected by taking into consideration the positional relation with a separator image to divide each text area into groups.

According to the present invention, the cut line of an article can be correctly detected by taking into consideration the positional relation with a figure image to divide each text area into groups.

According to the present invention, the correct ordering can be made, because the text structure is grasped by classifying extracted text areas into layers and then the ordering is performed.

According to the present invention, the ordering in consideration of text contents can be made by determining the text areas being connected from the similarity of extracted text areas.

According to the present invention, the ordering with connectivity information can be made by discriminating the connectivity information contained in extracted text areas, and determining the text areas being connected in accordance with the discriminated connectivity information.

According to the present invention, because the order of reading is determined, the result of character recognition directly becomes a text in the correct order, requiring no subsequent editing.

BRIEF DESCRIPTION OF THE DRAWINGS

FIG. 28 exemplifies a synonym dictionary.

FIG. 29 exemplifies an original.

FIG. 42 exemplifies a subject-predicate relativity dictionary.

FIG. 43 is an original example for explaining the process of FIG. 44.

FIG. 44 is a flowchart for obtaining the continuity C from the number of same words.

FIG. 45 is a flowchart for obtaining the continuity C from the expression of text.

DESCRIPTION OF THE PREFERRED EMBODIMENTS

Figure 1:
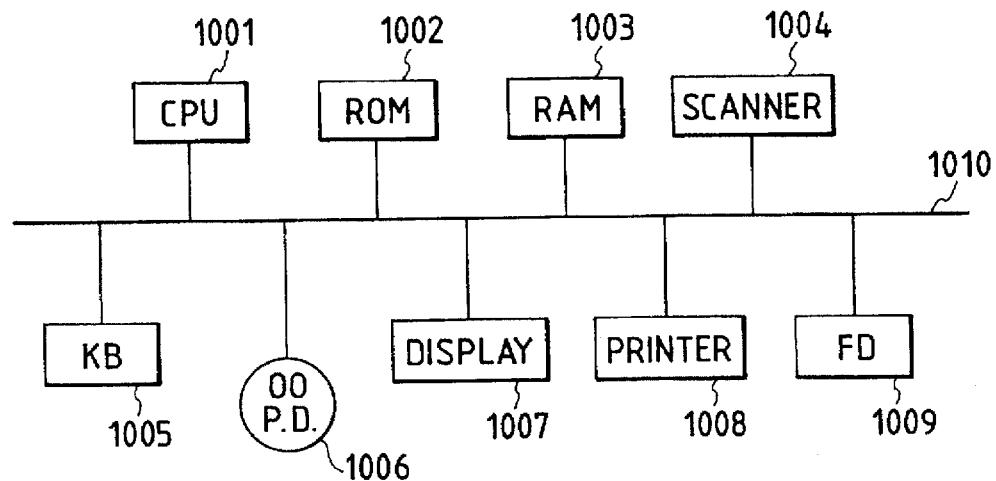
FIG. 1 is a configurational block diagram of an apparatus according to the present invention.

FIG. 1 is a block diagram showing the configuration of an apparatus according to the present invention. 1001 is a CPU for executing the processing of the whole apparatus, to control the judgement and operation in accordance with a control program stored in a ROM 1002. 1002 is the ROM which stores a control program with the flowcharts to be explained in this example, or data such as parameters which are predefined for use in the operation. 1003 is a RAM having a working memory area for memorizing data being processed in the CPU 1001. 1004 is a scanner for optically reading an original image. Read image data can be memorized in the RAM 1003. 1005 is a keyboard from which various kinds of code or an operator's command can be entered. 1006 is a pointing device for pointing to a desired position on the display screen of a display unit 1007, or entering a command for selection or canceling an operation by clicking a button. 1007 is the display unit, which is a CRT or a liquid crystal display. 1008 is a printer, e.g., an LBP or an ink jet type printer, 1009 is an external storage device, e.g., an FD unit, and 1010 is a data bus for transmission and reception of data between components.

Figure 2:
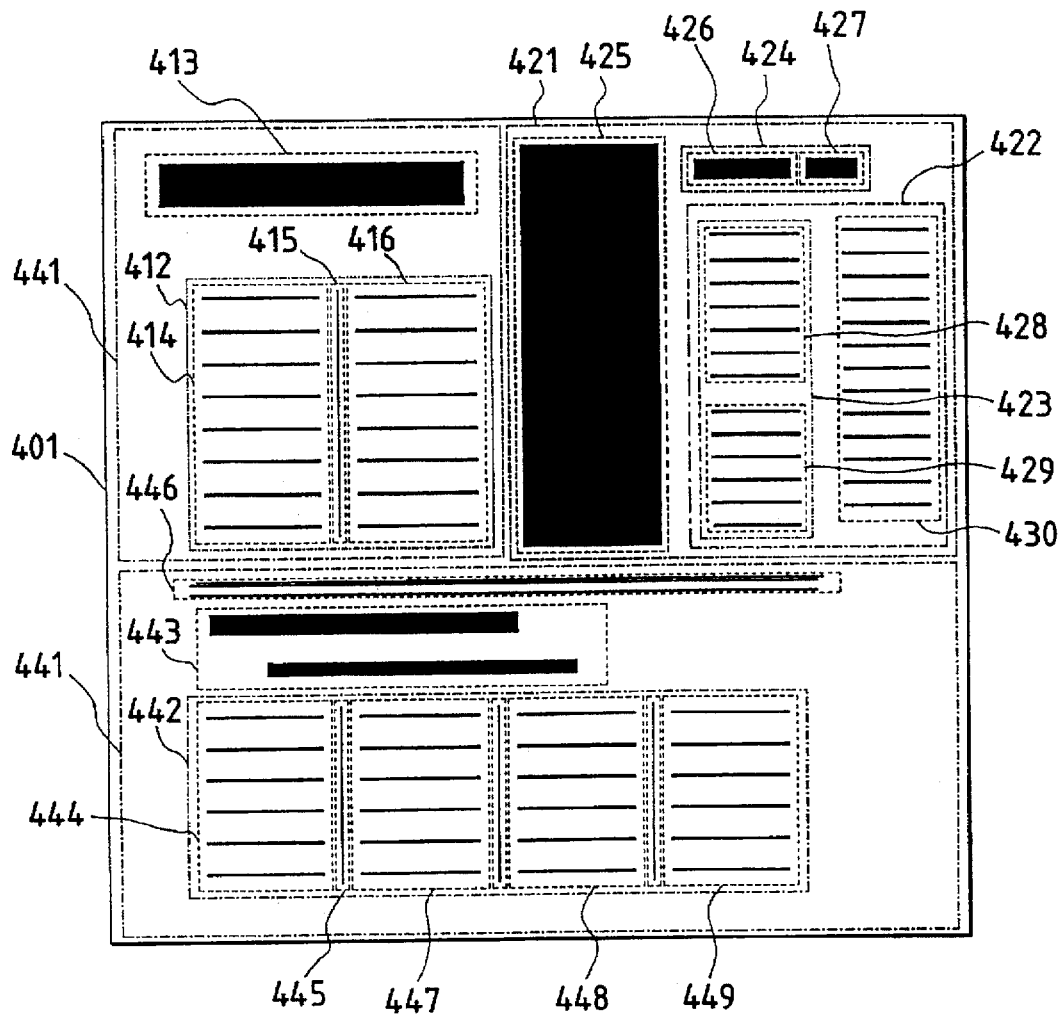
FIG. 2 is an illustration of an input document.

The present invention realizes that when image data (e.g., data as shown in FIG. 2) input from the scanner 1004 or through the communication line is subjected to character recognition and conversion into text data, the order of connecting each group of character strings (i.e., the order appended by the person in reading a document) with text data is automatically appended through the internal processing of the apparatus, without the intervention of a manual operation by the user, even if the layout of a document expressed by image data is complex as shown in FIG. 2. (However, FIG. 2 shows a document image divided into character string blocks as indicated by the dot line, but an input image does not contain this dot line).

That is, when the person gets such a document as shown in FIG. 2, he or she will read the document in the order of block 413, block 414, block 416, block 424, block 428, block 429, block 430, block 443, block 445, block 447, block 448, and block 449, with characters within each block in sequence from top to bottom. The present invention automatically makes the ordering of such blocks.

[Embodiment 1]

Figure 3:
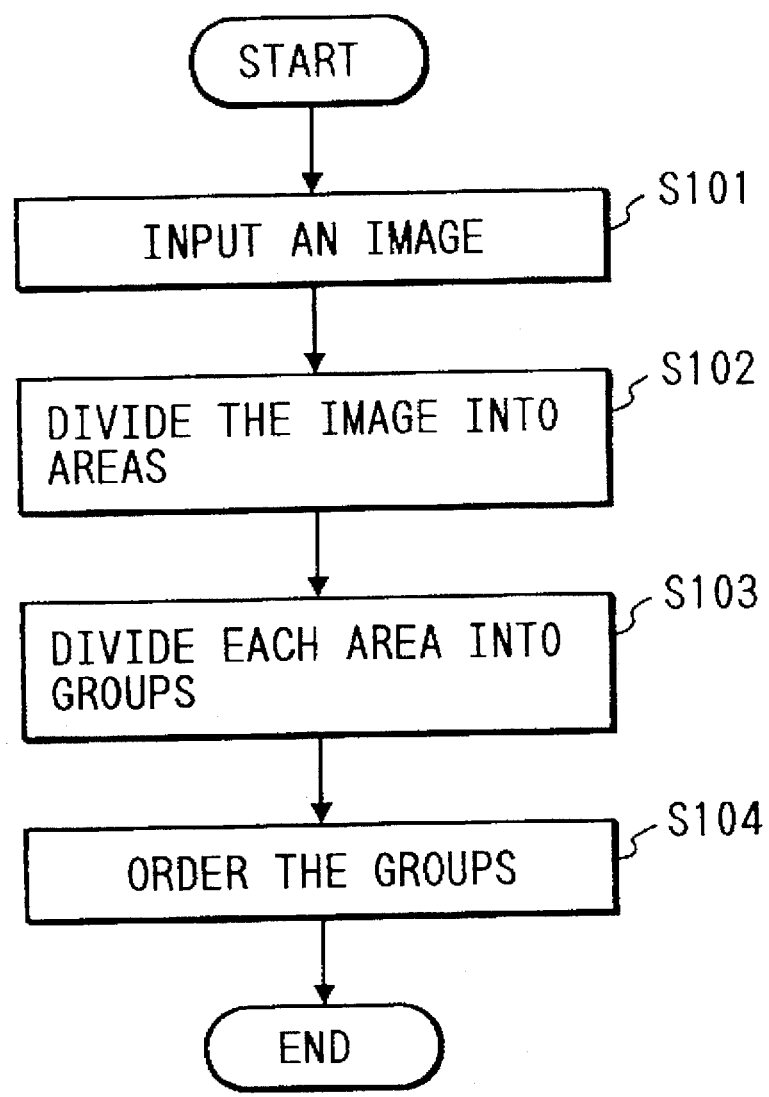
FIG. 3 is a flowchart of an ordering process in embodiment 1.

FIG. 3 is a flowchart of an ordering process from input image in this embodiment.

In the same figure,
(1) Step S101

An image is input from scanner 1004 or via the communication line (not shown).

(2) Step S102

The image input at step S101 is divided into areas to extract areas such as character, separator and figure areas from the image. An area division method at this step is described in for example, U.S. patent application Ser. No. 07/118,767, filed on Sep. 10, 1993. All the information of divided areas herein is stored in RAM 1003.

(3) Step S103

Figure 4:
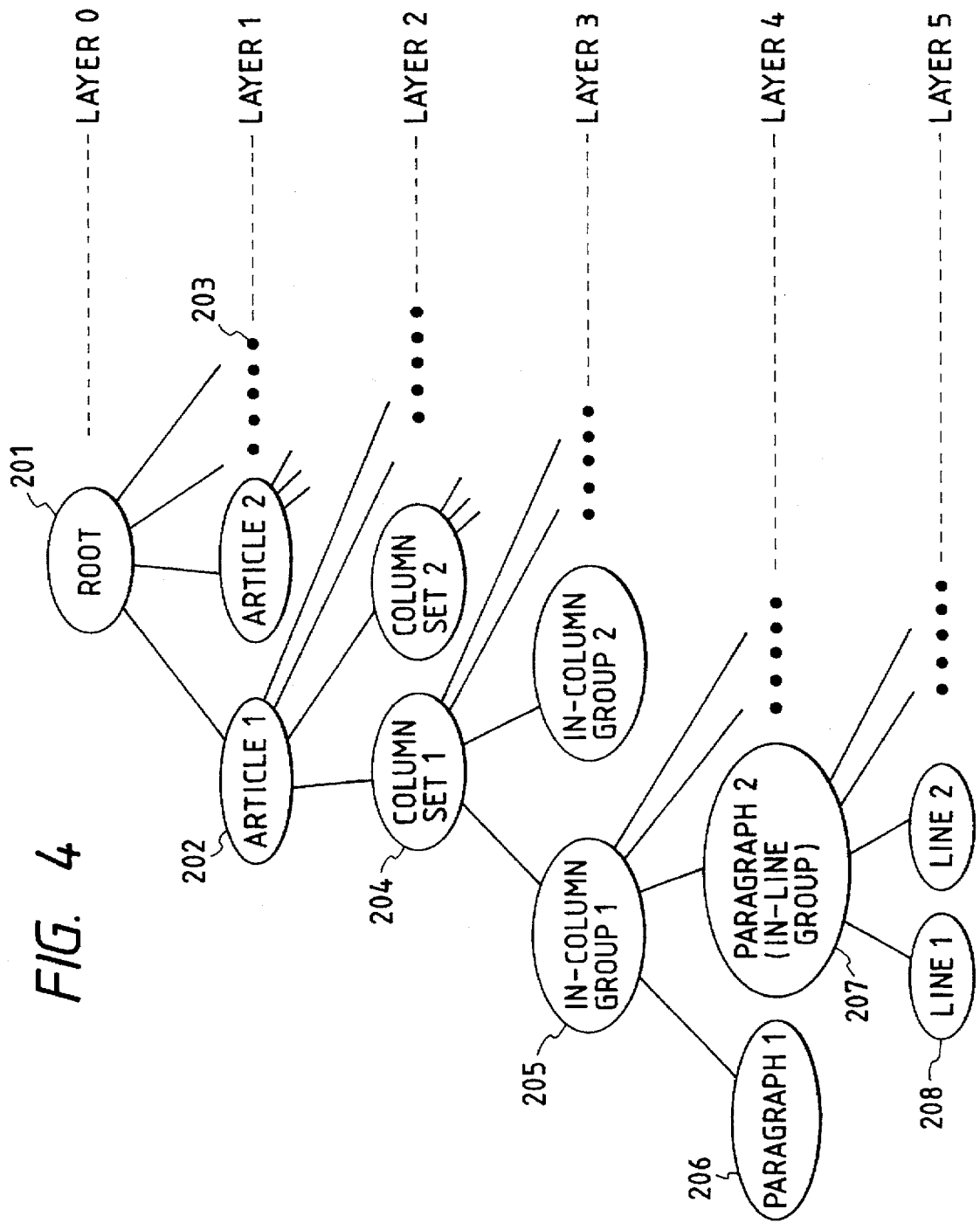
FIG. 4 is an explanatory view of character blocks contained in a document image divided in six layers.

Each area such as character, separator and figure areas that is extracted from the image is divided into hierarchical groups. FIG. 4 is an explanatory view of groups produced at step S103. This figure shows that areas of character groups extracted from the image are divided into six layers according to a text structure, consisting of an entire image (ROOT), an article, a column set, an in-column group, a paragraph (in-line group), and a line. 201 is a layer 0, or an entire image. 202 is an article 1. 203 indicates that some articles further exist in the same layer. The number of groups within the layer is only one for layer 0, one or more for layers 1 to 4, and zero or more for layer 5. 204 is a column set 1, belonging to article 1 (202). 205 is an in-column group belonging to column set 1 (204). 206 is a paragraph 1 belonging to in-column group 1 (205). The paragraph 1 has no group layer 5 consisting of lines. 207 is a paragraph, or an in-line group consisting of lines 1, 2, belonging to in-column group 1 (205). 208 is a line 1 belonging to paragraph 2 (207).

Figure 5:
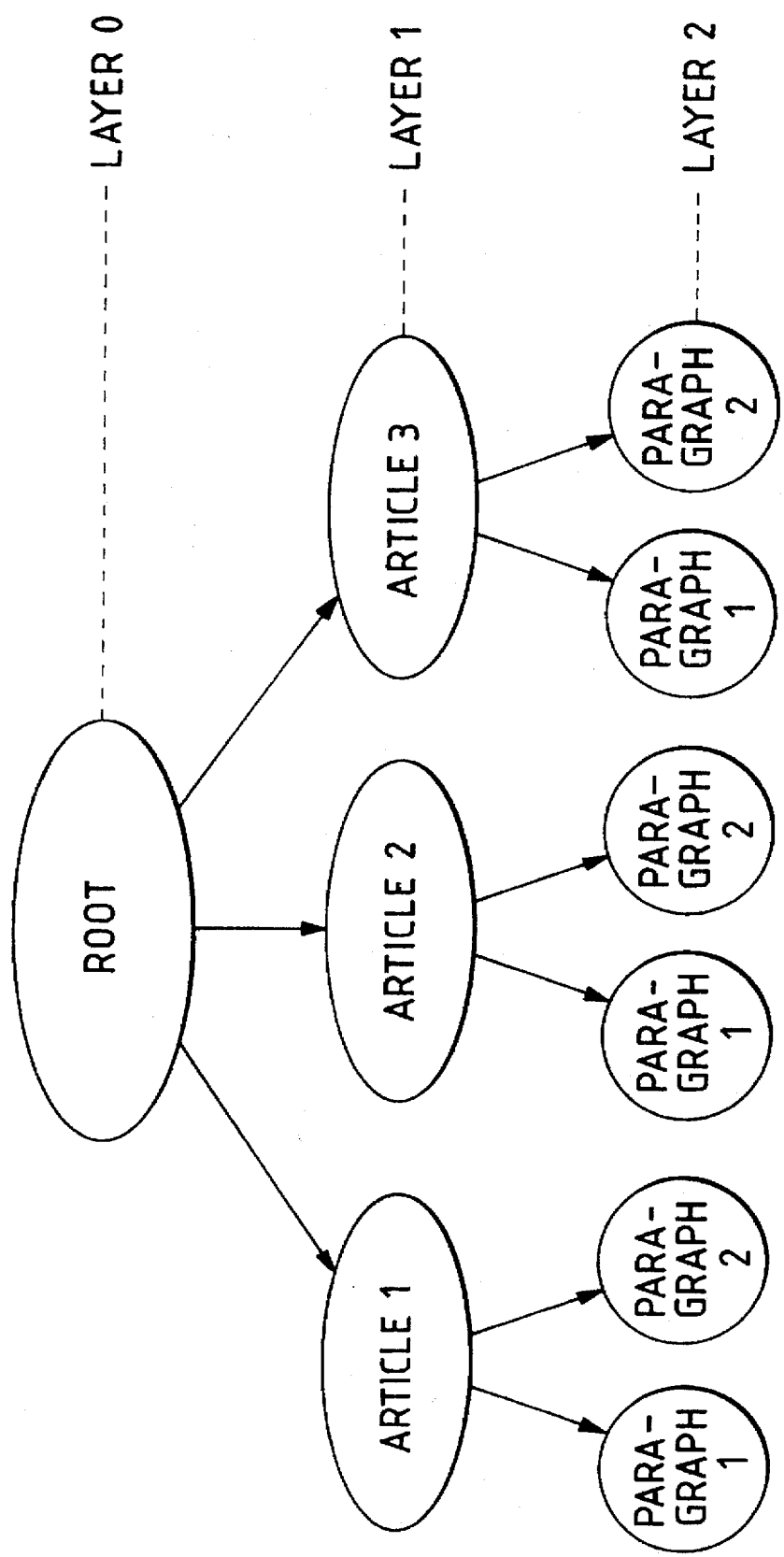
FIG. 5 is an explanatory view of character blocks divided in three layers.

The method of dividing the image into layers is not necessarily limited to six layers as shown in FIG. 4, but the image may be divided into three layers with areas divided into groups by their contents, as shown in FIG. 5. The groups divided by their contents in FIG. 5 indicate the articles of layer 1. For example, an input document is divided into groups such that the article relating to politics is an article 1, the editorial is an article 2, and the column is an article 3. Also, the paragraph corresponding to layer 2 in FIG. 5 is all areas obtained by area division processing at step S103 of FIG. 3.

The configuration of the document image in FIG. 2 will be explained. 401 is a document image of vertical writing, which is input from the scanner. 413, 443 are extracted character areas, especially, a headline area and an article, an in-column group, or a paragraph. 426, 427 are extracted character areas, especially, a headline area and a line. 414, 416, 430, 444, 447 to 449 are extracted character areas and an in-column group. 428, 429 are extracted character areas and a paragraph. 415, 445, 446 are extracted separator areas. 425 is an extracted figure area. 411, 421, 441 are article areas divided by separator 446 and figure area 425. 412, 422, 442 are paragraphs. 423 is an in-column group.

Figure 6:
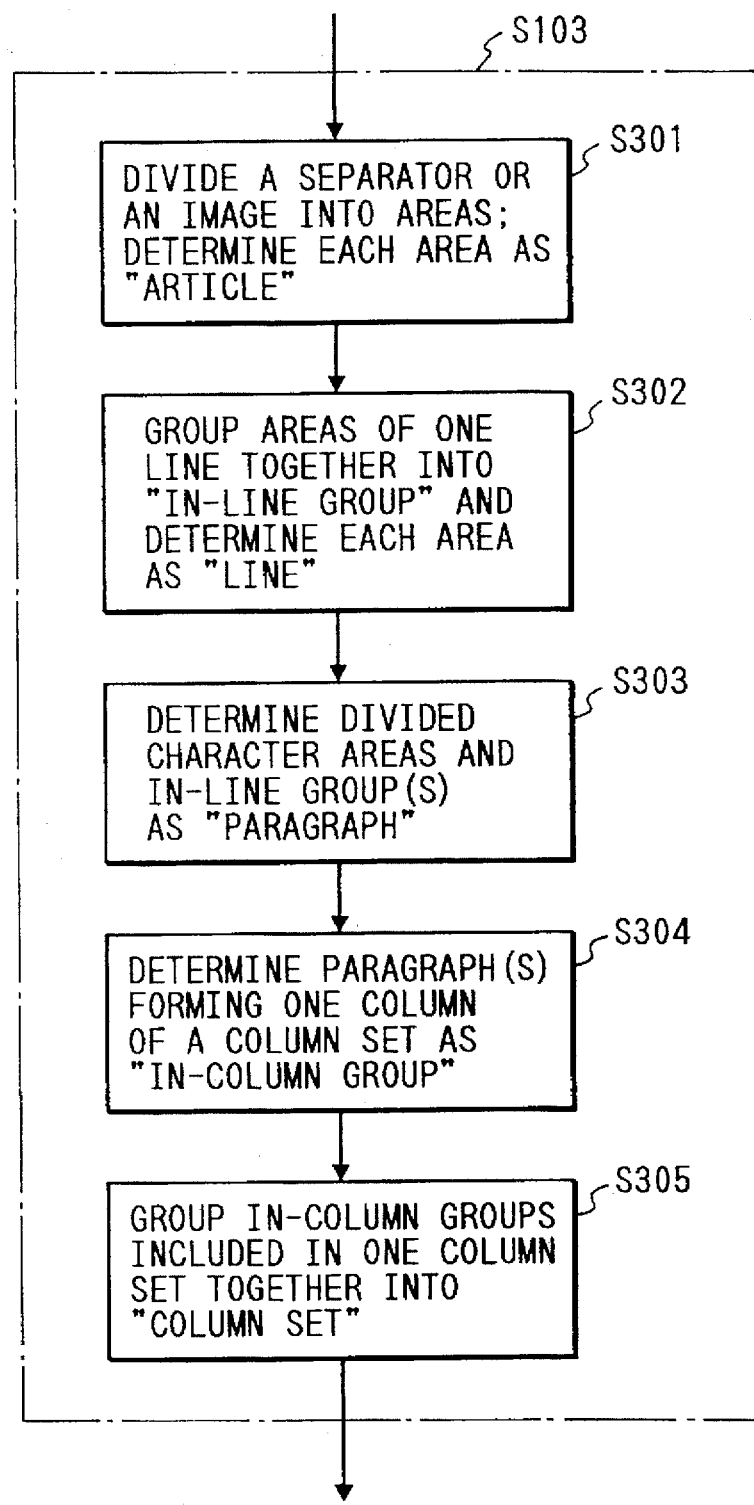
FIG. 6 is a flowchart of a grouping process for character blocks in the embodiment 1.

Step S103 is further described according to a flowchart of FIG. 6. While the flowchart of FIG. 6 is concerned with an instance of grouping in the order of an article, a line and an in-line group, a paragraph, and an in-column group, it should be noted that the order of grouping is not necessarily limited to the above order.

Step S301

An input image is divided into one or more areas by a separator or figure, each area being judged as a cluster of articles. The detail processing of this step S301 is particularly described according to a flowchart of FIG. 7. First, at step S501, one separator or figure extracted by area division at S102 of FIG. 3 is taken out. Then, a comparison is made between the height and width of a circumscribing rectangle of the separator or figure taken out. If the width is larger, the width of entire image is set to Lall, and the width of the separator or the figure is set to Lsep at step S503. Also, if the height is larger, the height of entire image is set to Lall, and the height of separator or figure is set to Lsep at step S512. At step S504, a check is performed to see whether the following inequality holds, $$Lsep \div Lall \geq \alpha \tag{1}$$

where α is a threshold, which is equal to 0.4 herein as predefined, but may be varied according to the width or height or area of the image. The variation is made by, for example, having the threshold inversely proportional to a reference value. The separator or figure satisfying expression (1) is stored in an array LONGSEP at step S505. If not satisfied, the program proceeds to step S506. In the example of FIG. 2, separators 415, 445 do not satisfy the expression (1). Since separator 446 and figure area 425 satisfy the expression (1), they are stored in the array LONGSEP.

At step S506, a check is performed to see whether or not all are separators or figures are completed. If all completed, the program proceeds to step S507. Also, if any separator or figure is uncompleted, the program returns to step S501 to continue the processing.

At step S507, separators or figures stored in array LONGSEP are arranged in the order of width or height from the largest through comparison between width and height.

At step S508, one separator or figure stored in array LONGSEP is taken out in the order of width or height from the longest. At step S509, an area is divided into two sections using the separator or figure taken out. In FIG. 2, an image 401 is first divided into two sections, left and right, by the longest separator 446. A left section of divided areas is an article 441.

Then, at step S510, a check is performed to see whether or not all separators or figures stored in array LONGSEP are completed. If all are completed, the program proceeds to step S511. In the example of FIG. 2, since a figure area 425 is uncompleted, the program returns to step S508. A right area already divided by the figure area 425 is divided vertically. Thus, articles 411, 421 result.

Since all separators and figures stored in array LONGSEP have been completed, the program proceeds to step S511.

At step S511, the frame or table area is also separated as a different area. For example, characters in the newspaper column or comment or data in the table do not mix with other texts. Hence, they need to be dealt with as different articles, and separated as different areas. Then, the program proceeds to step S513.

At step S513, ID numbers are assigned to divided areas as articles, respectively. In FIG. 2, supposing that article 411 is article 1, article 421 is article 2, and article 441 is article 3, the articles 1, 2, 3 in layer 1 can be divided from original image 401 in layer 0.

Figure 8:
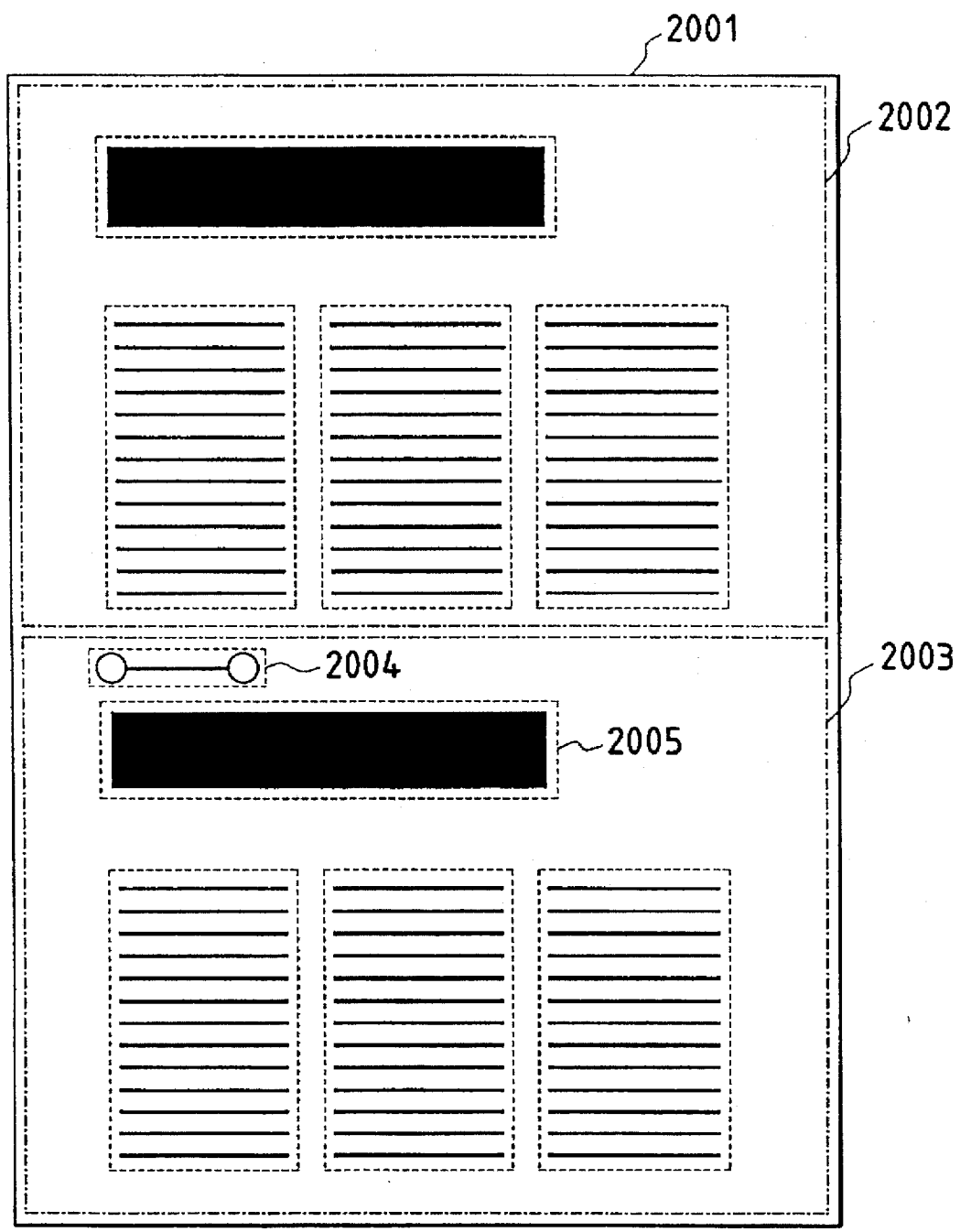
FIG. 8 is an illustration of an image containing a short separator.
Figure 9:
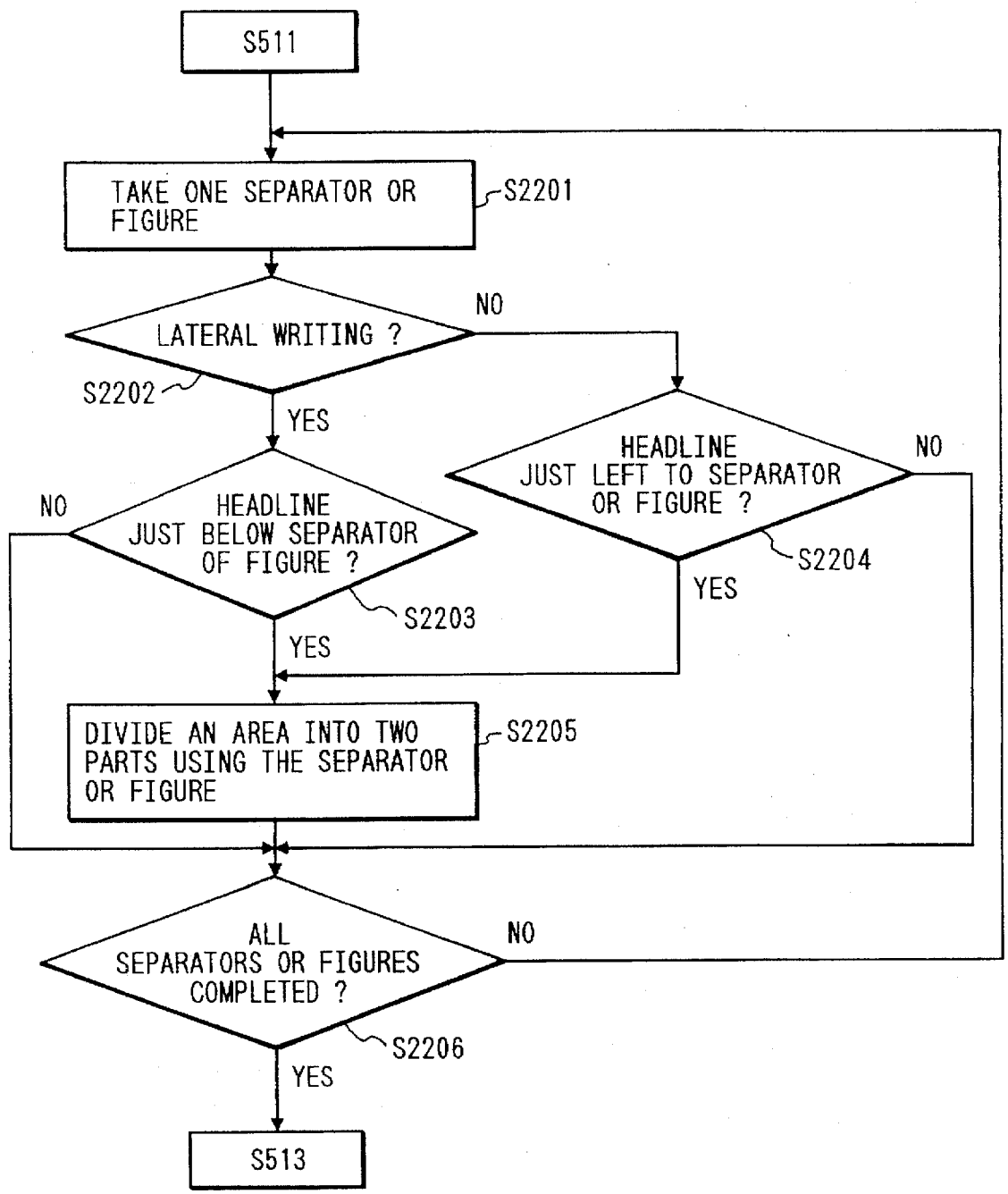
FIG. 9 is a flowchart of an area dividing process with a short separator.

Also, by adding a process of FIG. 9 between S511 and S513, using a short separator or figure as indicated at 2004 in FIG. 8, an area can be also divided into two parts by a combination with the headline. In FIG. 8, 2001 is an entire image, 2002, 2003 are articles, 2004 is a separator, and 2005 is a character area, especially a headline area.

Referring to a flowchart of FIG. 9, this process is described below. At step S2201, one separator or figure is taken out. At step S2202, a check is performed to see whether or not the entire image is lateral writing in a set direction. The way of checking is the same as previously described. If it is lateral writing, the program proceeds to step S2203. If it is vertical writing, the program proceeds to step S2204. In the example of FIG. 8, because of lateral writing, the program proceeds to step S2203. At step S2203, a check is performed to see whether or not the headline exists just below the separator or figure. If the headline exists, the program proceeds to step S2205. If not, the program proceeds to step S2206. In the example of FIG. 8, because the headline exists Just below the separator 2004, the program proceeds to step S2205. Similarly, at step S2204, a check is performed to see whether or not the headline exists just left of the separator or figure. If the headline exists, the program proceeds to step S2205. If not, the program proceeds to step S2206. At step S2205, an area is divided into two parts using the separator or figure taken out. In the example of FIG. 8, the entire area was divided into two parts to create the articles 2002, 2003. At step S2206, a check is performed to see whether or not all separators and figures are completed. If all are completed, step S2102 is terminated. If any separator or figure is uncompleted, the program returns to step S2201 to continue the processing. By this processing, the ordering can be made with high precision even with the short separator.

Step S302

Figure 10:
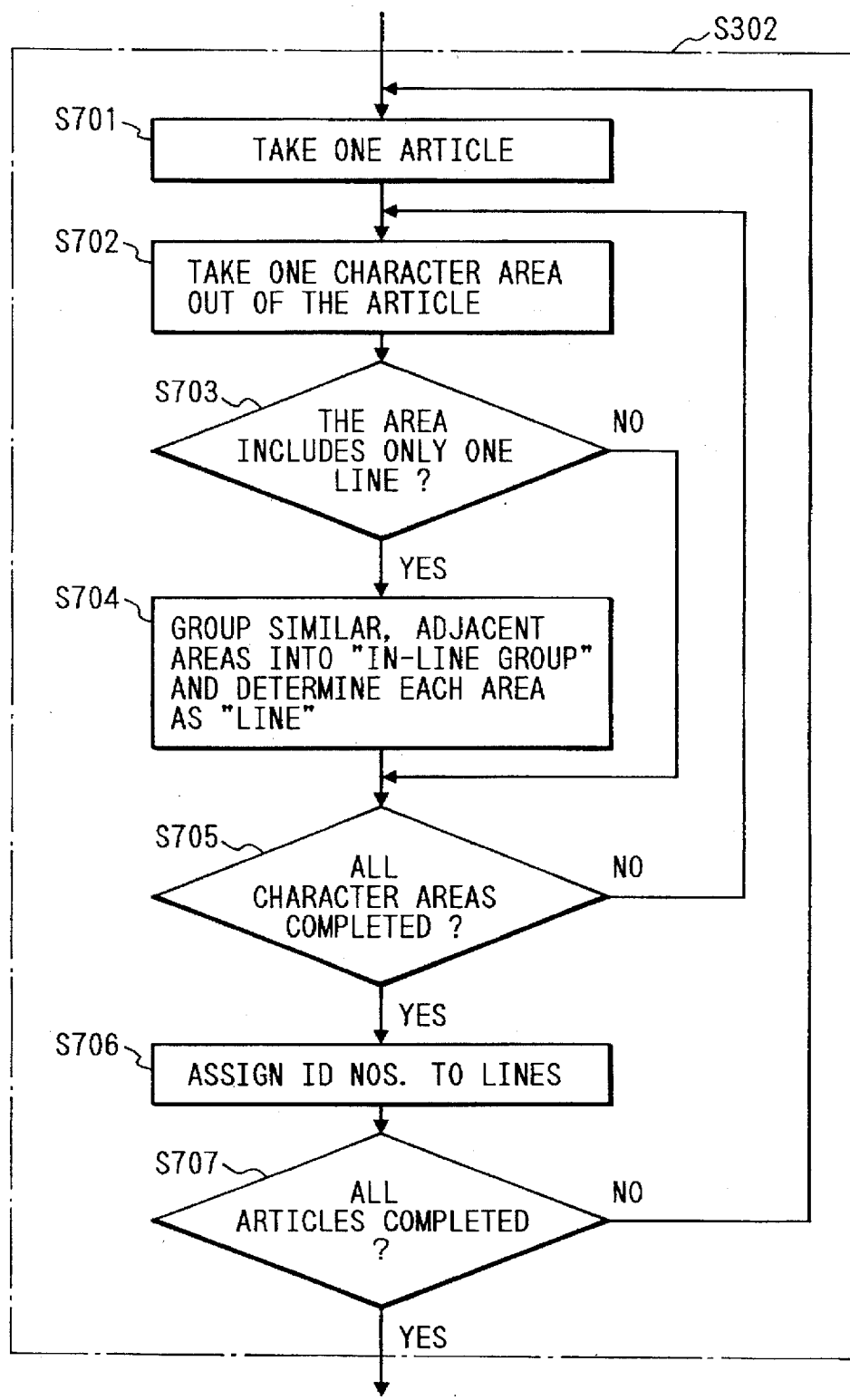
FIG. 10 is a flowchart of processing in detail at step S302.

When areas of only one line in the character area taken by area division are provided, they are grouped together into "in-line group", each area being determined as a "line". Referring to FIG. 2 and a flowchart of FIG. 10, this process will be described below in detail. First, at step S701, one article divided at step S301 is taken out. In the example of FIG. 2, an article 421 with article ID2 is adopted for the purpose of explanation.

Then, at step S702, area information of one character area in the article is taken out of the RAM 1003. At step S703, a check is performed to see whether or not the character area includes only one line by obtaining the histogram of the area taken out. If the character area includes only one line, the program proceeds to step S704. If the character area does not include only one line, the program proceeds to step S705.

Figure 11:
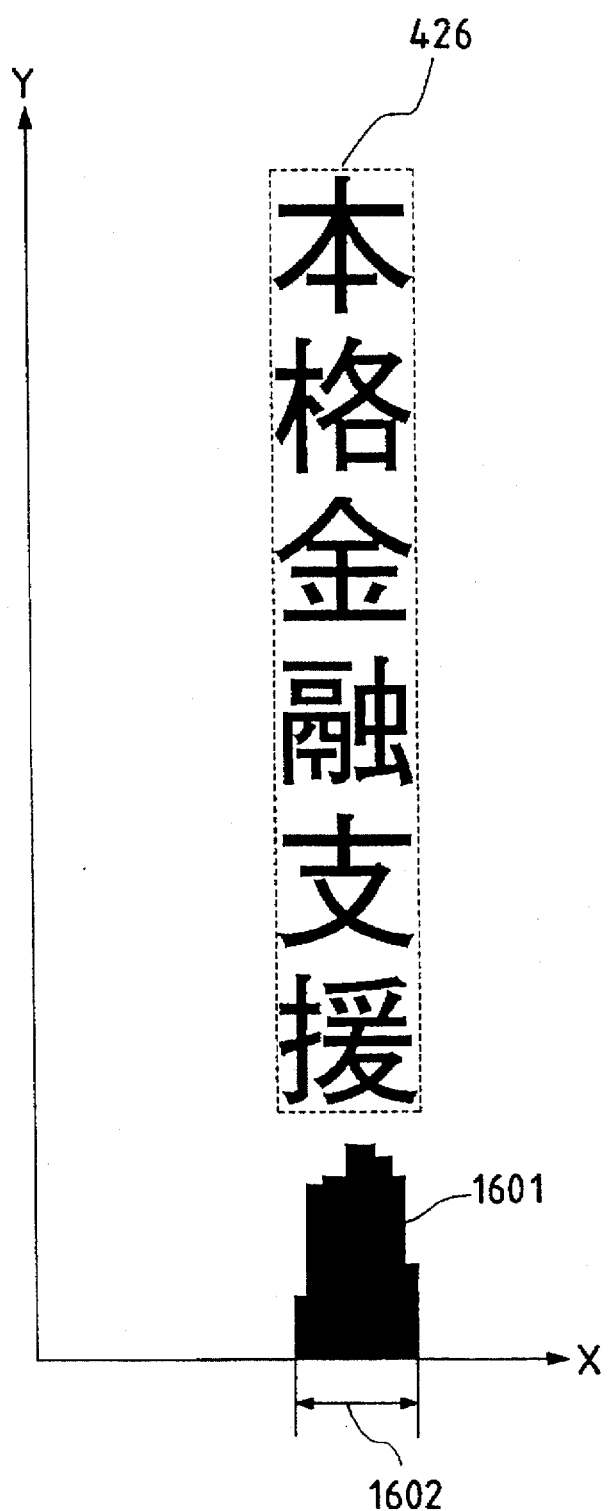
FIG. 11 is a view illustrating a row extracting method.
Figure 16:
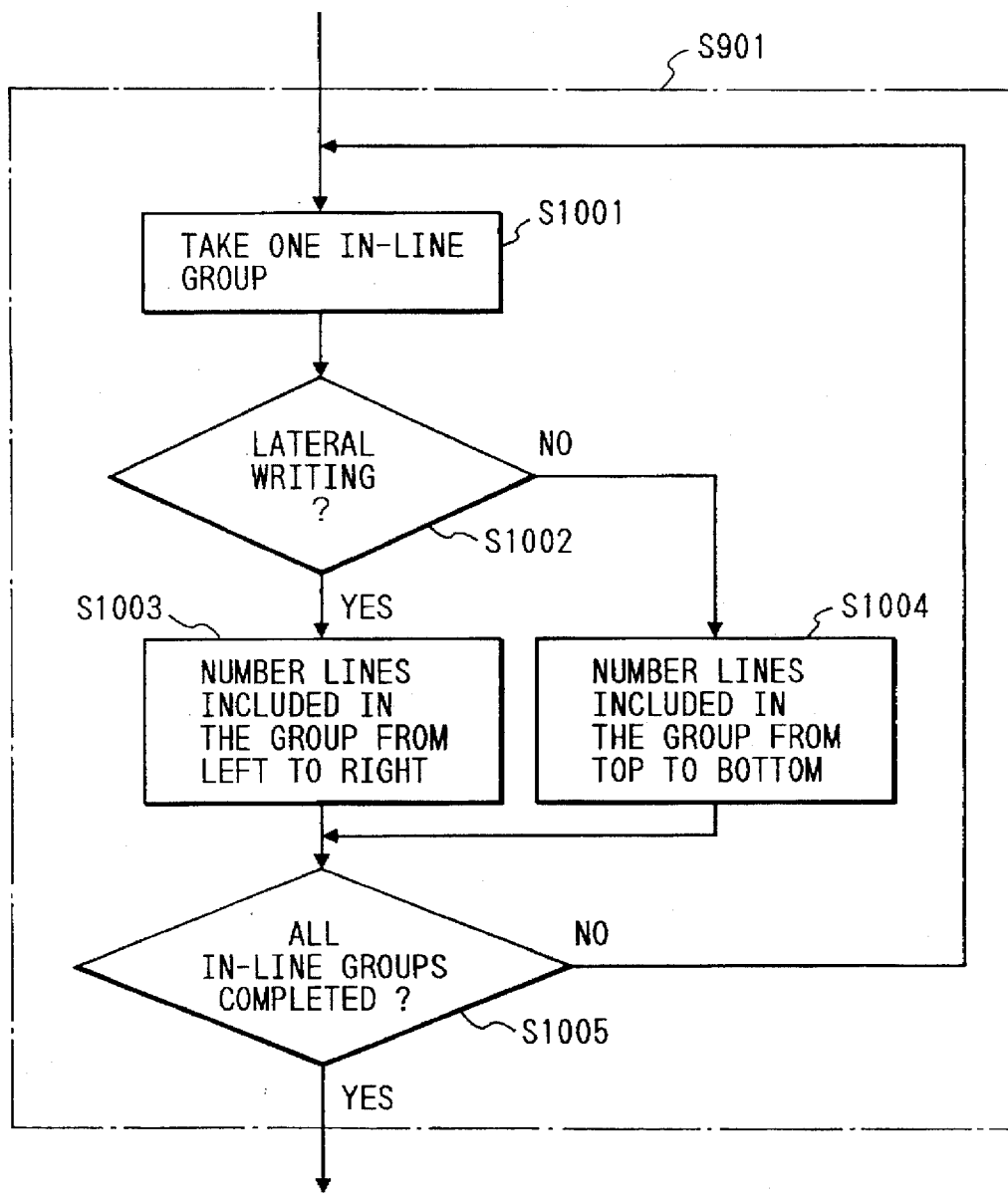
FIG. 16 is a flowchart of processing in detail at step S901.

A detailed way of investigating how many lines the character area taken out includes is shown below in connection with FIG. 16. It is already known from the result of area division at step S102 that the character area 426 is vertical writing in the set direction. In the vertical writing, the histogram for black pixels of the character area 426 in vertical direction is obtained. In the lateral writing, the histogram in lateral direction is similarly obtained. In an example of FIG. 11, the calculation of the histogram for the character area 426 ("Fullscale Financial Support") in the vertical direction results in a histogram 1601. The number of sites with consecutive black pixels is counted by viewing the histogram 1601 in the lateral direction, resulting in the number of lines to be obtained. In the example of histogram 1601, since the number of sites where black pixels consecutively exist is one, the number of lines in the character area 426 is one. Since one line is only present, the program proceeds to step S704.

At step S704, character areas of only one line adjacent in the same direction as the set direction of the character area, without a separator or figure therebetween, of substantially the same character size, with the same set direction, and with no large gap, are grouped together into "in-line group", each area being determined as a "line". In the example of character area 426 in the article 421 of FIG. 4, the character area 426 is determined to be only one line at step S703, and because of vertical writing, a character area of only one line in the vertical direction is searched. It can be observed that the character area 427 is arranged along with the character area 426 in the vertical direction, and consists of only one line. Also, it is apparent that there is no separator or figure between the character area 426 and the character area 427. Particularly, since two character areas are arranged in the vertical direction, it is examined whether or not a part or a whole of a separator or a figure is contained in a parallelogram constituted of an upper area in an arrangement, in this case, the bottom of character area 426, and a lower area in an arrangement, in this case, the top of character area 427. In the lateral disposition, it is similarly examined whether or not any separator or figure is contained in a parallelogram constituted of the right side and the left side. Then, the size of character is investigated. In connection with the example of FIG. 11, the width 1602 of histogram 1601 is simply made the size of a character. That is, the substantial character width is made the size of a character. When there are some areas having consecutive black pixels in the histogram obtained, i.e., plural lines in the character area, the average of their widths is made the size of a character. By comparing the character size of character area 426 with that of character area 427, the larger one is set to Cbig, and the smaller one is set to Csmall. Then, if the following inequality is satisfied, $$Csmall \div Cbig \geq \alpha 2 \qquad (2)$$

the character size is supposed to be equal, where $\alpha 2$ is a threshold, or 0.9 herein. Since the above expression (2) is satisfied for the character area 426 and the character area 427, the character size is determined to be the same. Then, the set direction is investigated.

As previously described, since the character area 426 is vertical writing, and the character area 427 is vertical writing, it is determined that the set directions are both equal.

Then, the gap is investigated to be not large. Supposing that the gap between character area 426 and character area 427 is G, and the smaller character size is Csmall, if the following inequality is satisfied, $$G \div Csmall \leq \alpha 3 \qquad (3)$$

the gap between the character area 426 and the character area 427 is determined to be not large, where $\alpha 3$ is a threshold, or 10 herein. Accordingly, the character area 426 and the character area 427 are grouped together into an in-line group 424. Also, the character area 426 and the character area 427 are determined to be lines.

At step S705, it is determined whether or not all character areas are completed. If all completed, the program proceeds to step S706. If any character area is uncompleted, the program returns to step S706 to determine the in-line group. Since the character areas 428, 429, 430 consist of plural lines, they are not the line. At step S706, ID nos. are assigned to lines, respectively.

At step S707, it is determined that all articles are completed. If all are completed, step S302 is ended, and the program proceeds to step S303. If any article is uncompleted, the program returns to step S701 to determine the in-line group.

Step S303

Herein, the results of area division at step S102 are directly made paragraphs, to which ID nos. are assigned. However, if there is any in-line group created at step S302, it is similarly made a paragraph, to which an ID no. is assigned. The area that becomes the line at step S302 is not made paragraph. In the example of FIG. 2, the in-line group 424 created from the character area 426 and the character area 427 is also dealt with as a paragraph.

Step S304

Herein, the paragraph that becomes one column in the column set is made an "in-column group" in layer 3. In the example of FIG. 2, paragraph 413, paragraph 414, paragraph 416, paragraph (in-line group) 424, paragraph 430, paragraph 443, and paragraph 444 each form the in-column group from only one area. Both paragraph 428 and paragraph 429 belong to the same in-column group.

Figure 12:
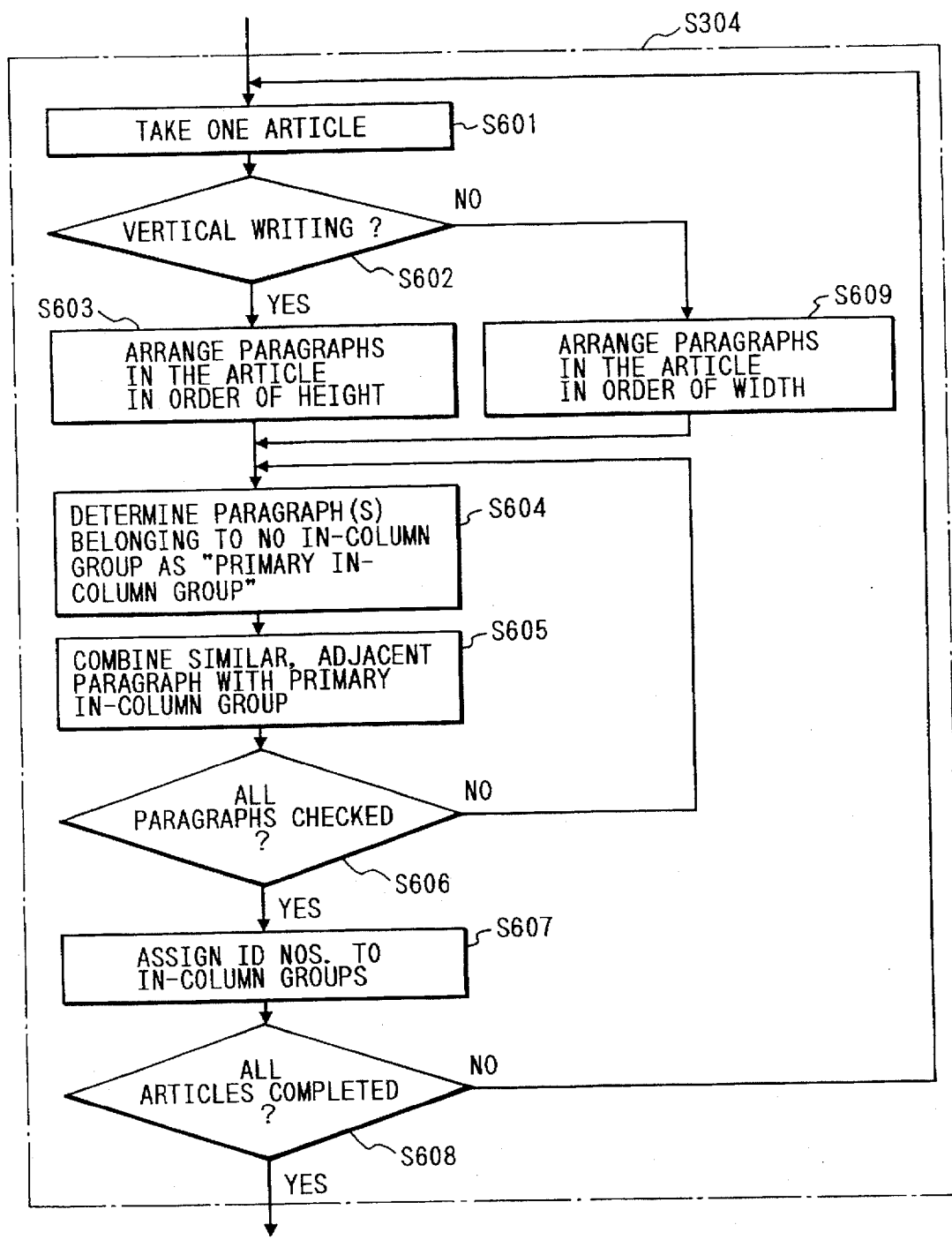
FIG. 12 is a flowchart of processing in detail at step S304.

Referring to a flowchart of FIG. 12, the article 2 will be described. At step S601, one article is taken out. Herein, an instance of taking out the article 2 is presented. At step S602, the set direction of an article is determined. In the instance of article 2 of FIG. 2, it is found that the set direction of article 2 is vertical writing, since all character areas belonging to article 2 are already known to be vertical writing from the result of area division at step S102. If character areas of vertical writing and lateral writing are mixed, the area is calculated and the set direction is defined as one with a larger area. Or the set direction is defined as one with the larger number of areas. Because of the vertical writing, the program proceeds to step S603. In the lateral writing, the program proceeds to step S609.

At step S603, paragraphs in the article are arranged in the order of height. At step S604, one paragraph belonging to no in-column group is taken out in the order of arrangement, and determined as a "primary in-column group". At step S605, other paragraphs belonging to no in-column group are taken out in the order of arrangement and defined as comparison paragraphs, and their comparisons with the primary in-column group are made, wherein if any comparison paragraph has substantially the same character size, and no separator in a direction opposite to the set direction of article or no paragraph belonging to other in-column group, with some areas overlapped in the direction opposite to the set direction of article, and with no larger gap therebetween, the comparison paragraph is considered belonging to the same in-column group as the primary in-column group, and combined with the primary in-column group. The same comparison is repeated for other paragraphs belonging to no in-column group.

In the instance of article 2 of FIG. 2, the paragraph 424 (in-line group) first becomes the primary in-column group, but since the character size is different from that of other paragraphs, it forms singly the in-column group. Then, the paragraph 428 becomes the primary paragraph. The expression (2) is satisfied with respect to the comparison paragraph 429, so that the character size is determined to be equal. Also, there is neither a separator in the direction opposite to the set direction of an article (i.e., lateral direction) nor a paragraph belonging to other in-column group. The way of determination is the same as described at step S704. Then, the overlapping between the primary in-column group and the comparison paragraph in the direction opposite to the set direction of an article (i.e., lateral direction) is determined. Supposing that the smaller height between a primary paragraph and a comparison paragraph (or smaller width in lateral writing) is defined as Hsmall, and the length of overlap in the lateral direction is defined as K, if the following inequality is satisfied, $$K \div Hsmall \geq \alpha 4 \qquad (4)$$

the overlap is determined, where $\alpha 4$ is a threshold or 0.8 herein. The primary in-column group 428 and the comparison paragraph 429 can satisfy an expression (4). Then, the gap is investigated. Since the gap between the primary in-column group 428 and the comparison paragraph 429 satisfies the expression (3), the gap is determined to be not large. Hence, the comparison paragraph 429 is considered to belong to the same in-column group as the primary in-column group 428, and combined with the primary in-column group 428 to have one primary in-column group.

Similarly, a paragraph 430 is investigated as a comparison paragraph. Since the area does not satisfy the expression (4) in the lateral direction, it is not the in-column group. Hence, the paragraph 428 and the paragraph 429 are only the in-column paragraph, both forming an in-column group 423 in layer 3.

At step S606, it is investigated whether or not all paragraphs belong to the in-column group. In the instance of article 2 in FIG. 2, since a paragraph 430 remains, the program proceeds to step S604. The paragraph 430 becomes the primary in-column group, but since at step S605, there is no comparison paragraph, the paragraph 430 singly forms the in-column group. Since all paragraphs have belonged to the in-column group, the program proceeds to step S607.

At step S607, ID nos. are assigned to the in-column groups, respectively. The paragraph 424 is made in-column group 1, the in-column group 423 is made in-column group 2, and the paragraph 430 is made in-column group 3.

At step S608, a check is performed to see whether or not all articles are completed. If all articles are completed, step S304 is ended, and the program proceeds to step S305. If any article is uncompleted, the program returns to step S601 to continue the process.

Step S305

Herein, the in-column groups that are in the same column set are grouped together into a "column set" in layer 2. In the instance of article 411 and article 421 in FIG. 2, the in-column groups 413, 424, 443 each form the column set with only one in-column group. The in-column groups 414, 416 form a column set 412. Similarly, in the article 2, the in-column groups 423, 430 form a column set 422.

Figure 13:
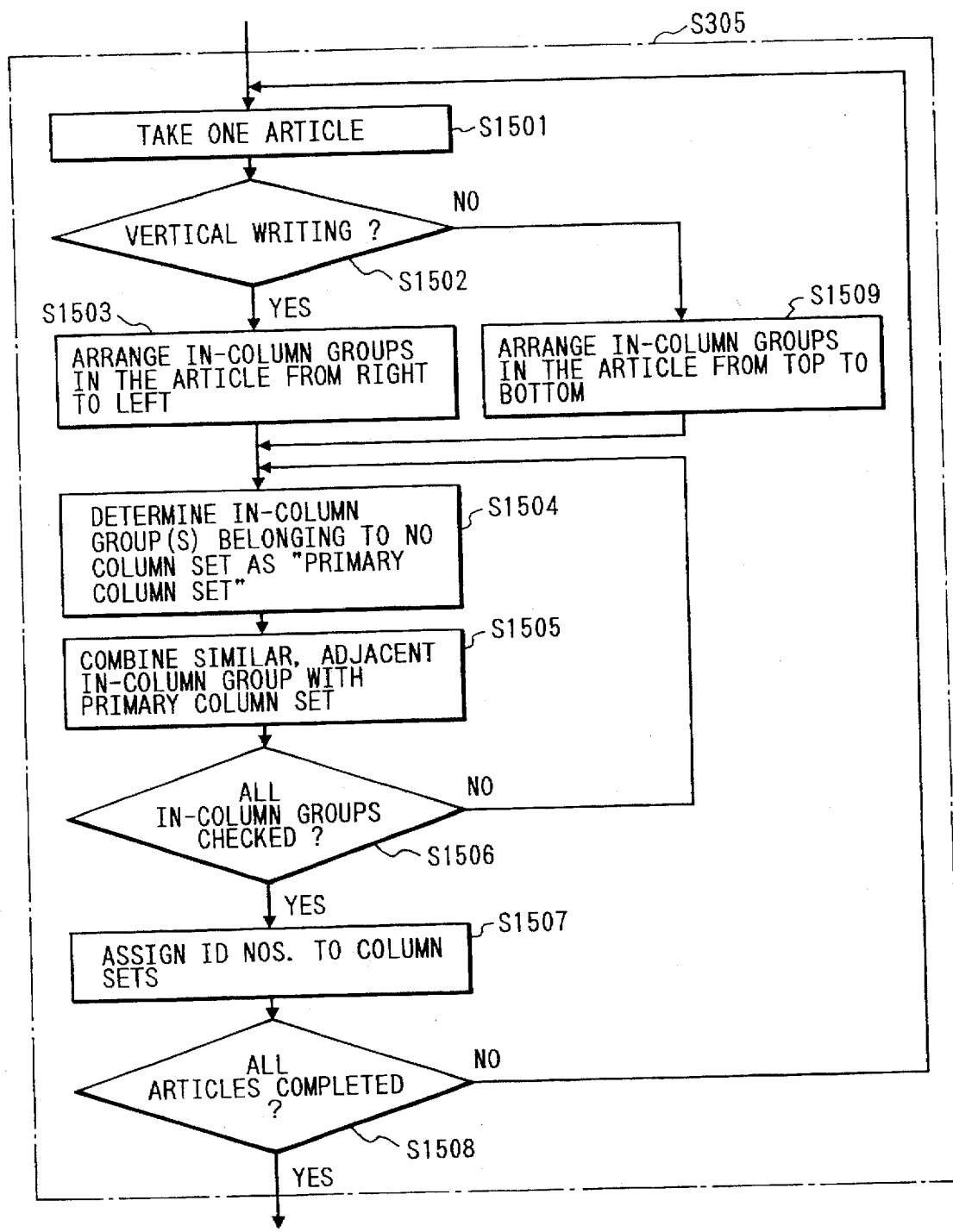
FIG. 13 is a flowchart of processing in detail at step S305.

Referring to a flowchart of FIG. 13, the details of the process of S305 will be particularly described regarding the article 421. At step S1501, one article is taken out. Herein, the article 421 is taken out. At step S1502, the set direction of the article is determined. This is the same as step S602. Herein, the set direction of the article is vertical writing. Because of it is vertical writing, the program proceeds to step S1503. Similarly, in the vertical writing, the program proceeds to step S1509.

At step S1503, the in-column groups in the article are arranged from right to left. At step S1504, one in-column group belonging to no column set is taken out in the order of arrangement, and determined as the primary column set. At step S1505, another in-column group belonging to no column set is taken out in the order of arrangement, is defined as the comparison in-column group, and is compared with the primary column set, wherein if any comparison in-column group has substantially the same character size, and adjacent areas overlap in the same direction as the set direction, with no larger gap, the comparison in-column group is combined with the primary column set as the same column set. The above procedure is repeated for other in-column groups belonging to no column set as the comparison in-column group.

In the instance of article 421 in FIG. 2, the in-column group 424 first becomes the primary column set 424, but since the character size is different from that of other column sets, it forms singly the primary column set. Then, the in-column group 423 becomes the primary column set 423. The expression (2) is satisfied with respect to the comparison in-column group 430, so that the character size is determined to be equal.

Then, the overlapping between the primary column set and the comparison in-column group in the opposite direction to the set direction of the article (i.e., the lateral direction) is determined. Supposing that the smaller height between a primary column set and a comparison in-column group (or the smaller width in lateral writing) is defined as Hsmall, and the length of overlap in the lateral direction is defined as K, the expression (4) is satisfied, whereby the overlap is determined. Also, it is apparent that they are adjacent. The way of investigation is performed, like step S704, by searching for other in-column groups in-between.

Then, the gap is investigated. Since the gap between the primary column set 423 and the comparison in-column group 430 satisfies the expression (3), the gap is determined to be not large. Hence, the comparison in-column group 430 is considered to belong to the same column set as the primary column set 423, and is combined with the primary column set to form a column set 422. Since there is no other in-column group to be made a comparison in-column group, step S1505 is ended, and the program proceeds to step S1506. At step S1506, it is investigated whether or not all in-column groups belong to any column set. If all in-column groups belong to the column set, the program proceeds to step S1507.

At step S1507, ID nos. are assigned to the column sets, respectively. The column set 424 is made a column set 1, and the column set 422 is made a column set 2.

At Step S1508, a check is performed to see whether or not all articles are completed. If all articles are completed, step S305 is ended, and the grouping is completed. If any article is uncompleted, the program returns to step S1501 to continue the process.

Figures 14, 14A:
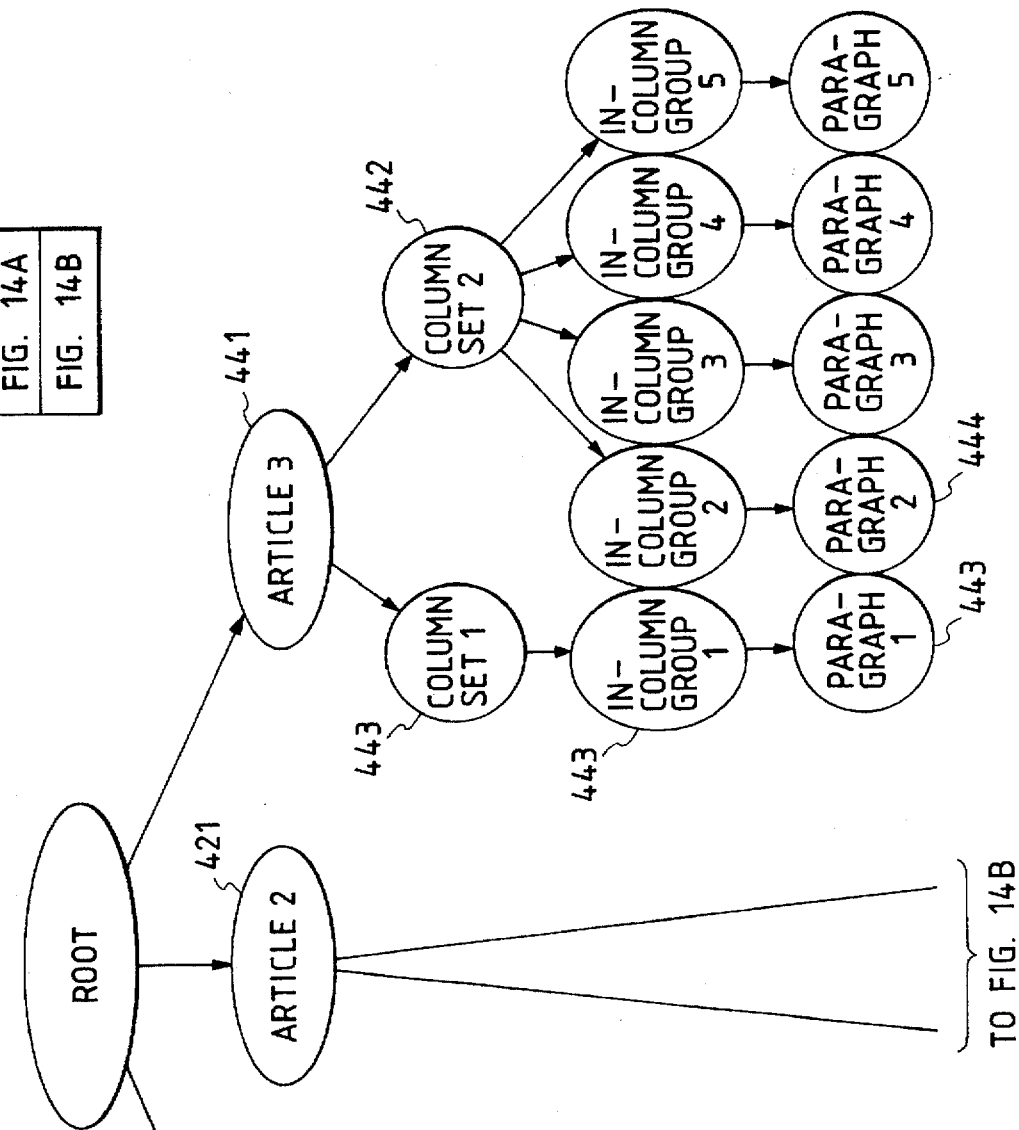
FIG. 14 is comprised of FIGS. 14A and 14B showing diagrams representing the result that an original of FIG. 2 is analyzed in layer structure.
Figure 14B:
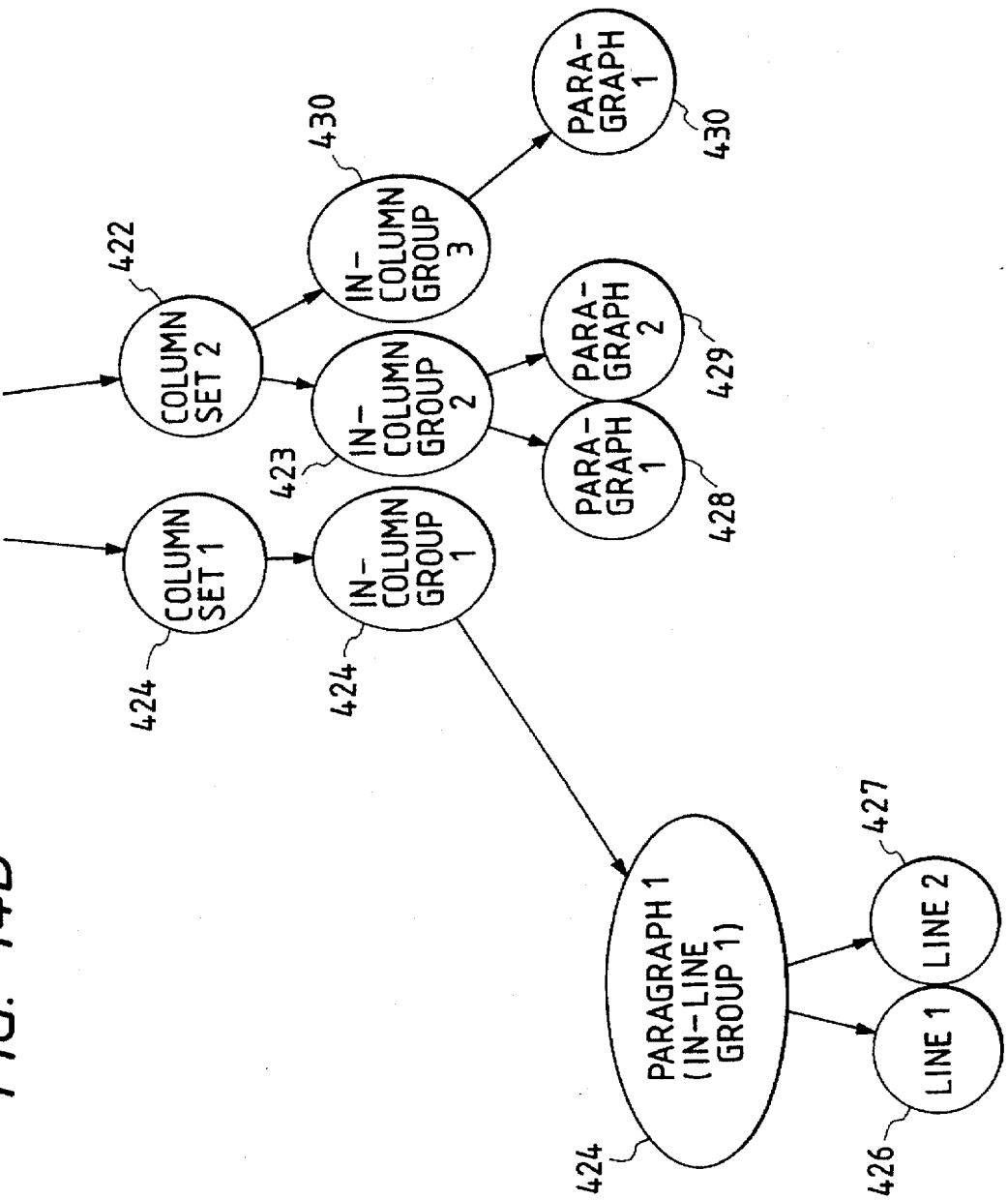

With the above processing, step S103 is ended. In the instance of FIG. 2, the result of grouping at step S103 is represented hierarchically in FIGS. 14A and 14B. In FIGS. 14A and 14B, each number corresponds to the number of FIG. 2. Although there are some groups in different layers but having the same number assigned, they singly form one paragraph or in-column group. For example, the column set 1 of article 1 consists of single in-column group 1, which further consists of single paragraph 1, or character area 413, so that the same number 413 is assigned to all of them.

(4) Step S104

The ordering for each group is made, and finally the ordering for the entire image is made.

In the following, the ordering for each group is described in detail.

Figure 15:
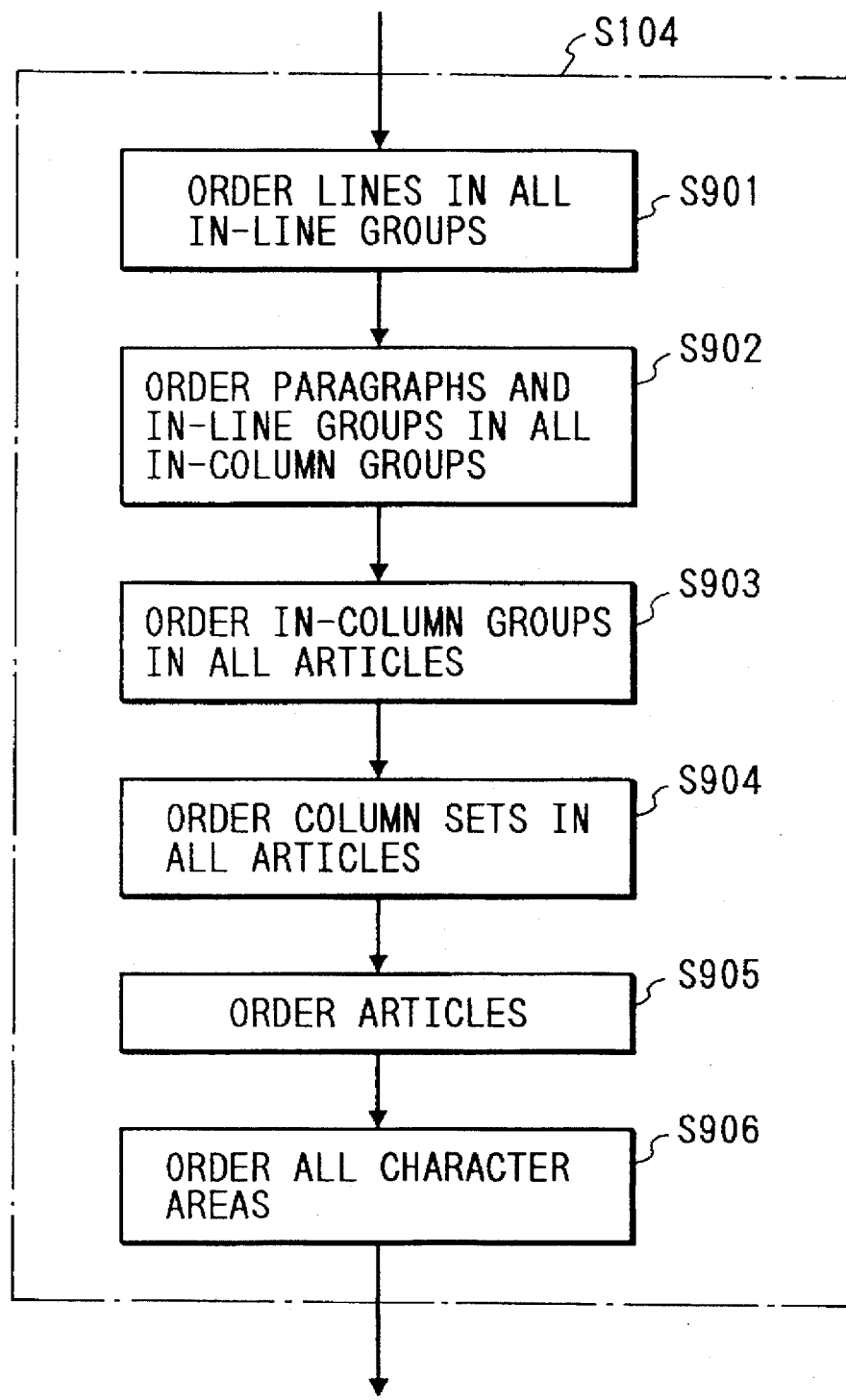
FIG. 15 is a flowchart of processing in detail at step S104.
Figure 17:
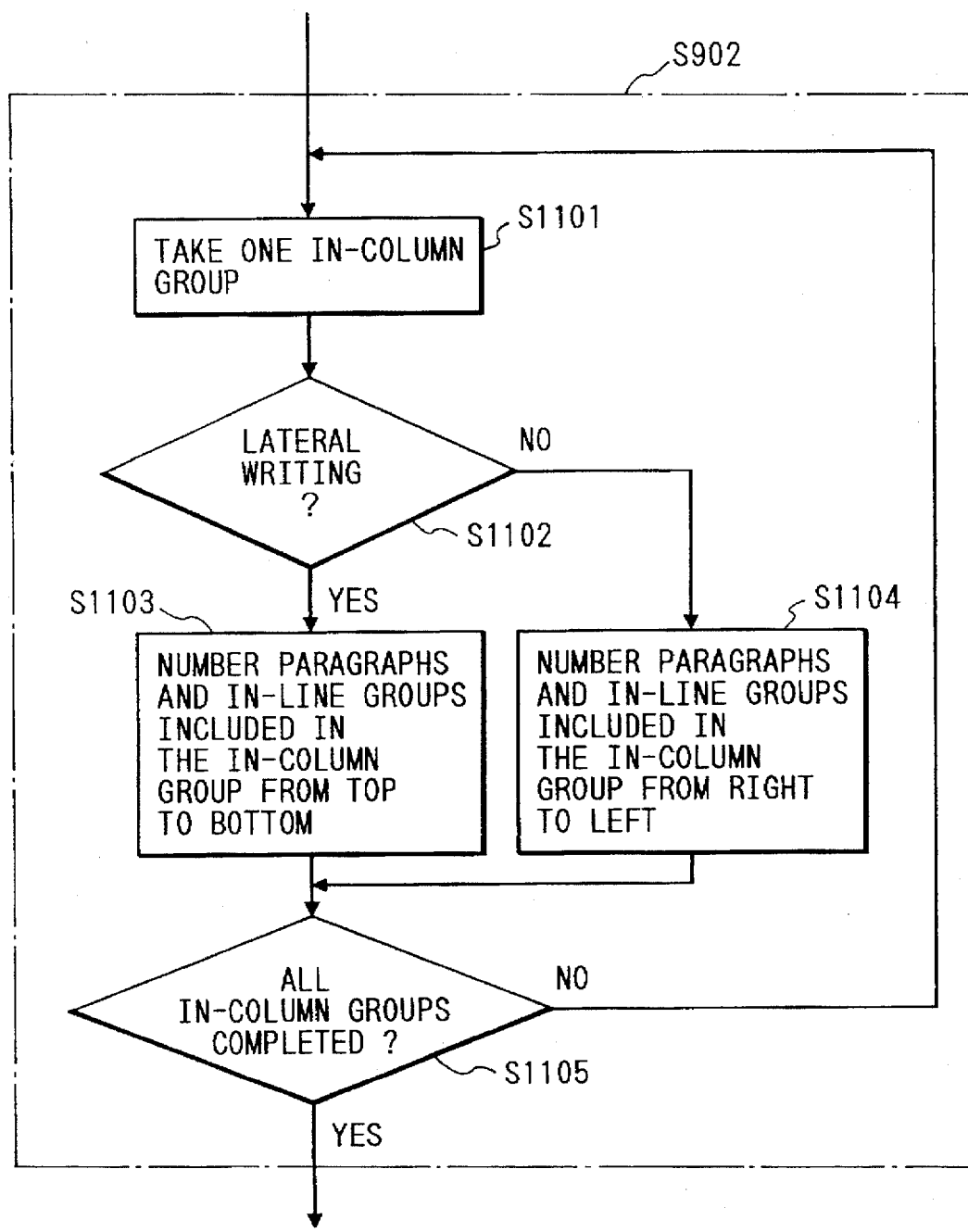
FIG. 17 is a flowchart of processing in detail at step S902.
Figure 18:
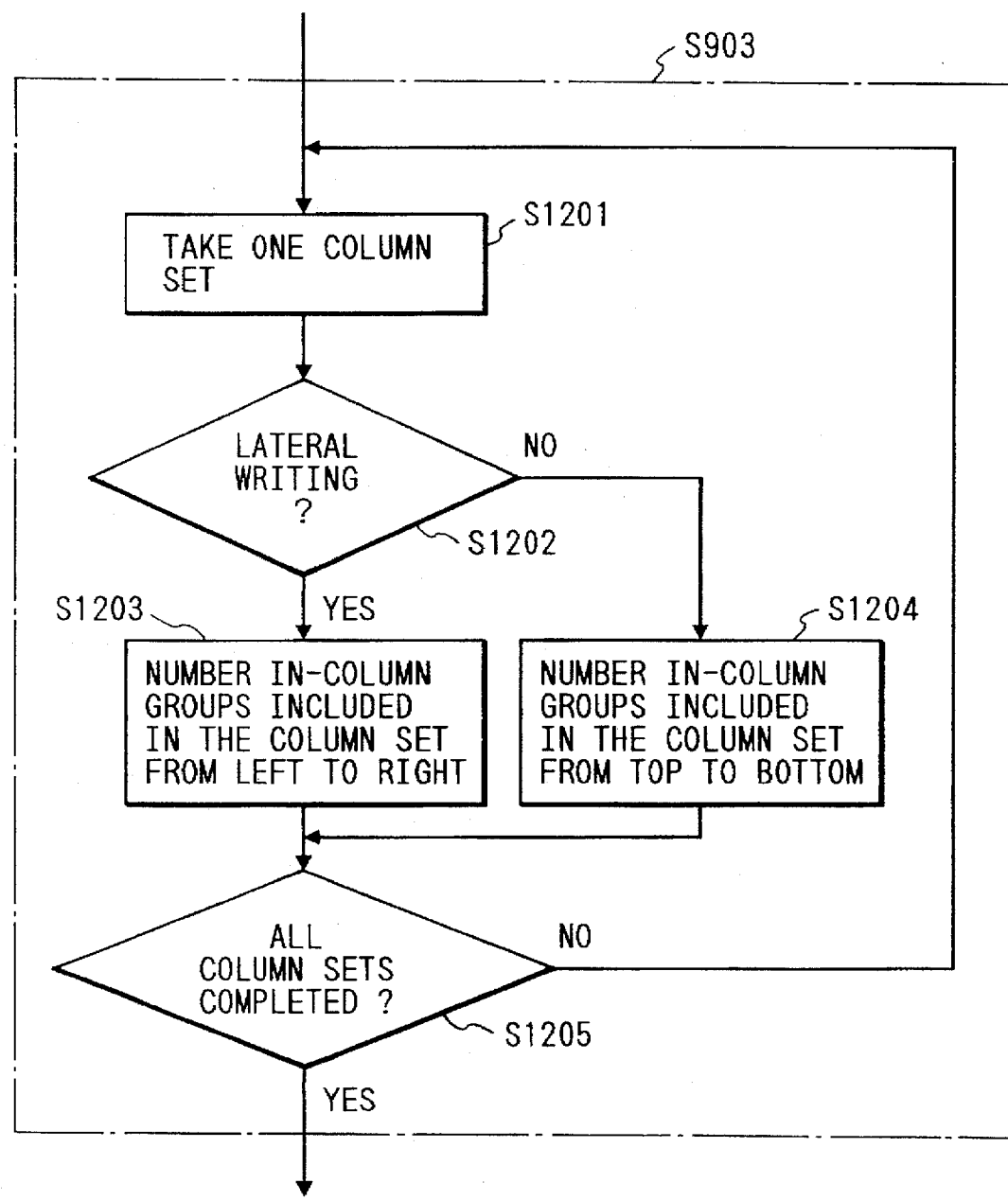
FIG. 18 is a flowchart of processing in detail at step S903.
Figure 19:
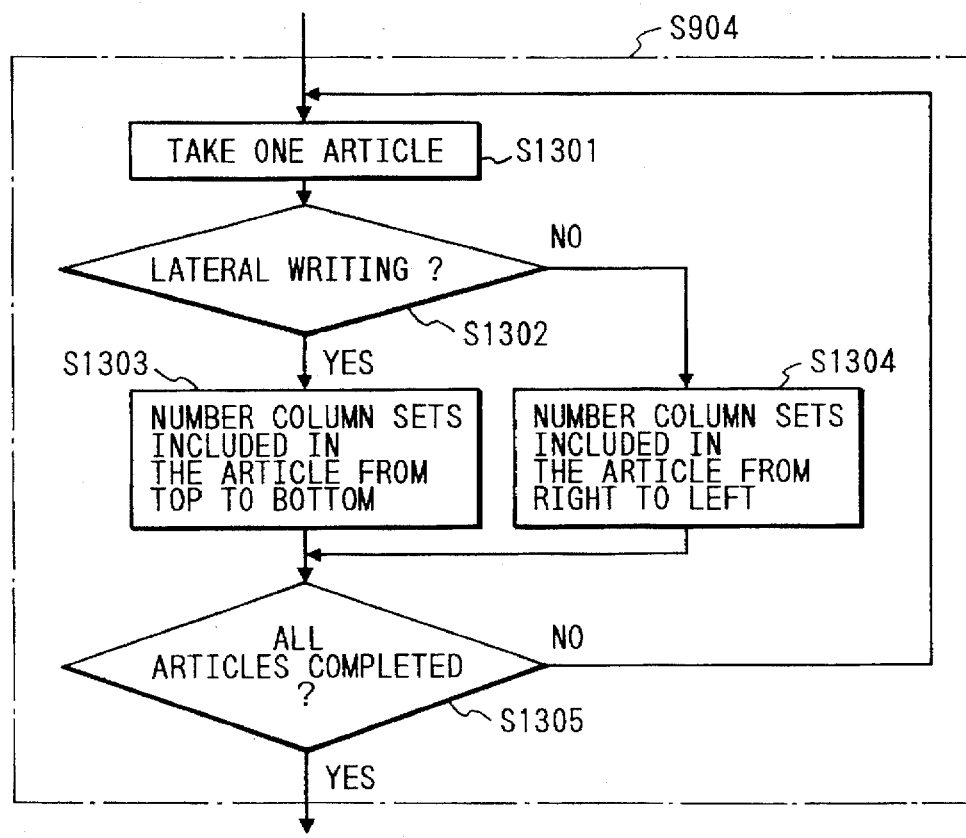
FIG. 19 is a flowchart of processing in detail at step S904.
Figure 20:
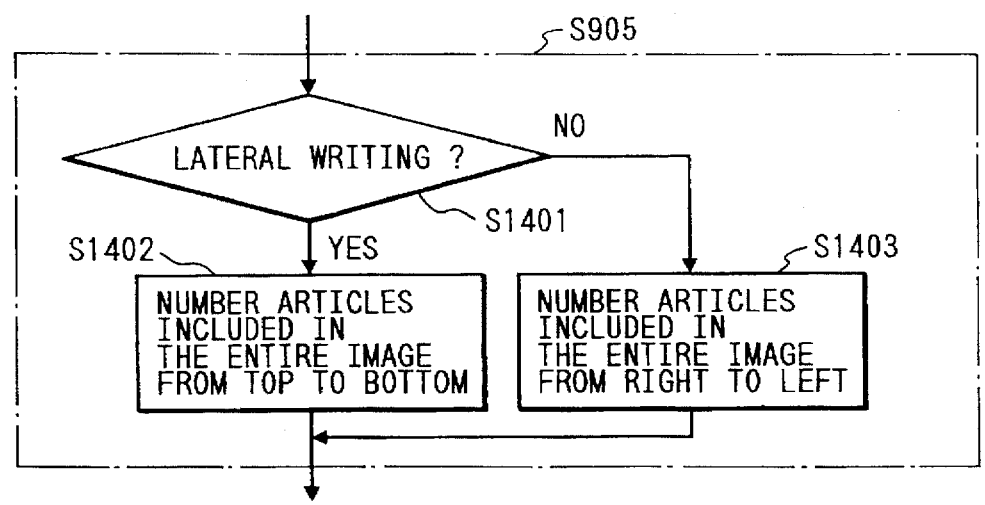
FIG. 20 is a flowchart of processing in detail at step S905.
Figure 21B:
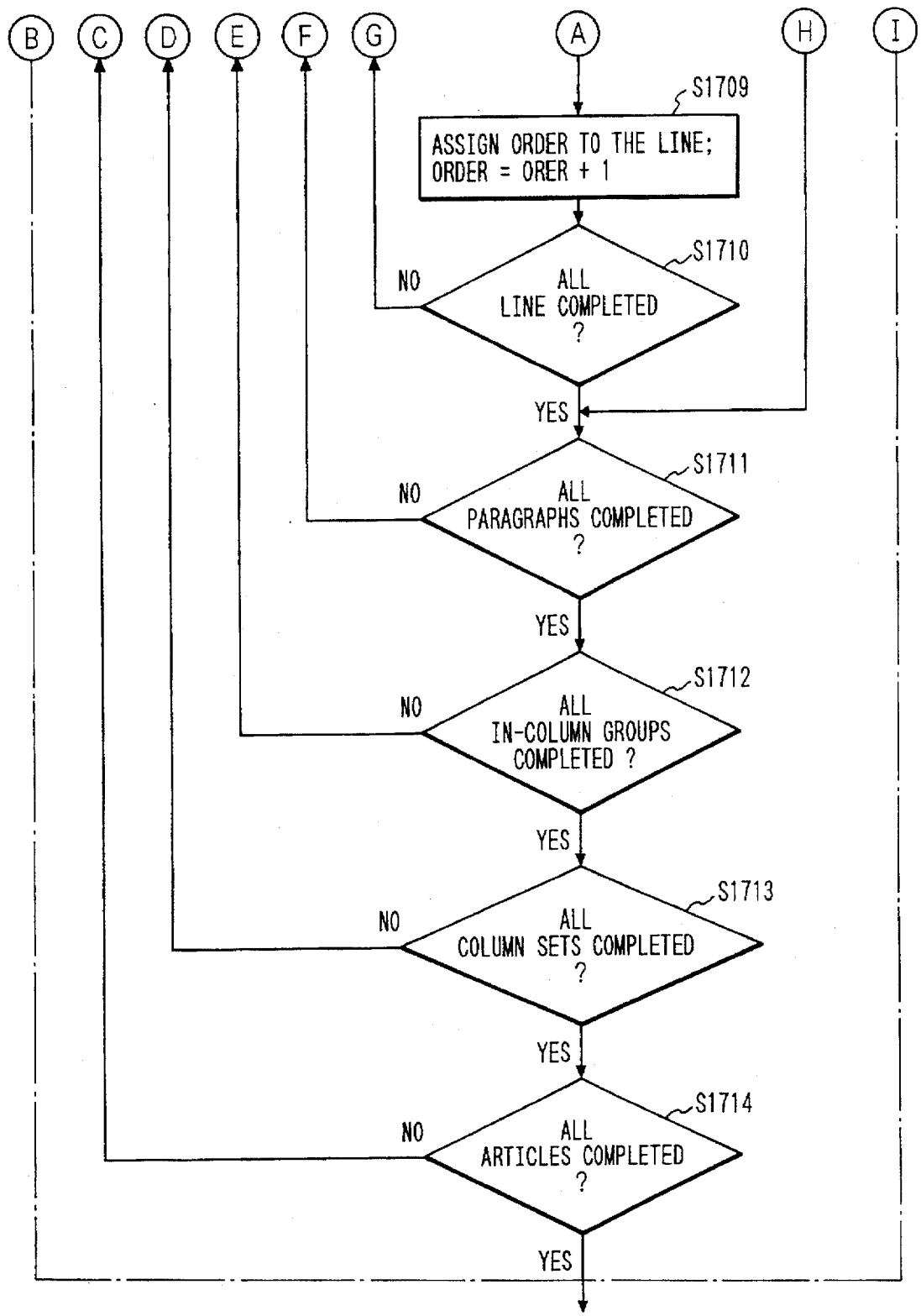
FIG. 21 is comprised of FIGS. 21A and 21B showing flowcharts of processing in detail at step S906.

FIG. 15 is a detailed flowchart for step S104. FIG. 16 is a detailed flowchart for step S901. FIG. 17 is a detailed flowchart for step S902. FIG. 18 is a detailed flowchart for step S903. FIG. 19 is a detailed flowchart for step S904. FIG. 20 is a detailed flowchart for step S905. FIGS. 21A and 21B are detailed flowcharts for step S906. Referring to the flowchart of FIG. 15, step S104 is presented.

Step S901

The ordering of all lines included in the in-line group is performed. Referring to FIG. 2 and the flowchart of FIG. 16, this is described in detail.

At step S1001, one in-line group in layer 4 is taken out. In the instance of FIG. 2, the in-line group is only an in-line group 424.

At step S1002, a check is performed to see whether or not the in-line group is lateral writing in the set direction. If it is lateral writing, the program proceeds to step S1003. If it is vertical writing, the program proceeds to step S1004. The way of determining the set direction is the same as at step S602. Since the in-line group 424 consists of vertical writing lines 426, 427, it is determined to be vertical writing, and the program proceeds to step S1004.

At step S1004, lines in layer 5 included in the in-line group are numbered from top to bottom. The lines 426, 427 are numbered in the order of line 426 and line 427, because the line 426 is located above the line 427.

At step S1005, a check is performed to see whether or not all in-line groups are completed. If all completed, step S901 is ended, and the program proceeds to step S902. If any in-line group is uncompleted, the program returns to step S1001 to continue the process. In the instance of FIG. 2, since all are completed, step S901 is ended, and the program proceeds to step S902.

Step S902

The ordering of all paragraphs and in-line groups included in the in-column group is performed. Referring to FIG. 2 and a flowchart of FIG. 17, this is described in detail.

At step S1101, one in-column group is taken out. In the instance of FIG. 2, the in-column group 423 is mainly described, because the in-column group constituted of plural paragraphs is only the in-column group 423.

At step S1102, a check is performed to see whether or not the in-column group is lateral writing in the set direction. If it is lateral writing, the program proceeds to step S1103. If it is vertical writing, the program proceeds to step S1104. The way of determining the set direction is the same as at step S602. Since the in-column group 423 consists of vertical writing paragraphs 428, 429, it is determined to be vertical writing, and the program proceeds to step S1104.

At step S1104, paragraphs and in-line groups included in the in-column group are numbered from right to left. The paragraphs 428, 429 are numbered in the order of paragraph 428 and paragraph 429, because the paragraph 428 is located to the right.

At step S1105, a check is performed to see whether or not all in-column groups are completed. If all are completed, step S902 is ended, and the program proceeds to step S903. If any in-column group is uncompleted, the program returns to step S1101 to continue the process.

Step S903

The ordering of all in-column groups included in the article is performed. Referring to FIG. 2 and a flowchart of FIG. 18, this is described in detail.

At step S1201, one column set is taken out. In the instance of FIG. 2, the column set 422 is mainly described.

At step S1202, a check is performed to see whether or not the column set is lateral writing in the set direction. If it is lateral writing, the program proceeds to step S1203. If it is vertical writing, the program proceeds to step S1204. The way of determining the set direction is the same as at step S602. Since the column set 422 consists of vertical writing in-column groups 423, 430, it is determined to be vertical writing, and the program proceeds to step S1204.

At step S1204, the in-column groups included in the column set are numbered from top to bottom. The in-column groups 423, 430 are numbered in the order of in-column group 423 and in-column group 430, because the in-column group 423 is located above.

At step S1205, a check is performed to see whether or not all column sets are completed. If all are completed, step S903 is ended, and the program proceeds to step S904. If any column set is uncompleted, the program returns to step S1201 to continue the process.

Step S904

The ordering of all column sets included in the article is performed. Referring to FIG. 2 and a flowchart of FIG. 19, this is described in detail. At step S1301, one article is taken out. In the instance of FIG. 2, an article 421 is mainly described.

At step S1302, a check is performed to see whether or not the article is lateral writing in the set direction. If it is lateral writing, the program proceeds to step S1303.

If it is vertical writing, the program proceeds to step S1304. The way of determining the set direction is the same as at step S602. Since the article 421 consists of vertical writing column sets 424, 422, it is determined to be vertical writing, and the program proceeds to step S1304.

At step S1304, the column sets included in the article are numbered from right to left. The column sets 424, 422 are numbered in the order of column set 424 and column set 422, because the column set 424 is located to the right.

At step S1305, a check is performed to see whether or not all articles are completed. If all are completed, step S904 is ended, and the program proceeds to step S905. If any article is uncompleted, the program returns to step S1301 to continue the process.

Step S905

The ordering of all articles is performed. Referring to FIG. 2 and a flowchart of FIG. 20, this is described in detail.

At step S1401, a check is performed to see whether or not the entire image is lateral writing in the set direction. If it is lateral writing, the program proceeds to step S1402. If it is vertical writing, the program proceeds to step S1403. The way of determining the set direction is the same as at step S602. Since the image 401 consists of vertical writing articles 411, 421, 441, it is determined to be vertical writing, and the program proceeds to step S1403.

At step S1403, the articles included in the entire image are numbered from right to left. Step S905 is ended, and the program proceeds to step S906. The ordering is made in the order of article 411, article 421, and article 441.

Step S906

The ordering of all character areas in the entire image is performed.

The flowcharts of FIGS. 21A and 21B will be now described in detail with reference to FIG. 2. At step S1701, 1 is substituted into a variable ORDER (initialization). This variable value is the number of the character area in the entire image. At step S1702, one article is taken out in the order of its number starting from the smallest. Herein, the number indicates an ID number assigned from steps S901 to S905. At step S1703, one column set in the article obtained at step S1702 is taken out in the order of its number starting from the smallest. At step S1704, one in-column group in the column set obtained at step S1703 is taken out in the order of number from the smallest. At step S1705, one paragraph in the in-column group obtained at step S1704 is taken out in the order of its number starting from the smallest. At step S1706, a check is performed to see whether or not the paragraph taken out at step S1705 belongs to the in-line group. If it belongs to the in-line group, the program proceeds to step S1707. If not, the program proceeds to step S1708. At step S1707, one line in the paragraph obtained at step S705 is taken out in the order of its number starting from the smallest. At step S1709, the number of variable ORDER is assigned to the line, and ORDER is incremented by 1. At step S1701, a check is performed to see whether or not all lines are completed. If all lines are completed, the program proceeds to step S1711. If any line is uncompleted, the program returns to step S1707 to continue the process. Also, at step S1708, the number or variable ORDER is assigned to the paragraph, and ORDER is incremented by 1. At step S1711, a check is performed to see whether or not all paragraphs are completed. If all paragraphs are completed, the program proceeds to step S1712. If any paragraph is uncompleted, the program returns to step S1705 to continue the process. At step S1712, a check is performed to see whether or not all in-column groups are completed. If all in-column groups are completed, the program proceeds to step S1713. If any in-column group is uncompleted, the program returns to step S1704 to continue the process. At step S1713, a check is performed to see whether or not all column sets are completed. If all columns sets are completed, the program proceeds to step S1714. If any column set is uncompleted, the program returns to step S1703 to continue the process. At step S1714, a check is performed to see whether or not all articles are completed. If all articles are completed, step S906 is ended. If any article is uncompleted, the program returns to step S1702 to continue the process. With the above, step S104 is ended.

Figure 22:
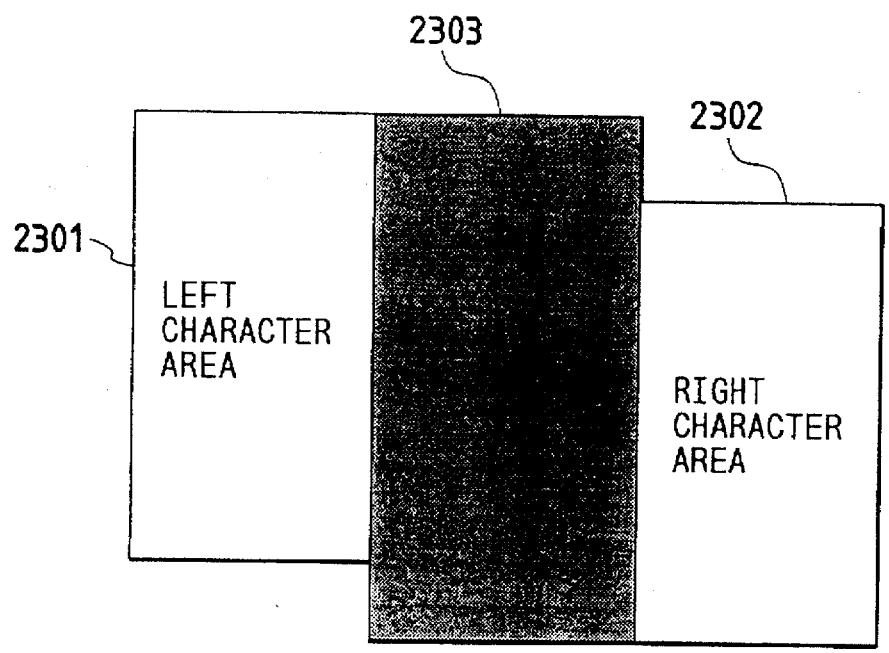
FIG. 22 is another example 1 of an area investigated at step S704.

While in investigating the separator or figure between areas at step S704, a parallelogram was formed to see if any separator or figure is present in it, and it should be noted that for example, in investigating the separator or figure between areas which are arranged in the vertical direction, a rectangle including the whole or part of the bottom of the upper area and the top of the lower area may be formed to see that any separator or figure is present in it. Similarly, in investigation the separator or figure between areas which are arranged in the lateral direction, a rectangle including the whole or part of the left side of the right area and the right side of the left area may be formed to see that any separator or figure is present in it. FIG. 22 is an example in which in investigating the separator or figure between areas which are arranged in the lateral direction, a rectangle including the whole of the bottom of an upper area and the top of a lower area is formed. In FIG. 22, 2301 is the upper area, and 2302 is the lower area. 2303 is the rectangle including the whole of the bottom of the upper area and the top of the lower area.

Figure 23:
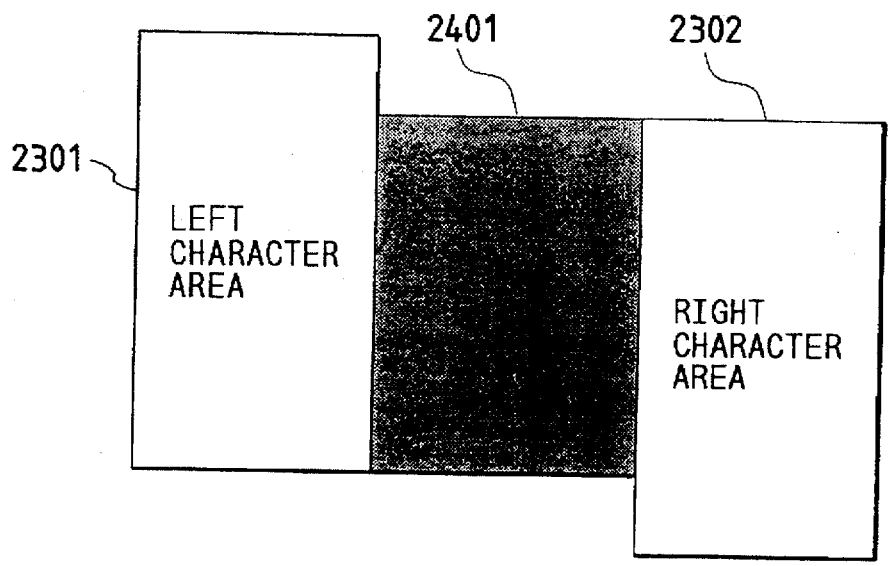
FIG. 23 is another example 2 of an area investigated at step S704.

Similarly, FIG. 23 is an example in which in investigating the separator or figure between areas which are arranged in the vertical direction, a rectangle including the part of the bottom of an upper area and the top of a lower area is formed. In FIG. 23, 2301 is the upper area, and 2302 is the lower area. 2401 is the rectangle including the part of the bottom of the upper area and the top of the lower area.

While in this embodiment, at steps S2202, S602, S1502, S1002, S1102, S1202, S1302, and S1401, for example, a check is made to see whether the character string of an object is lateral or vertical writing, and it will be appreciated that if the document of an object is known beforehand to be lateral writing such as e.g., English writing, the judgement steps may be omitted to perform only the process for lateral writing.

Figure 24:
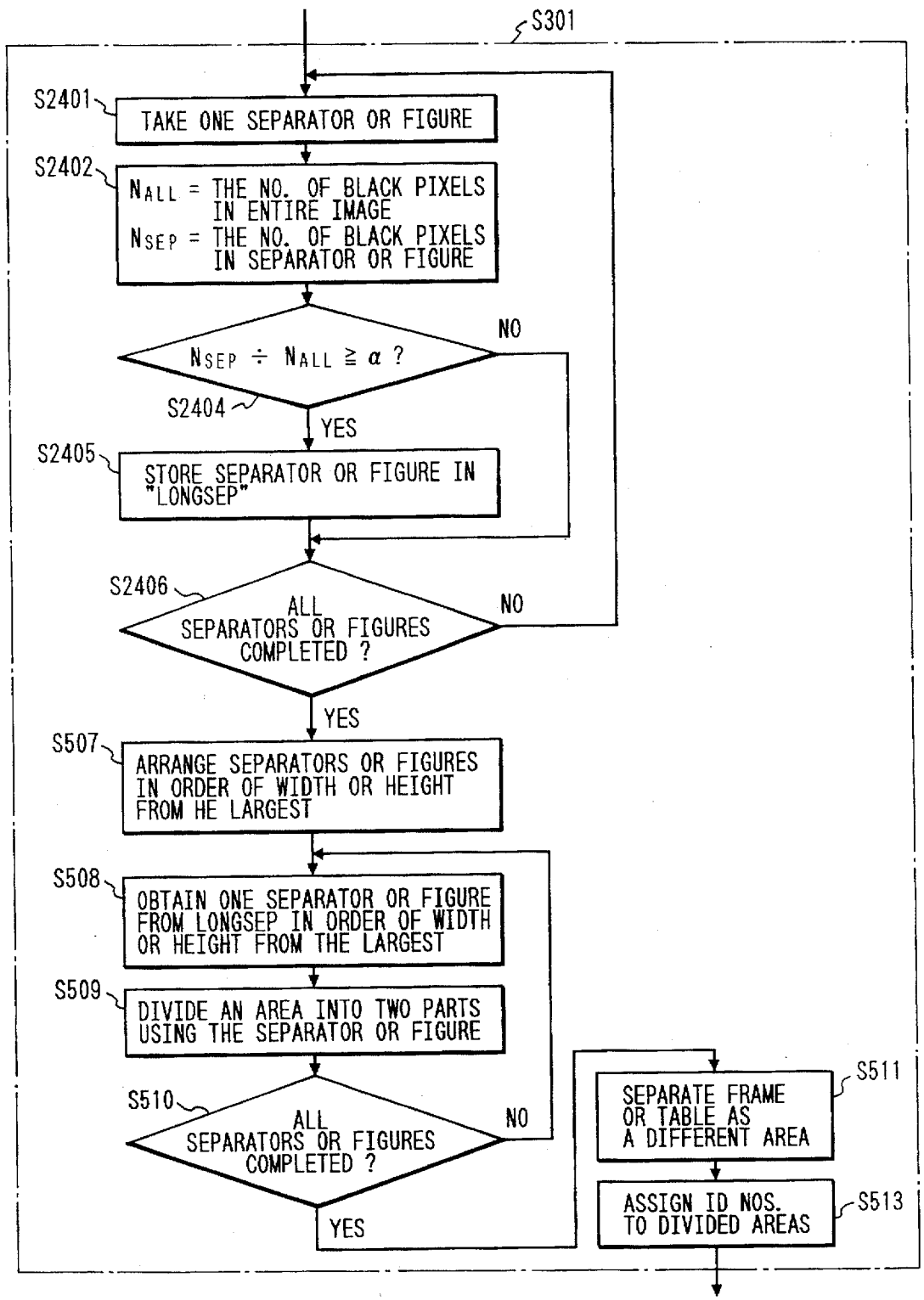
FIG. 24 is a flowchart of an article judgement process using the number of black pixels.

FIG. 24 is a flowchart of a process for making the selection of the separator or figure to be used in the area separation in accordance with the number of black pixels in the separator area or figure area, in an article judgement process at step S301.

The image is divided into one or more areas by a separator or figure having the length of a certain percentage or greater relative to the entire image, which are made articles. Referring to FIG. 2 and a flowchart of FIG. 24, this is described in detail. First, at step S2401, one separator or figure extracted by area division S102 in FIG. 3 is taken out. Then, at step S2402, the number of black pixels in the entire image is set to Nall, and the number of black pixels in the separator or figure is set to Nsep.

At step S504, the following inequality is checked to be satisfied.

$$Nsep \div Nall \geq \alpha \quad (1)$$

Where $\alpha$ is a threshold, or 0.1 herein. A separator or figure satisfying an expression (1) is stored in an array LONGSEP at step S2405. If not satisfied, the program proceeds to step S2406. In the instance of FIG. 2, separators 415, 445 do not satisfy the expression (1). Since separator 446 and figure area 425 satisfy the expression (1), they are stored in the array LONGSEP.

At step S2406, a check is performed to see whether or not all separators or figures are completed. If all are completed, the program proceeds to step S507. Also, if any separator or figure is uncompleted, the program returns to step S2401 to continue the process.

Figure 7:
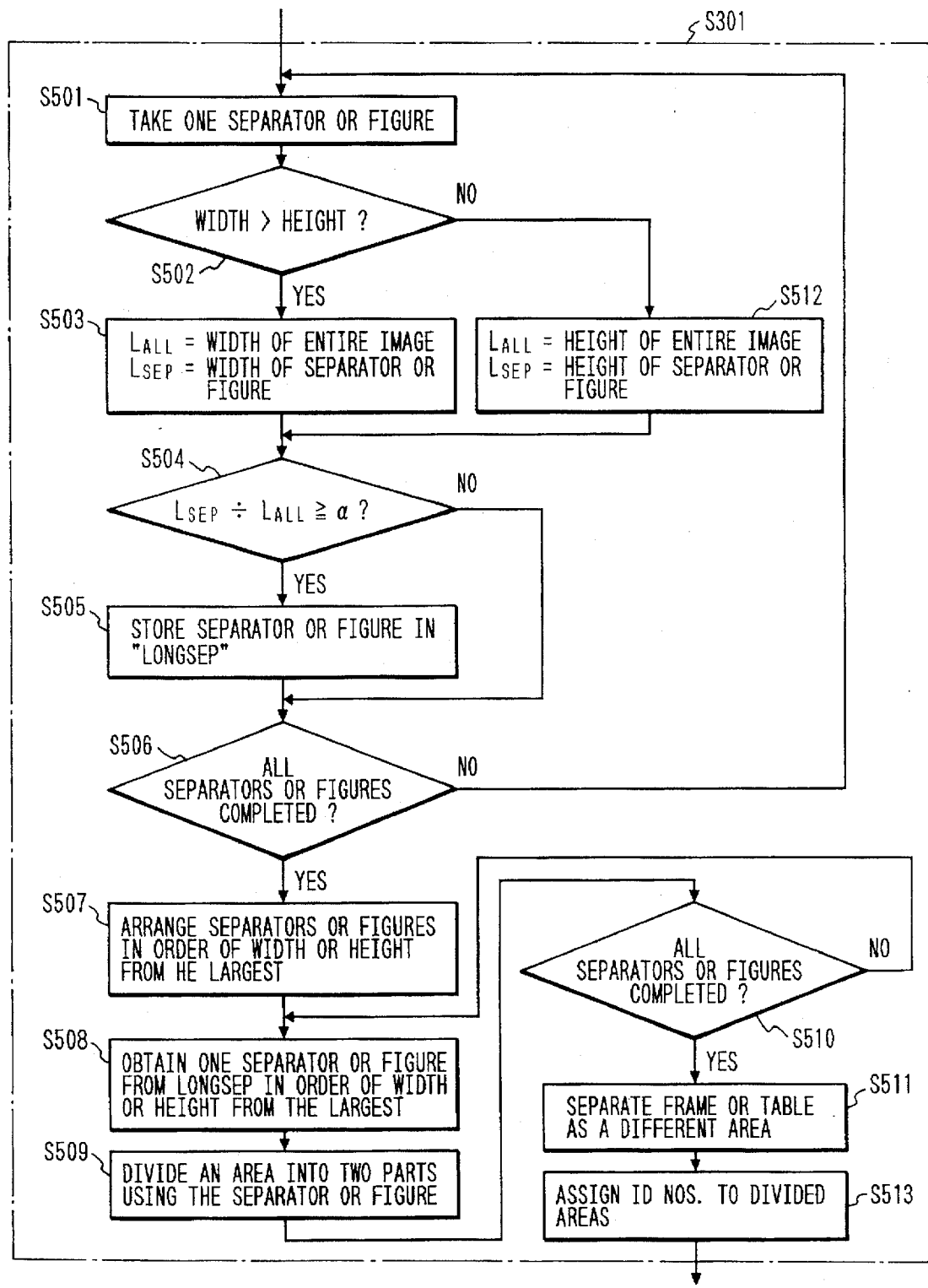
FIG. 7 is a flowchart of an article judging process in detail at step S301.

The step S507 and subsequent steps are not described since they are the same as in FIG. 7. The threshold $\alpha$ for use in step S2404 may be variable, like step S504.

For example, the threshold is smaller with a greater number of black pixels in the image, but as the number of black pixels in the image is less, the threshold is greater. Thereby, it is possible to eliminate such a mistake that the portion which should not be separated, because the length of separator is actually short but the image is also small, has been separated, raising the accuracy of ordering. For example, in an image of A4 size and 400 DPI, the number of black pixels in the entire image and $\alpha$ are as follows:

| | |
|---|---|
| 100,000 or more | $\alpha = 0.1$ |
| 50,000 to 100,000 | $\alpha = 0.05$ |
| 10,000 to 50,000 | $\alpha = 0.03$ |
| Below 10,000 | $\alpha = 0.01$ |

Similarly, the threshold used in the expressions (2) to (4) may be varied according to the number of black pixels or layers in the image.

[Embodiment 2]

This embodiment is an instance in which the grouping process at step S103 of FIG. 3 is judged according to the similarity between character areas.

The process in this embodiment at step S103 is shown in a flowchart of FIG. 25 and described below.

The character or text or image in each character area extracted from the input image is analyzed to obtain the similarity between character areas, and the areas having good similarity are grouped together into one "article" (step S2501). The details of the process of this step S2501 are described below referring to FIG. 29 and a flowchart of FIG. 26. First, at step S2601, one character area belonging to no article is selected and taken out among character areas extracted in the area division process at step S102 of FIG. 3.

In an example of FIG. 29, a character area 2202 is first taken out, and made the first character area of the article. Then, at step S2602, one character area different from the character area selected at previous step S2602 and belonging to no article is taken out and made the comparison area. In the example of FIG. 29, a character area 2203 is taken out and made the comparison character area.

At step S2603, the character or text or image in the character area (2202) and the comparison character area (2203) within the article is analyzed to obtain the similarity S between areas.

The way of calculating the similarity by analyzing the character or text at step S2603 is described below with reference to FIG. 27.

First, at step S2701, 0 is substituted into a variable Sall and a variable Total for initialization. The variable Sall indicates the sum of similarities of words within the comparison character area. Also, the variable Total indicates the total number of words within the comparison character area. At step S2702, one word within the comparison character area is taken out, and 1 is added to Total.

In the example of FIG. 29, a word "semiconductor" is taken out from the comparison character area 2203, and 1 is added to Total, resulting in Total=1. At step S2703, one synonymous word of the word taken out is taken out in the order of similarity from the height from a synonym dictionary.

In the example of FIG. 29, a synonymous word "semiconductor" is first taken out from the synonym dictionary as shown in FIG. 28. At step S2704, a check is performed to see whether or not any synonymous word taken out is present within the article. If so, the program proceeds to step S2705. If not, the program proceeds to step S2706.

In the example of FIG. 29, since the word "semiconductor" exists within the article 2202, the program proceeds to step S2705. At step S2705, the similarity of a synonymous word taken out is retrieved from the synonym dictionary.

In the example of FIG. 29, the similarity is equal to 1.0.

Also, at step S2706, a check is performed to see whether or not all synonymous words of the word taken out have been retrieved from the synonym dictionary. If all are retrieved, the program proceeds to step S2707 to set the similarity of the word taken out to 0, and the program proceeds to step S2708. Also, if any synonymous word of the word taken out remains, the program returns to step S2703 to continue the process. At step S2708, the similarity is added to Sall.

In the example of FIG. 29, if the similarity is added to Sall, Sall is equal to 1.0.

At step S2709, a check is performed to see whether or not all words within the comparison character area are completed. If all are completed, the program proceeds to step S2710. If any word remains, the program returns to step S2702 to continue the process.

In the example of FIG. 29, a word "demand" within the comparison character area 2203 is processed.

Likewise, words "inactivity", "merely", . . . "pointed out" are processed, resulting in Sall=8.8, and Total=20.

At step S2710, the similarity is calculated according to the following expression.

S=Sall÷Total

In the example of FIG. 29,

S=8.8÷20=0.44

With this, the processing at step S2603 is finished, and the program proceeds to step S2604.

At step S2604, the similarity and the threshold α are compared.

$$S \geq \alpha \quad (1)$$

If an expression (1) is satisfied, the program proceeds to step S2605, or otherwise the program proceeds to step S2606.

In the example of FIG. 29, the expression (1) is satisfied, the program proceeds to step S2605. However, the threshold a herein is assumed to be 0.2. At step S2605, a comparison character area is included in the article.

In the example of FIG. 29, comparison character area 2203 is determined as a part of the same article, and included in an article 2202. At step S2606, a check is performed to see whether or not all character areas are completed. If all are completed, the program proceeds to step S2607. If any character area remains, the program returns to step S2601 to continue the process.

In the example of FIG. 29, since all character areas are completed, the program proceeds to step S2607. At step S2607, an ID number is assigned to each article.

In the example of FIG. 29, since there is only one article, only an article 1 exists.

With the above, the processing at step S2501 is ended, and the program proceeds to step S302.

Similarly, in the example of FIG. 4, the area is divided into article 411, article 421, and article 441.

The processing steps following step S302 are the same as those of the flowchart in FIG. 6, and are not described.

Figure 26:
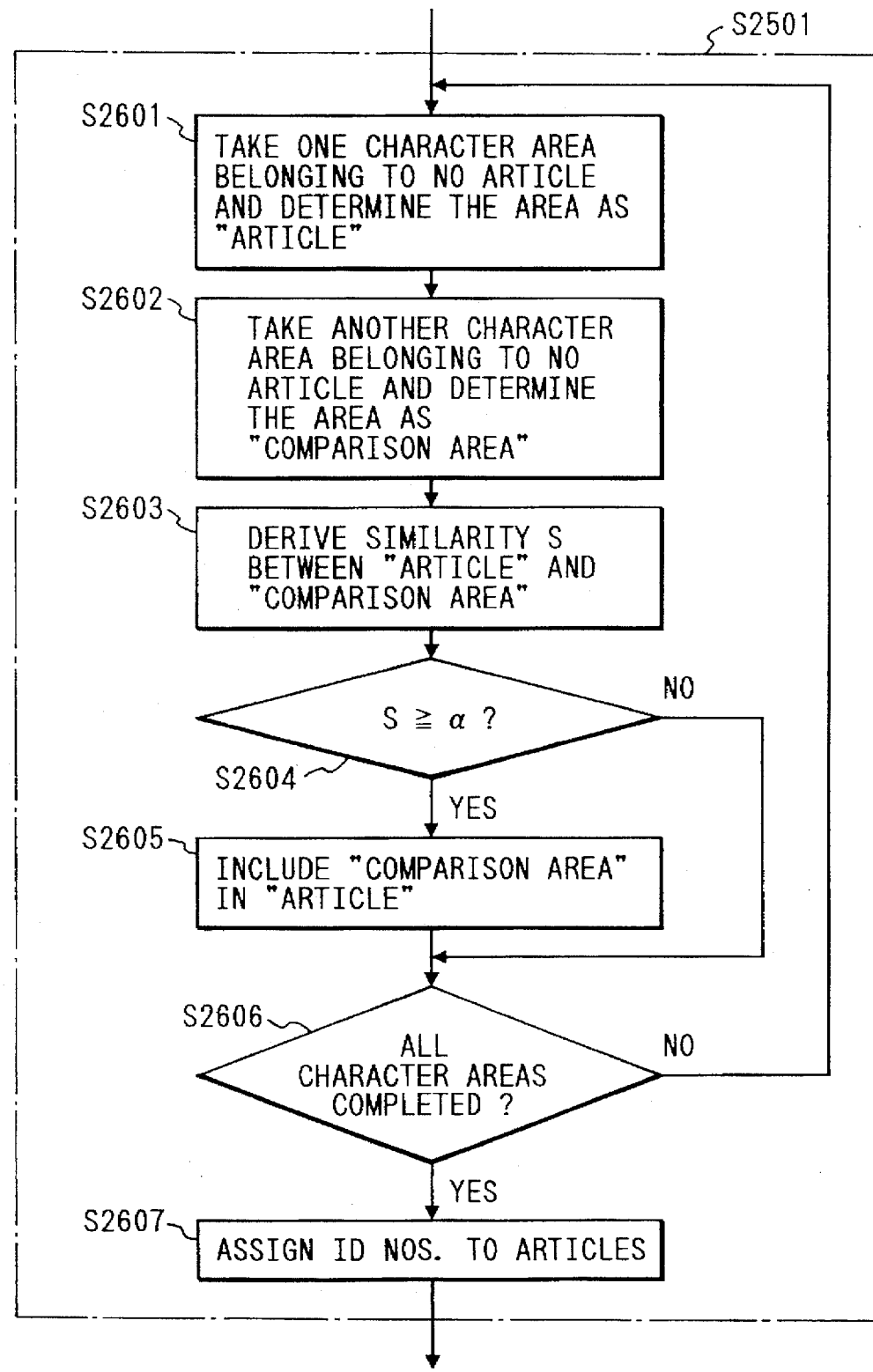
FIG. 26 is a flowchart of processing in detail at step S2501.
Figure 27:
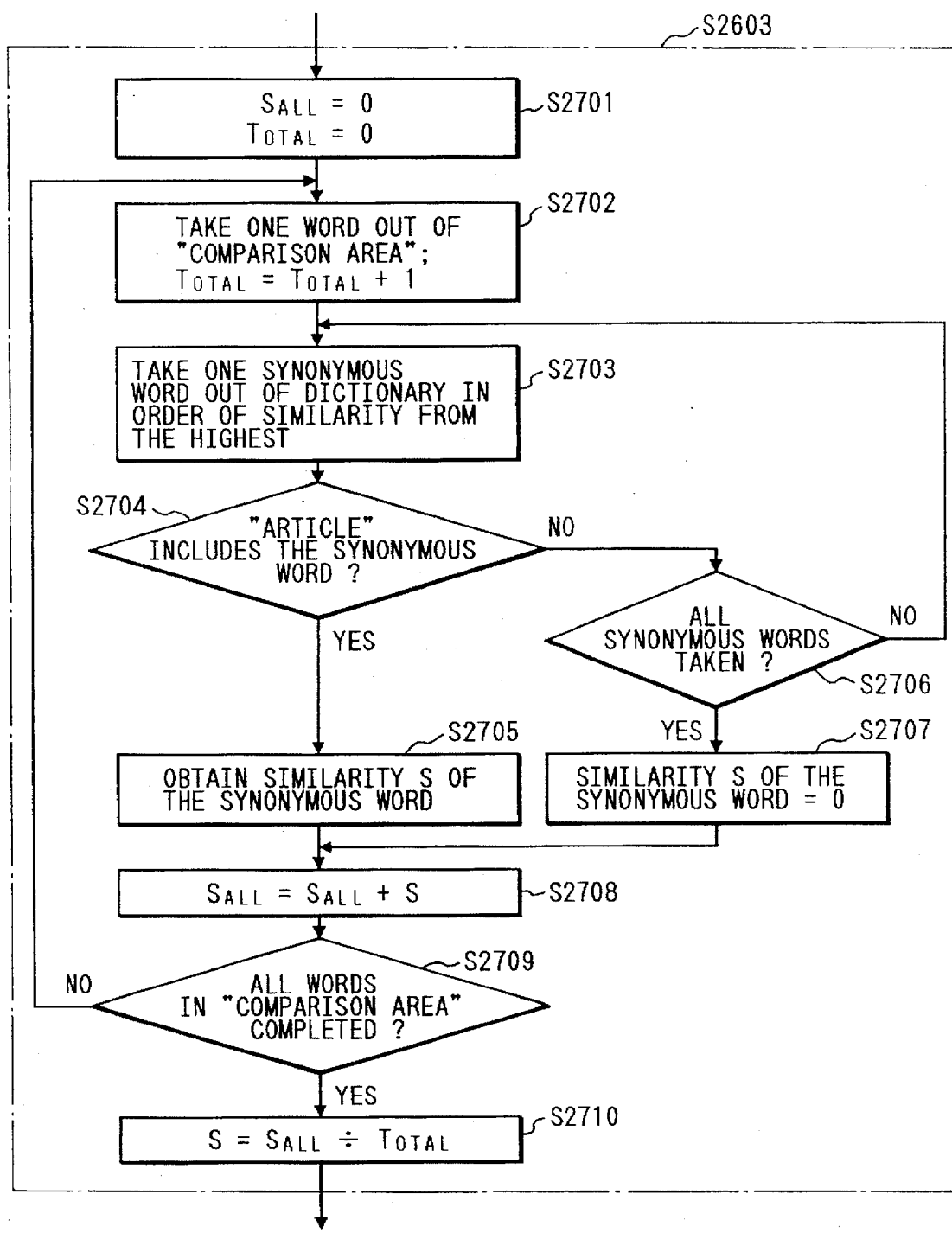
FIG. 27 is a flowchart of processing in detail at step S2603.

While in this embodiment, the processing for calculating the similarity between character areas at step S2603 in FIG. 26 and as shown in the flowchart of FIG. 27, only words beginning with kanji or katakana are taken out as indicated by the under line 2204 in FIG. 29, it should be noted that only words beginning with hiragana may be taken out. For instance, words consisting of hiragana such as "とまと" may be taken out.

Figure 25:
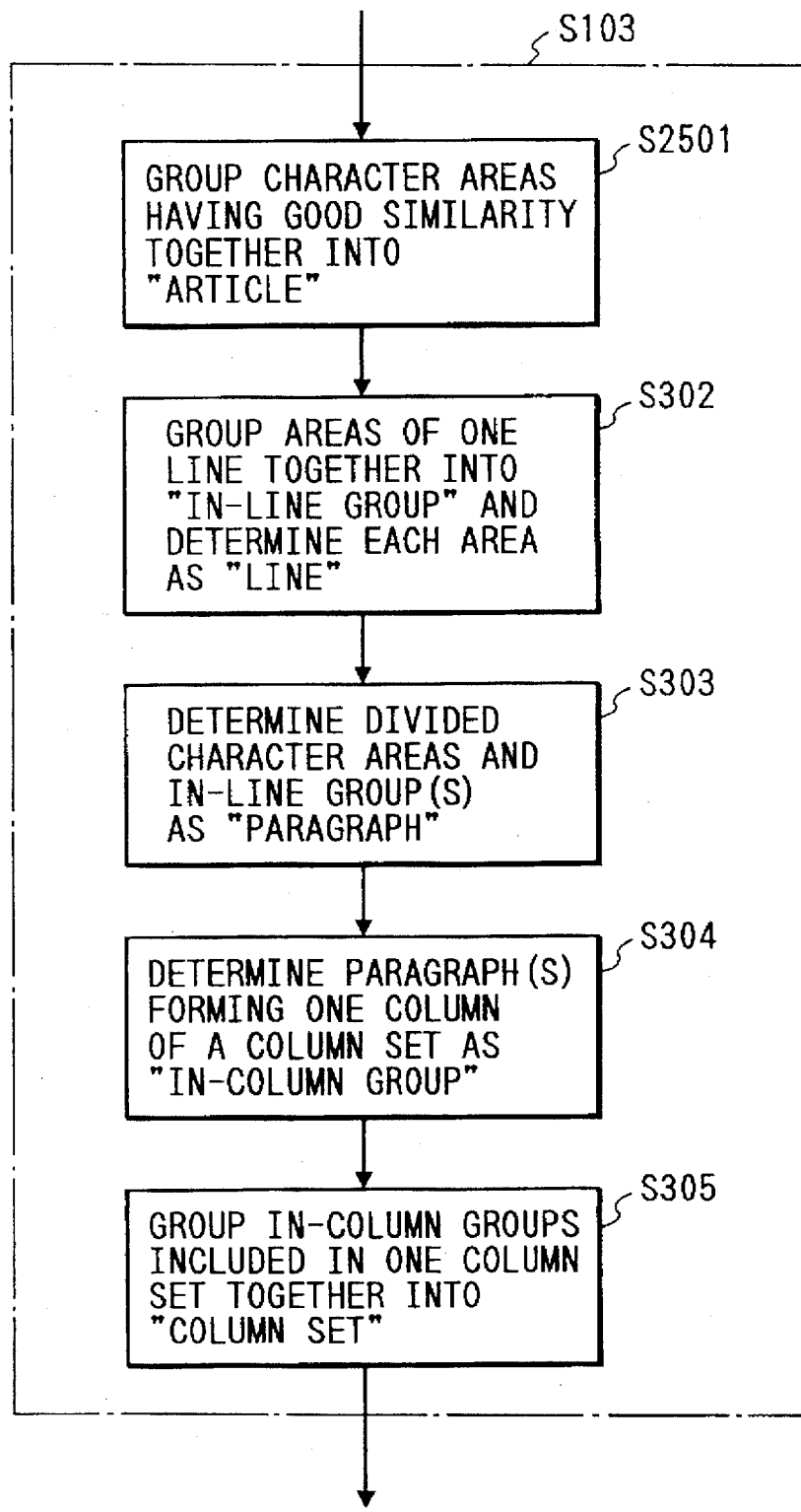
FIG. 25 is a flowchart of a grouping process according to the similarity of character areas.

While in this embodiment, the similarity between character areas is used only with the grouping of an "article", as indicated at step S2501 in FIG. 25, in the grouping process at step S103 of FIG. 3, it should be noted that the similarity between character areas may be used with the grouping of others. For example, the grouping of column set at step S305 may be applied.

While in this embodiment, characters in the character area are not particularly described in the grouping process at step S103 in FIG. 3, it should be noted that characters may be obtained by performing the character recognition of the image in the character area.

The character recognition is made by first cutting out each character from the image in the character area. This can be accomplished by, for example, taking a histogram in the vertical direction if vertical writing is used, extracting a line from a cut line of black pixels, and taking a histogram in the lateral direction from the extracted line, thereby cutting out a character. Geometrical features are extracted from the cut out character pattern and compared with a standard pattern stored in a recognition dictionary, whereby the character recognition result can be obtained as the closest character.

The similarity between character areas is obtained by analyzing this character recognition result at step S2501, and areas having high similarity are grouped into the "article".

While in this embodiment, the total similarity between character areas was obtained by finding a word having the highest similarity in the article, which exists in the synonym dictionary for one word in the comparison character area, obtaining the similarity from the synonym dictionary, if any, and adding it directly to Sall, as shown in the flowchart of FIG. 27, it should be noted that the total similarity in the article as obtained for one word in the comparison character area by obtaining the similarity from the synonym dictionary, if any, and adding (similarity)×(number of synonymous words present in the article) to Sall. Herein, it is assumed that the threshold α at step S504 is equal to 0.5.

In the example of FIG. 29, as for a word "semiconductor" in the comparison character area 2203, the word "semiconductor" exists at two sites in the article 2202, and therefore 1.0 was added to Sall in the first embodiment, but in this embodiment, 1.0×2=2.0 is added to Sall.

While in this embodiment, the total similarity between character areas was obtained by finding a word having the highest similarity in the article, which exists in the synonym dictionary for one word in the comparison character area, obtaining the similarity from the synonym dictionary, if any, and adding it directly to Sall, as shown in the flowchart of FIG. 27, it should be noted that the total similarity may be obtained by finding all words in the article and in the synonym dictionary for one word in the comparison character area, obtaining the similarity from the synonym dictionary, if any, and adding the sum of (similarity of each synonymous words) to Sall. Herein, it is assumed that the threshold α at step S504 is equal to 0.5.

In the example of FIG. 29, regarding a word "inactivity" in the comparison character area 2203, two words exist in the article 2202, "inactivity" and "downward", wherein 1.0 was added to Sall in the first embodiment, but in this embodiment, 1.0+0.06=1.06 is added to Sall.

While in this embodiment, the total similarity between character areas was obtained by finding a word having the highest similarity in the article which exists in the synonym dictionary for one word in the comparison character area, obtaining its similarity from the synonym dictionary if present, and adding it directly to Sall, as shown in the flowchart of FIG. 27, it should be noted that the total similarity may be obtained by searching all words present in the article and in the synonym dictionary for one word in the comparison character area, obtaining the similarity from the synonym dictionary, if any, and adding the sum of (similarity of each synonymous word)×(number of synonymous words present in the article) to Sall.

Herein, it is assumed that the threshold α at step S504 is equal to 0.9.

In the example of FIG. 29, as for a word "semiconductor" in the comparison character area 2203, the word "semiconductor" exists at two sites in the article 2202, and similarly, as for a word "inactivity", two words exist in the article 2202, including "inactivity" at one site, and a word "downward" at one site, wherein 1.0 corresponding to "semiconductor" having high similarity was added to Sall in the first embodiment, but regarding these two words, 1.0×2+1.0×1+ 0.06×1=3.06 is added to Sall in this embodiment.

While in this embodiment, the similarity between character areas is obtained by the presence of a synonymous word, as shown in the flowchart of FIG. 27, it should be noted that the similarity may be concerned with a text expression of politeness of expression. For example, using a dictionary of honor, humility and politeness words, the percentage X of such words present in the text within the article, and the percentage Y of such words present in the comparison character area, are calculated, and the similarity S between the article and comparison character area is obtained according to the following expression.

$$S=1.0-(\text{difference between } X \text{ and } Y) \quad (5)$$

If the similarity S thus obtained is greater than threshold α, the comparison character area is determined to belong to the same group as the article, and is included in the same article.

More specifically, if the percentage of honor, humility and politeness words in the article is 0.25, and the percentage of honor, humility and politeness words in the comparison character area is 0.3, the similarity S is obtained as:

$$S=1.0-(0.3-0.25)=0.95$$

Since this value is greater than threshold α, the comparison character area is determined to be the same article, where the threshold α is 0.8.

While in this embodiment, the similarity between character areas is obtained by the presence of a synonymous word, as shown in the flowchart of FIG. 27, it should be noted that the similarity may be one of text expression, such as a line end expression of a text expression. For example, the percentage that the line end expression of a "です ます" style is obtained from the text in the article and in the comparison character area, and the similarity between character areas may be calculated according to the expression (5).

If the similarity S thus obtained is greater than threshold α, the comparison character area is determined to belong to the same group as the article, and is included in the same article.

More specifically, if the percentage of "です ます" style in the article is 0.5 and the percentage of "です ます" style in the comparison character area is 0.4 the similarity S is calculated as:

$$S=1.0-(0.5-0.4)=0.9$$

Since this value is greater than threshold α, the comparison character area is determined to be in the same article, where threshold α is equal to 0.8.

While in this embodiment, the similarity between character areas is obtained by the presence of a synonymous word, as shown in the flowchart of FIG. 27, it will be appreciated that the similarity may be one of text expression, such as a treatment expression of a text expression.

Herein, the treatment expression indicates a language expression expressing an attitude such as honor, affection or contempt of a talker to a person in conversion. For example, the similarity between character areas may be calculated, according to the expression (5), by obtaining the percentages of treatment expression from the article and the text in the comparison character area, respectively.

If this similarity thus obtained is greater than threshold α, the comparison character area is determined to belong to the same group as the article, and is included in the same article.

More specifically, supposing that the percentage of the treatment expression in the article is 0.2, and the percentage of the treatment expression in the comparison character area is 0.3, the similarity S is $$S=1.0-(0.3-0.2)=0.9$$

Since this value is greater than threshold α, the comparison character area is determined to be the same article, where threshold α is 0.8.

While in this embodiment, the similarity between character areas is obtained by the presence of a synonymous word, as shown in the flowchart of FIG. 27, it will be appreciated that the similarity may be obtained, using the composition percentage for each genre such as kanji, hiragana, katakana, symbol, a number, and an English letter in the character area. For example, the similarity between character areas may be obtained, according to the expression (5), by calculating the percentage of kanji relative to the total number of characters from the text in the article and in the comparison character area.

If this similarity thus obtained is greater than threshold α, the comparison character area is determined to belong to the same group as the article, and is included in the same article.

More specifically, supposing that the percentage of kanji in the article is 0.4, and the percentage of kanji in the comparison character area is 0.3, the similarity S is $$S=1.0-(0.4-0.3)=0.9$$

Since this value is greater than threshold α, the comparison character area is determined to be the same article, where threshold a is 0.8.

While in this embodiment, the similarity was obtained only using the percentage of kanji relative to the total number of characters, it will be appreciated that other genres may be utilized. Also, several genres may be combined.

While in this embodiment, the similarity between character areas was obtained by the presence of a synonymous word, as shown in the flowchart of FIG. 27, it will be appreciated that the similarity may be obtained using the character size, the line length, the character pitch, or the character-to-character gap, which is calculated from the character image in the character area.

For example, the averages X, Y of character size are calculated from the character image in the article and in the composition character area, respectively, and the similarity S is as follows.

$$S=1.0-(\text{difference between } X \text{ and } Y) \div \beta \qquad (6)$$

If the similarity thus obtained is greater than threshold $\alpha$, the comparison character area is determined to belong to the same group as the article, and is included in the article. In an expression (6), $\beta$ is constant.

More specifically, supposing that the average of the character size in the article is 64.5 dots, and the average of the character size in the comparison character area is 59.3 dots, the similarity S is $$S=1.0-(64.5-59.3)\div 100=0.95$$

Since this value is greater than threshold $\alpha$, the comparison character area is determined to be the same article, where threshold $\alpha$ is 0.9 and constant $\beta$ is 100.

While in this embodiment, the similarity between character areas was obtained using the character size, it will be appreciated that the line length, character pitch or character-to-character gap may be of course utilized. Also, some of them may be combined.

While in this embodiment, the similarity between character areas was obtained by the presence of a synonymous word, as shown in the flowchart of FIG. 27, it will be appreciated that the similarity may be obtained using the difference of font between the character areas which is calculated from the character image. For example, the similarity between character areas may be obtained, according to the expression (5), by calculating the percentages of Mincho type relative to the total number of characters from the character image in the article and in the comparison character area.

If this similarity thus obtained is greater than threshold $\alpha$, the comparison character area is determined to belong to the same group as the article, and is included in the same article.

More specifically, supposing that the percentage of Mincho type in the article is 0.9, and the percentage of Mincho type in the comparison character area is 0.91, the similarity S is $$S=1.0-(0.91-0.9)=0.99$$

Since this value is greater than threshold $\alpha$, the comparison character area is determined to be the same article, where threshold $\alpha$ is 0.9.

While in this embodiment, the similarity between character areas was obtained using the percentage of the number of Mincho type characters relative to the total number of characters, it will be understood that the comparison character area may be determined not to belong to the same article, since, for example, the font used in the article is Gothic BBB type, and the font used in the comparison character area is standard width Gothic type, wherein the similarity is equal to 0.

While in this embodiment, the similarity between character areas was obtained using the percentage of the number of Mincho type characters relative to the total number of characters, it will be appreciated that Gothic type and textbook type, as well as oblique type, small Mincho type, and bold Mincho type may be utilized, instead of Mincho type.

While in this embodiment, the similarity between character areas was obtained by the presence of a synonymous word, as shown in the flowchart of FIG. 27, it will be appreciated that the similarity may be obtained using the difference in character inclination between the character areas which is obtained from character images in the character areas. For example, the similarity between character areas may be obtained, according to the expression (6), by calculating the inclination angles from the character images in the article and in the comparison character area.

If this similarity S thus obtained is greater than threshold $\alpha$, the comparison character area is determined to belong to the same group as the article, and is included in the same article.

More specifically, supposing that the inclination angle of article is 0.1°, and the inclination angle of comparison character area is 0.4°, the similarity S is $$S=1.0-(0.4-0.1)\div 90=0$$

Since this value is greater than threshold $\alpha$, the comparison character area is determined to be the same article, where threshold $\alpha$ is 0.9 and constant $\beta$ is 90.

While in this embodiment, the similarity between character areas was obtained by the presence of a synonymous word, as shown in the flowchart of FIG. 27, it will be appreciated that the similarity may be obtained using the difference in set direction which is obtained from the character images in the character areas. For example, the similarity between character areas may be obtained, according to the expression (5), by calculating the percentages of the number of vertical writing characters relative to the total number of characters from the character images in the article and in the comparison character area.

If this similarity S thus obtained is greater than threshold $\alpha$, the comparison character area is determined to belong to the same group as the article, and is included in the same article.

More specifically, supposing that the percentage of vertical writing in the article is 0.9, and the percentage of vertical writing in the comparison character area is 0.91, the similarity S is $$S=1.0-(0.91-0.9)=0.99$$

Since this value is greater than threshold $\alpha$, the comparison character area is determined to be the same article, where threshold $\alpha$ is 0.9.

While in this embodiment, the similarity between character areas was obtained using the percentage of the number of vertical writing characters relative to the total number of characters, it will be understood that the comparison character area may be determined not to belong to the same article, since, for example, the set direction for the article is vertical writing, and the set direction for the comparison character area is lateral writing, wherein the similarity is equal to 0.

While in this embodiment, the similarity between character areas was obtained using the percentage of the number of vertical writing characters relative to the total number of characters, it will be appreciated that the similarity may be obtained using the percentage of the number of vertical writing lines relative to the total number of lines.

While in this embodiment, an image is input from the scanner, and the character area, the figure area and separator area in the image are taken by area division method, as an example of step S101, it should be understood that data having a plurality of character areas such as DTP may be utilized.

While in this embodiment, the article was obtained using the similarity between character areas in the grouping at step S103, as shown at step S2501, it should be understood that the article may be obtained by first dividing the image according to an area other than character area, such as a long separator, a figure or a table and using the similarity from among character areas belonging to individual divided areas.

While in this embodiment, the article was obtained using the similarity between character areas in the grouping at step S103, as shown at step S2501, it should be understood that the article may be obtained using the similarity, in first dividing an image into areas, according to other than a character area, such as a long separator, a figure or a table, when it is impossible to determine the area, e.g., a character area existing on the extension of a separator, whether it is to be included in one area or another area.

[Embodiment 3]

This embodiment is one in which the ordering of character areas is performed according to the connectivity between each character area which can be judged according to the contents or connection information.

Figure 31:
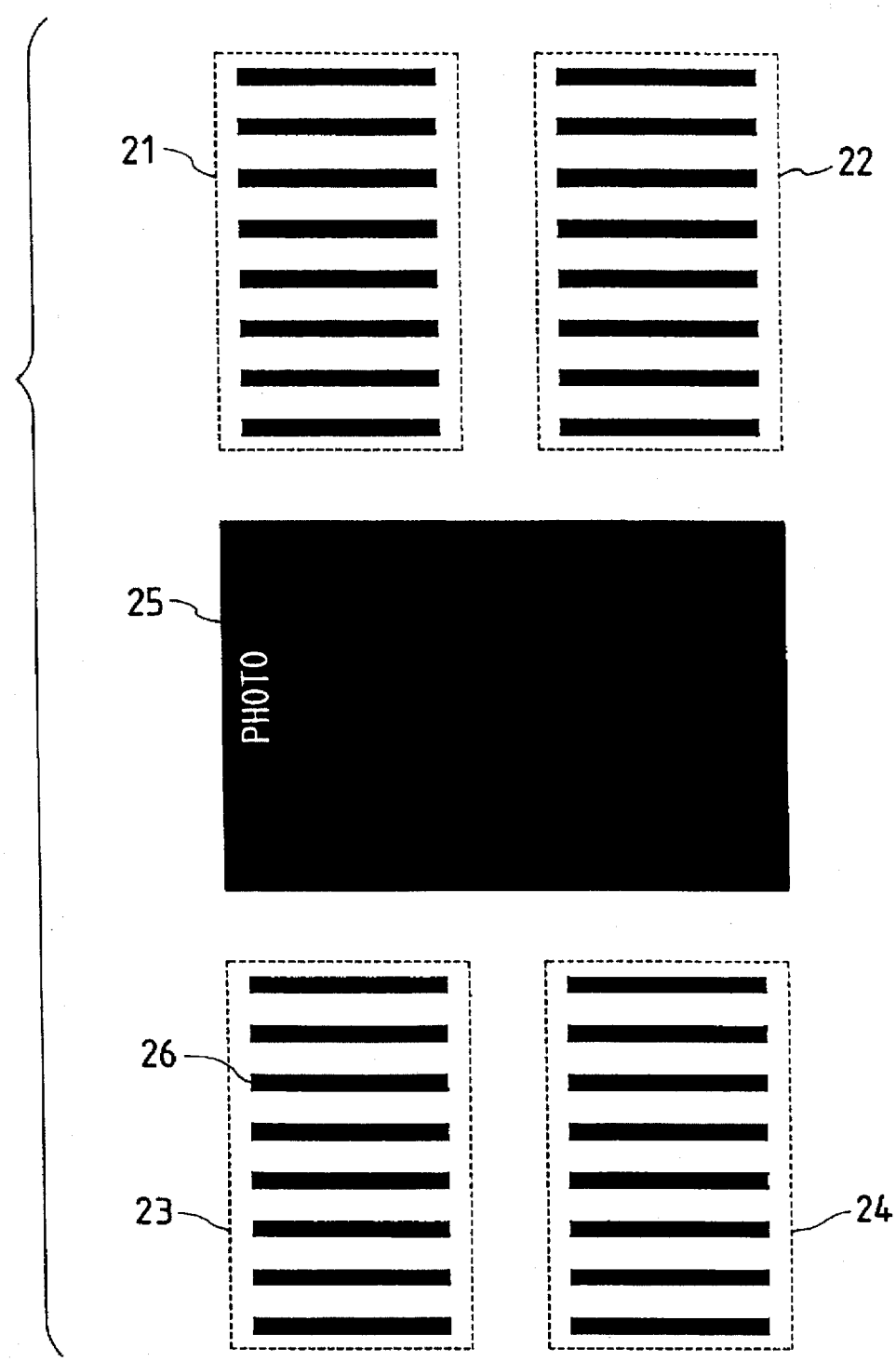
FIG. 31 is an exemplary diagram of an original.

FIG. 31 is an example of an original image input from a scanner 1004 or a memory such as FD 1009, this image data being stored in a RAM 1003.

For an input original image, the histogram of an entire image in vertical or horizontal direction is taken, and the character area, where character strings or texts are clustered to some extent, is extracted by analyzing the result, wherein the positional information of the extracted area is stored in the RAM 1003, and later in performing the analysis processing of the image for each area, the image information designated by the positional information of this area is retrieved from the RAM 1003. 21, 22, 23, 24 are extracted character areas.

25 is a photo area.

A judgement process of continuity will be described below in connection with a flowchart of FIG. 30.

(1) Step S301

Two character areas A and B which are continuous or desired to be investigated are taken out (for checking the continuity from A to B), wherein it is supposed that A is a primary character area and B is a comparison character area.

In the example of FIG. 31, it is not possible to determine whether the character area following a character area 21 is a character area 22 right adjacent the primary character area 21, or a character area 23 below the primary character area 21, from its position. Thus, it is necessary to investigate the continuity between character area 21 and character area 22, as well as between character area 21 and character area 23. Herein, to first investigate the continuity between character area 21 and character area 22, these two areas are taken out, wherein the character area 21 is a primary character area and the character area 22 is a comparison character area. Herein, the determination of a primary character area can be effected successively from the area closer to a starting point which is defined at the right upper side if the text in each of a plurality of character areas extracted from the input image is vertical writing, or at the left upper side if the text in each character area is lateral writing. Also, the determination of a compari-son character area can be effected as a vertical writing character area on the lower left side if the primary character area is vertical writing, or a lateral writing character area on the lower right side if the primary character area is lateral writing.

(2) Step S3002

The continuity from the primary character area to the comparison character area is then obtained. A variety of ways of obtaining the continuity C will be described later in detail.

(3) Step S3003

The continuity C is compared with threshold $\alpha$.

$$C \geq \alpha$$

If the above inequality is satisfied, the program proceeds to step S3004. Also, if not satisfied, the program proceeds to step S3005. Herein, threshold $\alpha$ is assumed to be 1.0.

Figure 32:
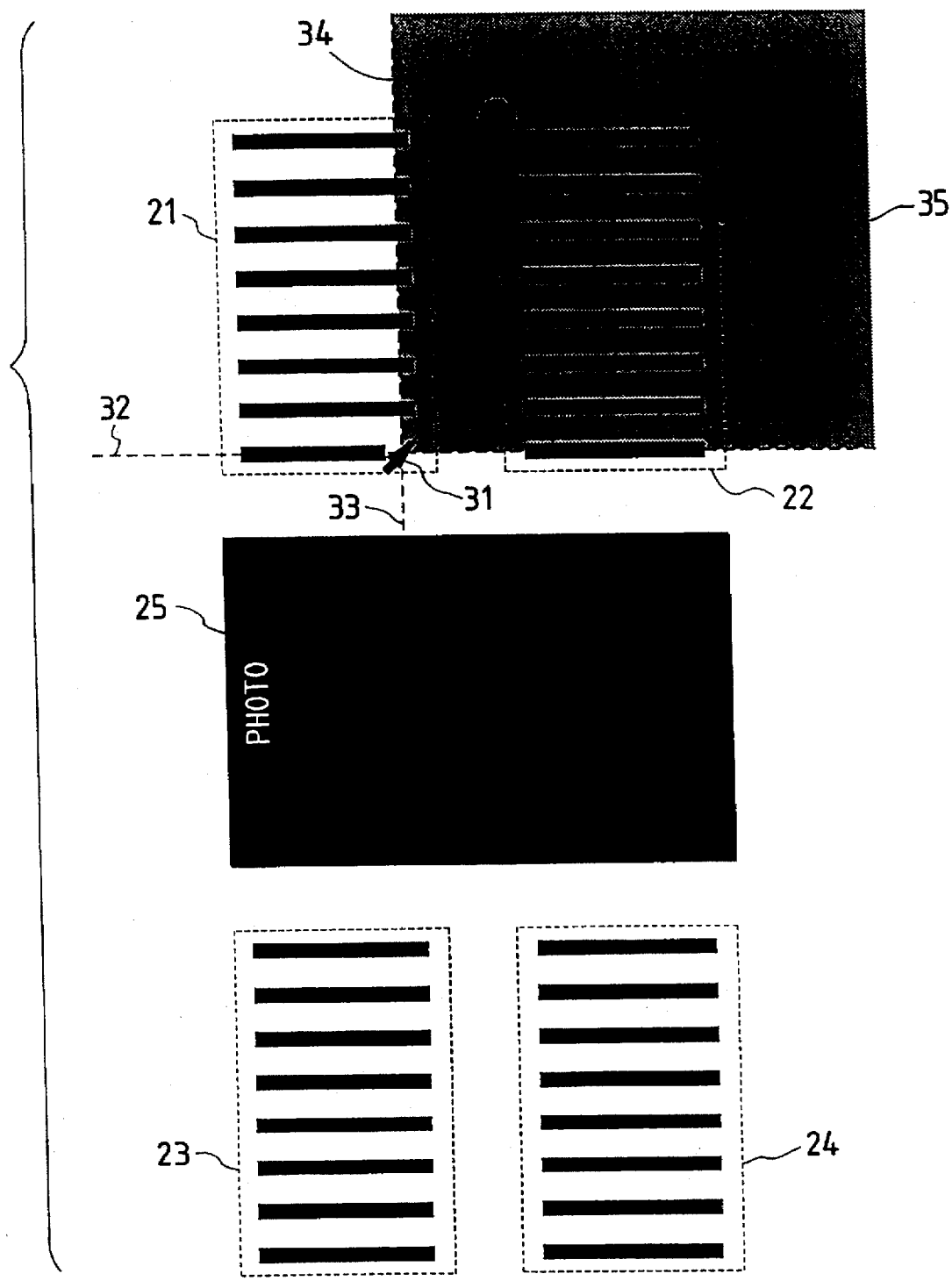
FIG. 32 is a view showing the arrow in the original with the direction of arrow.

In an example of FIG. 32, the continuity C is equal to 1.0, wherein the above inequality can be satisfied, and thus the program proceeds to step S3004.

(4) Step S3004

Determines to be "continuous".

In the example of FIG. 32, "continuous" is determined.

(5) Step S3005

Determines to be "noncontinuous".

When the primary character area is character area 21 and the comparison character area is character area 23, the continuity is similarly judged.

In this way, all candidate character areas for comparison character area B are judged for the continuity, wherein if only one character area is judged to be "continuous", that character area is determined to be a continuous area to the primary character area, or if two or more character areas are judged to be "continuous", the area having the greatest continuity C among them is determined to be a continuous area, or if area is judged to be "continuous", it is determined that the continuous area group is completed with that primary character area.

With the above, the ordering process is ended.

In this way, by repeating such a process for judging the continuity for each character area while updating the primary character area A, all the character areas extracted from the input original image (or all the character areas designated as a processing object) can be judged for continuity, whereby it is possible to connect the recognition results of groups of characters contained in each character area in determined order and display the recognition results of an input original image in a text format.

In the following, various examples of how to obtain the continuity C at step S3003 are described in detail in connection with a case where the primary character area A is area 21 and the comparison character area B is area 22.

FIG. 32 is a view showing an instance where the last character in the character area 21 of the original image as shown in FIG. 31 is the arrow. In the figure, 31 is the arrow.

32, 33 are rectangular coordinate axes having the origin at the arrow.

34 is a point at the left upper corner in the character area 22.

35 is a right upper section of the arrow, i.e., a first quadrant of a rectangular coordinate system consisting of the coordinate axes 32, 33.

Figure 33:
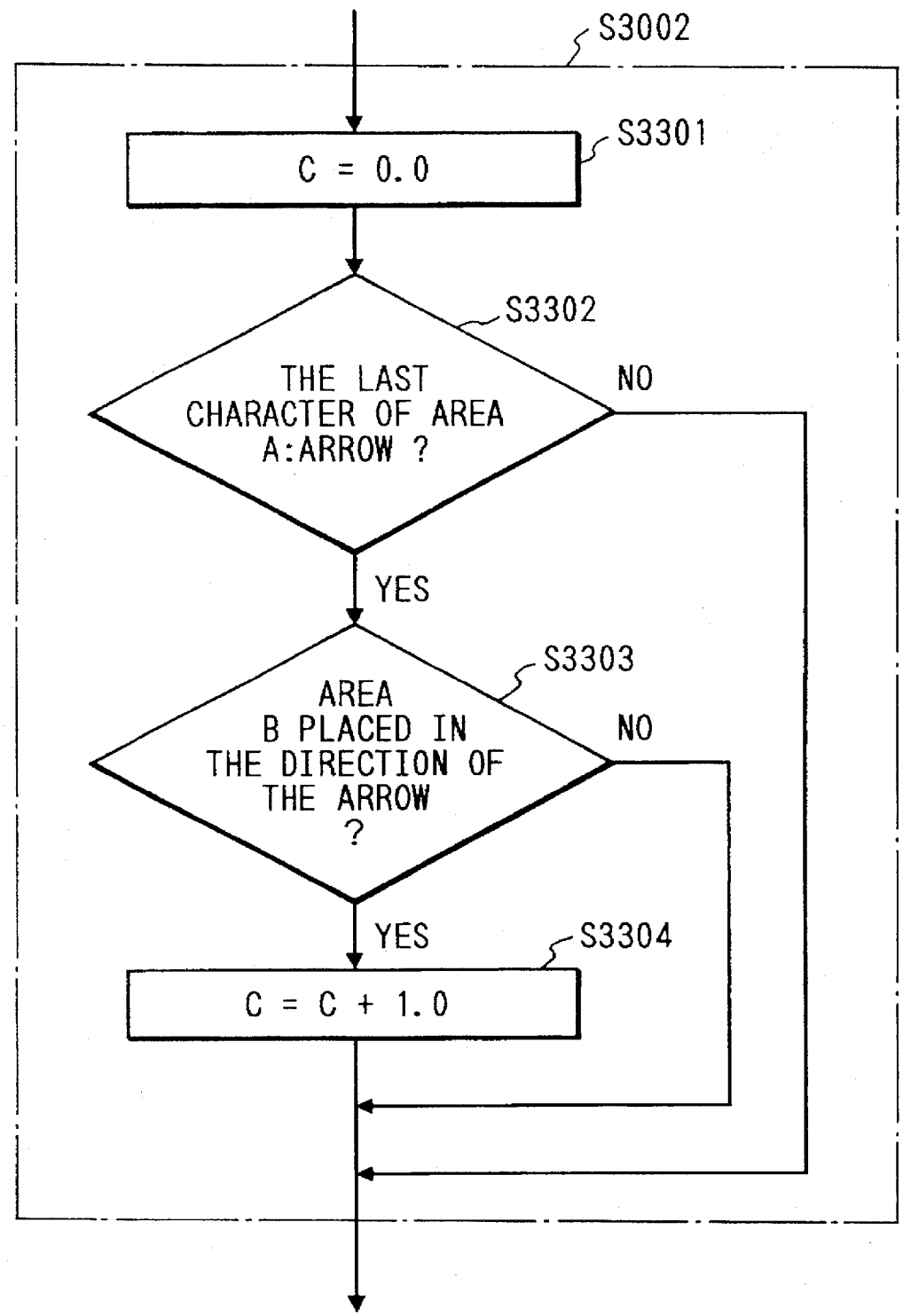
FIG. 33 is a flowchart of a process for obtaining the continuity C from the arrow.

FIG. 33 is a flowchart of processing in detail in a first example of how to obtain the continuity C at step S3002.

Referring now to the flowchart of FIG. 33, step S3002 is described below.

First, at step S3301, 0.0 is substituted into the continuity C for initialization.

Then, at step S3302, a check is performed to see whether or not the last character of primary character area A is the arrow. If it is the arrow, the program proceeds to step S3303. Or otherwise, step S3002 is ended. That is, the continuity remains 0.0 or is not changed.

In the example of FIG. 32, a check is performed to see whether or not the last character is the arrow, when the primary character area is character area 21. The last character an arrow pointing right upward, as indicated by the arrow 31 in FIG. 32, and the program proceeds to step S3303.

Then, at step S3303, a check is performed to see whether or not there is comparison character area B in the direction of the arrow. If the comparison character area exists in the direction of the arrow, the program proceeds to step S3304. Otherwise, step S3002 is ended. That is, the continuity remains 0.0 or is not changed.

In the example of FIG. 32, since the arrow 31 is a right upward pointing arrow, and thus point 34 at the left upper corner of character area 22 (or left upper corner of character area in case of lateral writing) falls within the first quadrant of a rectangular coordinate system with its origin at the arrow, the comparison character area 22 is determined to be in the direction of the arrow, and the program proceeds to step S3304.

At step S3304, the continuity is increased by adding 1.0 to it.

In the example of FIG. 32, the continuity C is equal to 1.0 as 1.0 plus 0.0.

With the above, step S3002 is ended.

While in the example of FIG. 33 as shown by the flowchart, the continuity between character areas was increased by the last arrow of the character area, it will be appreciated that the continuity for the character area first indented may be increased if a punctuation mark or period exists at the last of character area.

In the following, the way of obtaining the continuity C is described in detail.

Figure 34:
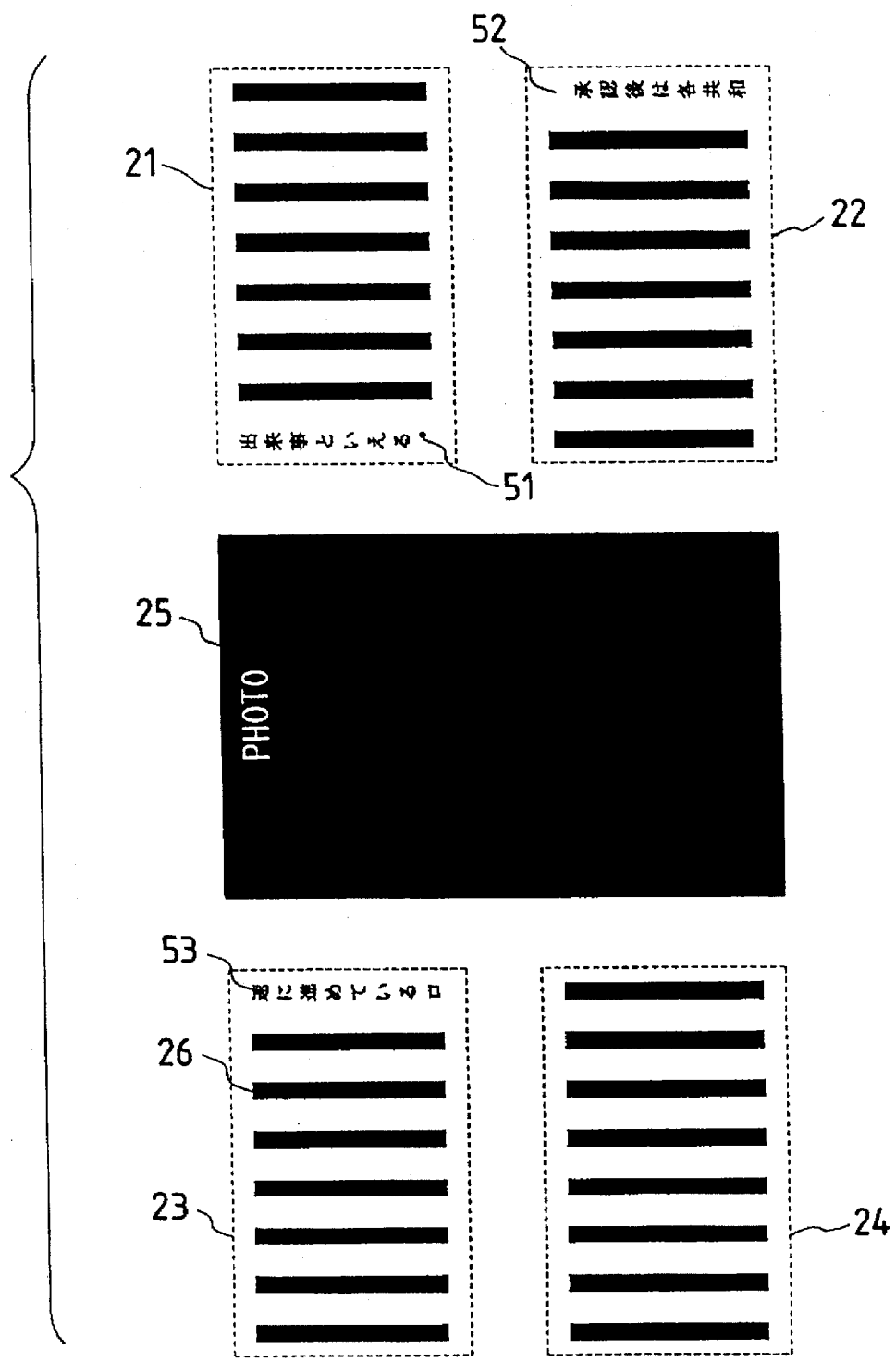
FIG. 34 is an original example for explaining the process of FIG. 35.

FIG. 34 is a view showing first or last characters in the character areas 21, 22, 23 of original image as shown in FIG. 31. In the figure, 51 is a last character or punctuation mark of character area 21.

52 is a first indented part of character area 22.

53 is a first character 「述」 of character area 23.

Figure 35:
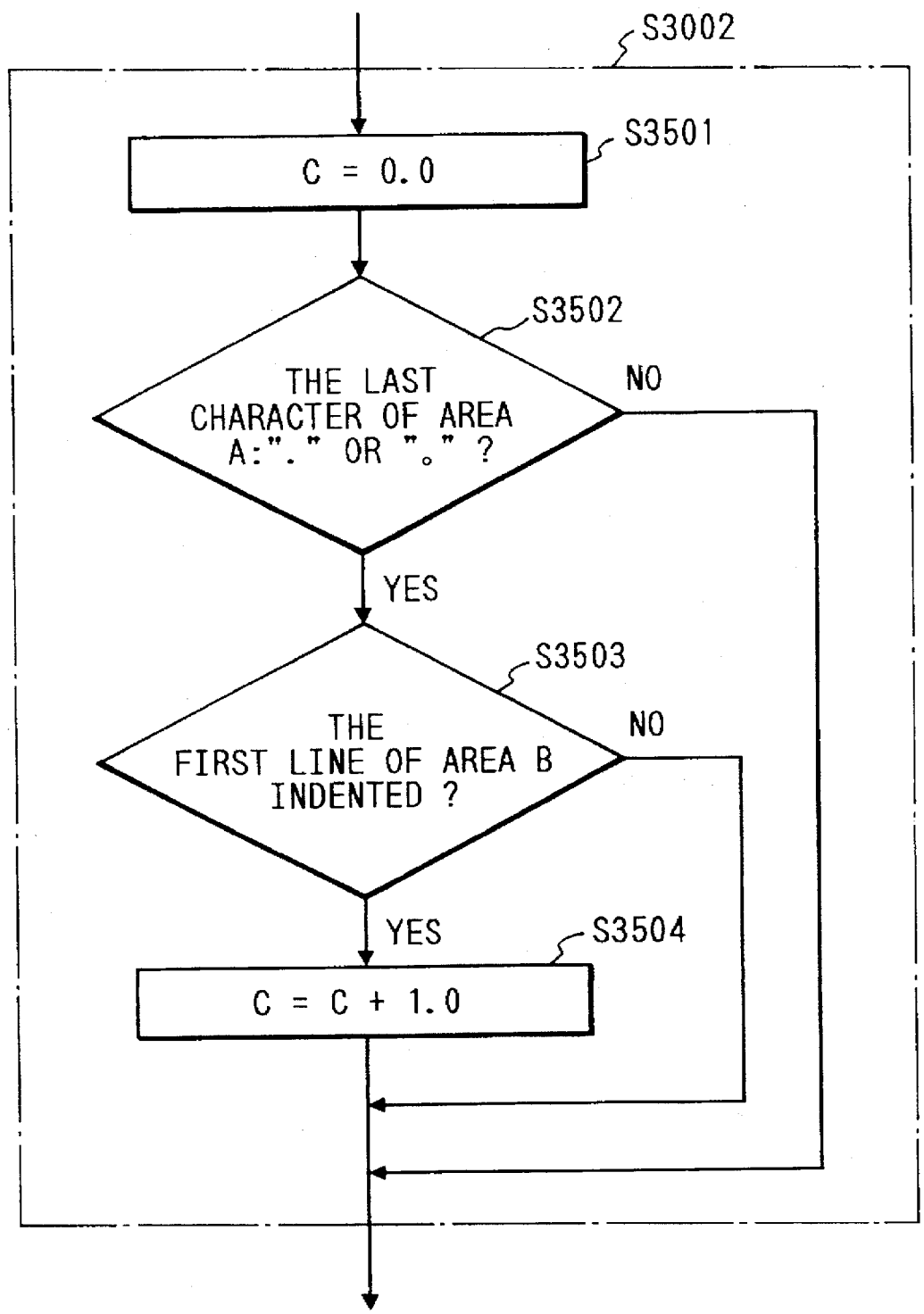
FIG. 35 is a flowchart of a process for obtaining the continuity C from the period and an indent.

FIG. 35 is a flowchart of processing in detail in a second example at step S3002.

Referring now to the flowchart of FIG. 35, step S3002 is described below.

First, at step S3501, 0.0 is substituted into the continuity C for initialization.

Then, at step S3502, a check is performed to see whether or not the last character of the primary character area is a punctuation mark or period. If it is punctuation mark or period, the program proceeds to step S3503. Or otherwise, step S3002 is ended.

In the example of FIG. 34, since in the case where the primary character area is character area 21 and the comparison character area is character area 22, the last part of primary character area 21 is ended with the punctuation mark 51, the program proceeds to step S3503.

At step S3503, a check is performed to see whether or not the first part of the comparison character area is indented. If indented, the program proceeds to step S3504. Otherwise, step S3002 is ended.

In the example of FIG. 34, since the first part of comparison character area 22 is indented, the program proceeds to step S3504.

At step S3504, the continuity is increased by adding 1.0 to it.

In the example of FIG. 34, the continuity C is equal to 1.0 as 1.0 plus 0.0.

Thereafter, at step S3003, the continuity C is compared with a threshold, and then the program proceeds to step S3004, to determine that the primary character area 21 and the comparison character area 22 are continuous.

Likewise, the case where the primary character area A is character area 21 and the comparison character area B is character area 23 will be described below. In this case, since the first part of comparison character area 23 is a character 53, and not indented, NO is determined at step S3503, and thereby step S3002 is ended, and the program proceeds to step S3003.

Since the continuity C remains 0.0, the program proceeds to step S3005, to determine that the primary character area 21 and the comparison character area 23 are not continuous.

Next, a third example of how to obtain the continuity C will be described, in which the continuity is increased, when the first sentence for an other character area to be compared begins with a particle, where the primary character area ends with a noun.

Figure 36:
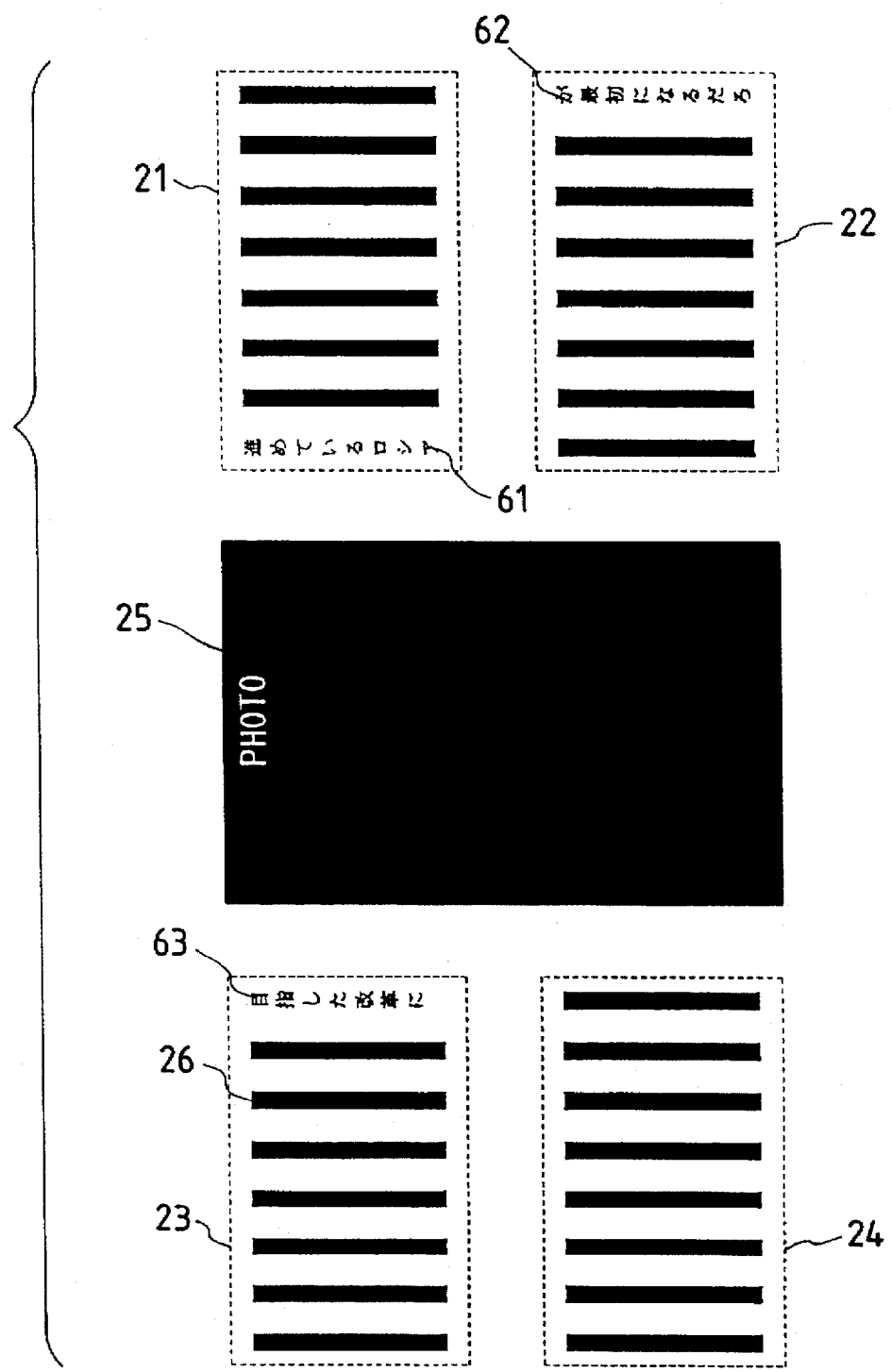
FIG. 36 is an original example for explaining a process of FIG. 37.

FIG. 36 is a view showing first or last characters in the character areas 21, 22, 23 of original image as shown in FIG. 31. In the figure, 61 is a last character of character area 21 or a noun 「ロシア」. 62 is a first character of character area 22 or a particle 「が」. 63 is a first character part of character area 23.

Figure 37:
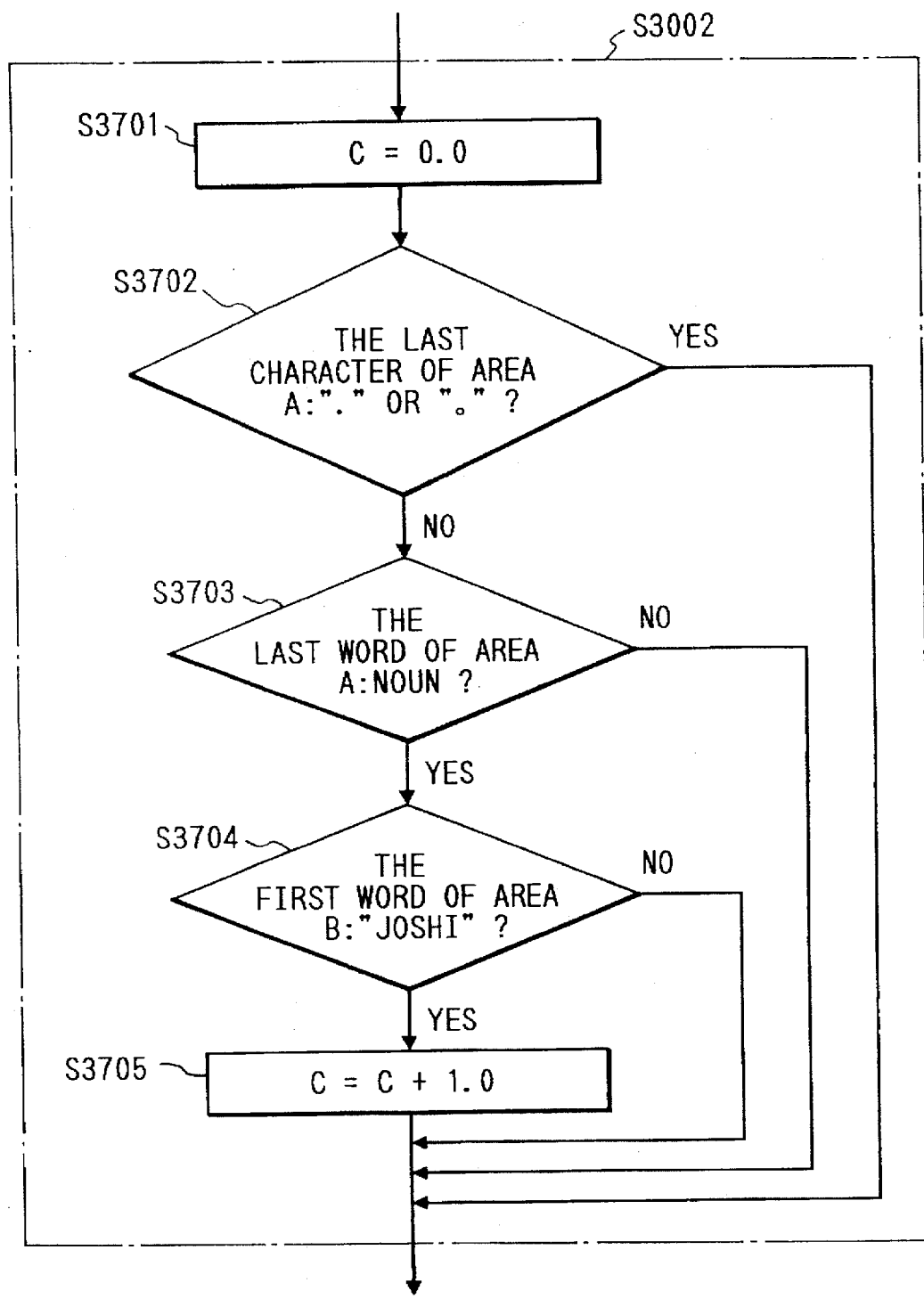
FIG. 37 is a flowchart of a process for obtaining the continuity C from a part of speech.

FIG. 37 is a flowchart of processing, in detail, in this example at step S3002.

Referring now to the flowchart of FIG. 37, step S3002 is described below.

First, at step S3701, 0.0 is substituted into the continuity C for initialization.

Then, at step S3702, a check is performed to see whether or not the last character of the primary character area is a punctuation mark or period. If it is punctuation mark or period, step S3002 is ended. Or otherwise, the program proceeds to step S3703.

In the example of FIG. 36, since the last of primary character area 21 which is character area 21 is neither a punctuation mark nor period, the program proceeds to step S3703.

At step S3703, a check is performed to see whether or not the primary character area ends with a noun. If it is, the program proceeds to step S3704. If not, step S3002 is ended.

In the example of FIG. 36, since the last part of the primary character area 21 is noun 61 「ロシア」, the program proceeds to step S3704.

At step S3704, a check is performed to see whether or not the comparison character area begins with a particle. If it begins with the particle, the program proceeds to step S3705. If not, step S3002 is ended.

In the example of FIG. 36, since the comparison character area which is character area 22 begins with particle 62 「が」, the program proceeds to step S3705.

At step S3705, the continuity C is increased by adding 1.0 to it.

In the example of FIG. 36, the continuity C is equal to 1.0 as 1.0 plus 0.0. As a result of determination at step S3003, the program proceeds to step S3004 to determine that the character areas 21 and 22 are continuous.

Similarly, the comparison character area which is character area 23 begins with a character 63 or 「日」, which is not a particle, step S3002 is ended, with the continuity C equal to 0.0, and it is determined that the character areas 21 and 23 are not continuous.

Next, a fourth example of how to obtain the continuity C will be described, in which the continuity is increased when the first sentence for another character area to be compared does not contain a subject but contains a predicate, where the last sentence of a different character area contains a subject but does not contain a predicate.

In the following, the fourth example of how to obtain the continuity C will be described in detail.

Figure 38:
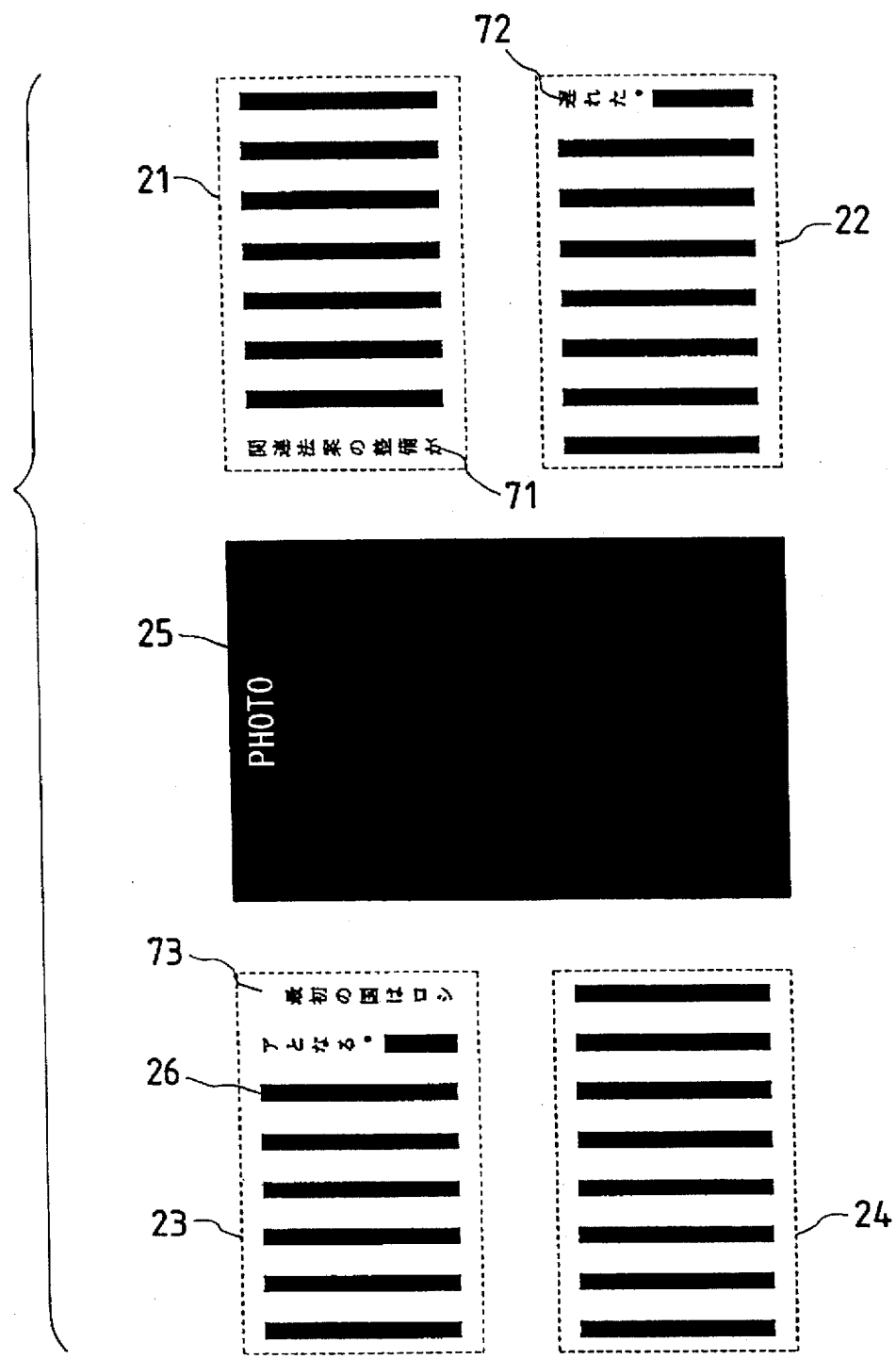
FIG. 38 is an original example for explaining the process of FIG. 39.

FIG. 38 is a view showing first or last characters in the character areas 21, 22, 23 of original image as shown in FIG. 31. In the figure, 71 is a last sentence 「関連法 案の整備が」 of character area 21. 72 is a first sentence 「遅れた」 of character area 22. 73 is a first sentence 「最初の 国はロシアとなる」 of character area 23.

Figure 39:
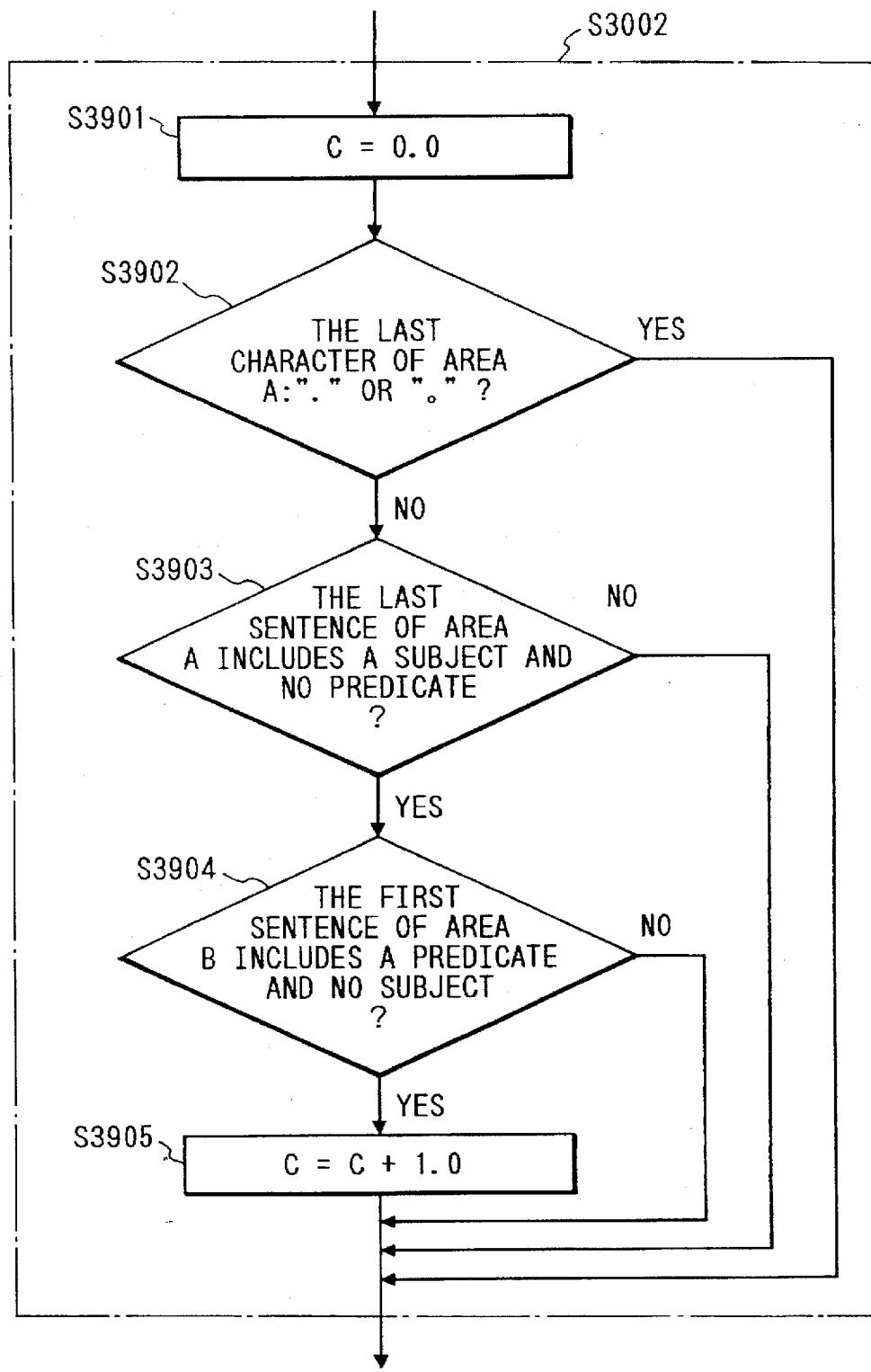
FIG. 39 is a flowchart for obtaining the continuity C from the relation between subject and predicate.

FIG. 39 is a flowchart of processing in detail in this example at step S3002.

Referring now to the flowchart of FIG. 39, step S3002 is described below.

First, at step S3901, 0.0 is substituted into the continuity C for initialization.

Then, at step S3902, a check is performed to see whether or not the last character of the primary character area is a punctuation mark or a period. If it is a punctuation mark or period, step 3002 is ended. Or otherwise, the program proceeds to step S3903.

In the example of FIG. 38, since the last part of primary character area 21 which is character area 21 is neither a punctuation mark nor a period, the program proceeds to step S3903.

At step S3903, a check is performed to see whether or not the last sentence of the primary character area contains a subject but does not contain a predicate. If so, the program proceeds to step S3904. If not, step S3002 is ended.

In the example of FIG. 38, since the last sentence 71 of primary character area 21 contains a subject but does not contain a predicate, the program proceeds to step S3904.

At step S3904, a check is performed to see whether or not the first sentence of the comparison character area does not contain a subject but contains a predicate. If so, the program proceeds to step S3905. If not, step S3002 is ended.

In the example of FIG. 38, since the first sentence 72 of primary character area which is character area 22 does not contain a subject but contains a predicate, the program proceeds to step S3905.

At step S3905, the continuity C is increased by adding 1.0 to it.

In the example of FIG. 38, the continuity C is equal to 1.0 as 1.0 plus 0.0. As a result of the determination at step S3003, the program proceeds to step S3004 to determine that the character areas 21 and 22 are continuous.

Similarly, where the comparison character area is character area 23, the first sentence 73 contains subject at step S3904, and thus step S3002 is ended. The continuity C equal to 0.0, and as a result of the determination, the program proceeds to step S3005 to determine that the character areas 21 and 23 are not continuous.

Next, a fifth example of how to obtain the continuity C will be described in which the certainty as the sentence is increased when the first sentence for other character area to be compared does not contain a subject but contains a predicate, where the last sentence of the character area contains a subject but does not contain a predicate.

In the following, this example of how to obtain the continuity C will be described in detail.

Figure 40:
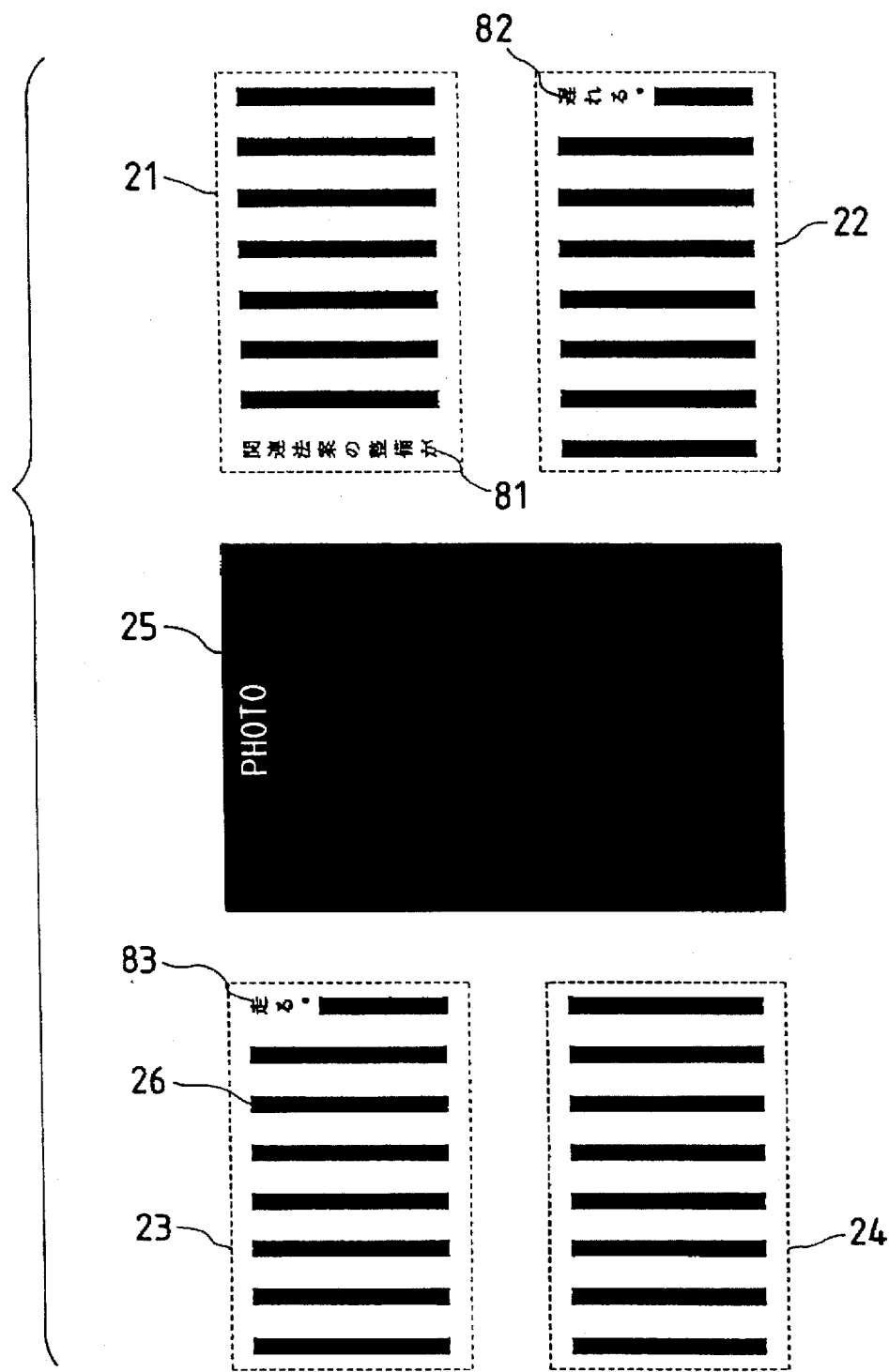
FIG. 40 is an original example for explaining the process of FIG. 41.

FIG. 40 is a view showing first or last characters in the character areas 21, 22, 23 of original image as shown in FIG. 31. In the figure, 81 is a last sentence 「関連法 案の整備が」 of character area 21. 82 is a first sentence 「遅れる。」 of character area 22. 83 is a first sentence of character area 23.

Figure 41:
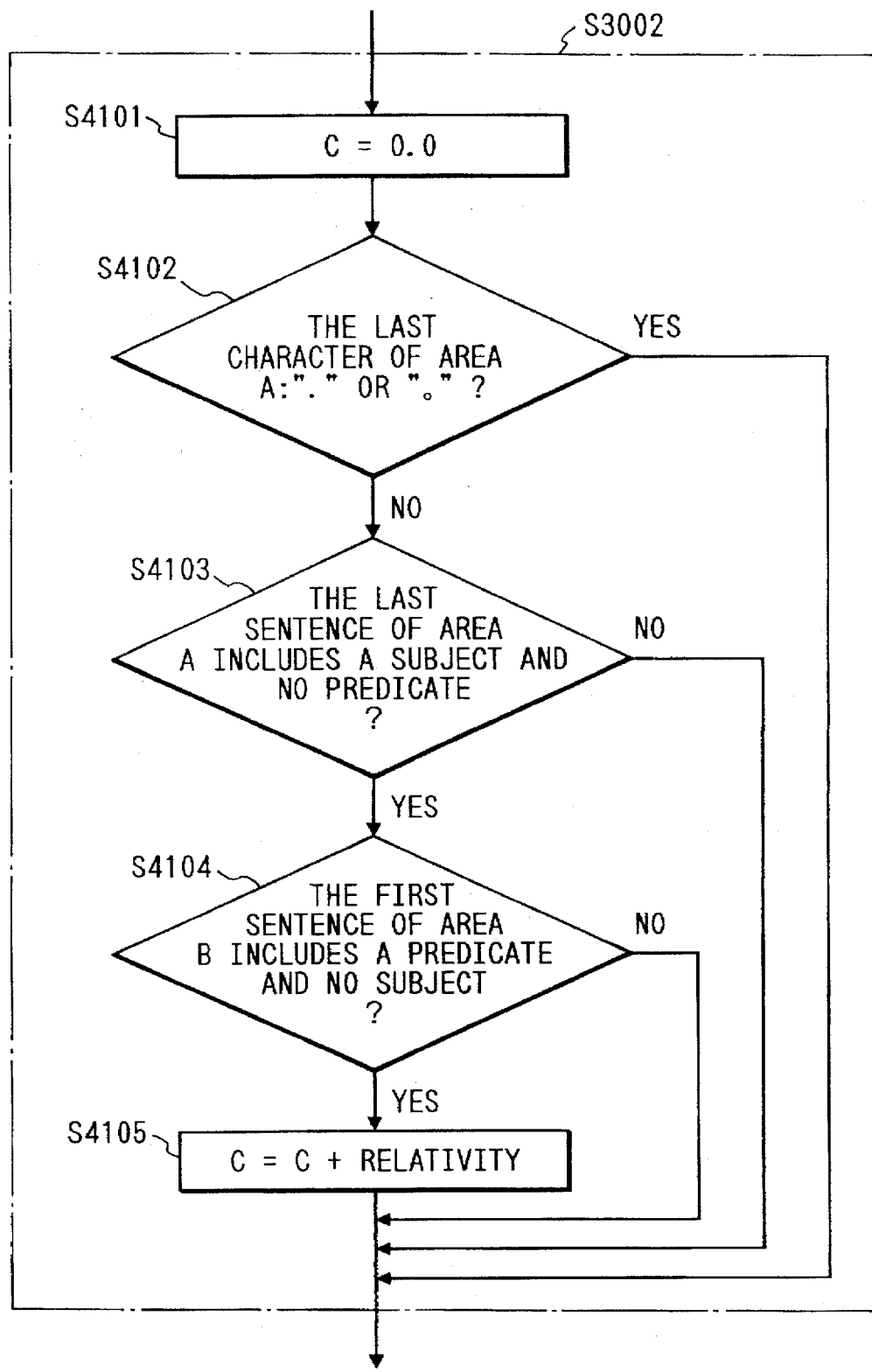
FIG. 41 is a flowchart for obtaining the continuity C.

FIG. 41 is a detailed flowchart of processing in this example at step S3002.

FIG. 42 is a part of a relativity data dictionary between a subject and a predicate.

Referring now to the flowchart of FIG. 41, step S3002 is described below.

First, at step S4101, 0.0 is substituted into the continuity C for initialization.

Then, at step S4102, a check is performed to see whether or not the last character of the primary character area is a punctuation mark or a period. If it is a punctuation mark or a period, step S3002 is ended. Or otherwise, the program proceeds to step S4103.

In the example of FIG. 40, since the last part of the primary character area which is character area 21 is neither a punctuation mark nor a period, the program proceeds to step S4103.

At step S4103, a check is performed to see whether or not the last sentence of the primary character area contains a subject but does not contain a predicate. If so, the program proceeds to step S4104. If not, step S3002 is ended.

In the example of FIG. 40, since the last sentence 81 of primary character area 21 contains a subject but does not contain a predicate, the program proceeds to step S4104.

At step S4104, a check is performed to see whether or not the first sentence of a comparison character area does not contain a subject but contains a predicate. If so, the program proceeds to step S4105. If not, step S3002 is ended.

In the example of FIG. 40, since the first sentence 72 of the primary character area which is character area 22 does not contain subject but contains predicate, the program proceeds to step S4105.

At step S4105, the continuity C is increased by adding the relativity between the subject and the predicate to it.

In the example of FIG. 40, it can be found that the relativity is equal to 1.25 from relativity data as shown in FIG. 25, because the subject is 「整備が」, and the predicate is 「走る」. Thus, the continuity C is equal to 1.25 by adding 1.25 to 0.0. As a result of the determination at step S103, the program proceeds to step S3004 to determine that the character areas 21 and 22 are continuous.

Similarly, where the comparison character area is character area 23, because the subject is 「整備が」 and the predicate of the first sentence 83 is 「走る」, the relativity therebetween is not listed in the relativity data as shown in FIG. 42. When not listed, the relativity is equal to 0.0, wherein the continuity C remains 0.0 by adding 0.0. As a result of determination at step S3003, the program proceeds to step S3005 to determine that the character areas 21 and 22 are not continuous.

Although in the example of the flowchart as shown in FIG. 32, the continuity C between character areas was increased by the arrow at the last of character area, a sixth example of how to obtain the continuity C will be next described in which the continuity C between character areas is obtained using the presence of a word or a synonymous word commonly existing between character areas.

In the following, this example of how to obtain the continuity C will be described in detail.

FIG. 43 is a view showing all the characters in the character areas 21, 22, 23 of original image as shown in FIG. 31.

FIG. 44 is a flowchart of processing in detail at step S3002.

Referring now to the flowchart of FIG. 44, the processing is described below.

First, at step S4401, 0.0 is substituted into the continuity C for initialization.

Then, at step S4402, the percentage R of the same or synonymous words in the comparison character area as words in the primary character area relative to the total number of words in the comparison character area is calculated and added to C to increase the continuity.

In the example of FIG. 43, when the comparison character area is character area 22, the same or synonymous words in the comparison character area 22 as words in the primary character area 21 are taken out, and counted, whereby it will be found that there are:

「経済」: three locations

「改革」: one location

「旧ソ連諸国」 as the synonymous word of 「ロシア」: one location.

Since as for 「ロシア」, two words exist in the primary character area, it is counted as two, so that the total is equal to 3+1+2=6

Since the total number of words in the comparison character area 22 is 23, its percentage is

6÷23=0.26

The continuity C is equal to 0.26 by adding 0.26 to it.
With the above, step S3002 is ended.

Then, at step S3003, the continuity C is compared with threshold α. If it is equal to or more than threshold α, the program proceeds to step S3004, or if it is below threshold α, the program proceeds to step S3005. Herein, the threshold is equal to 0.20.

In the example of FIG. 43, the program proceeds to step S3004, because the continuity C is 0.26.

At step S3004, it is determined that the primary character area and the comparison character area are continuous.

Likewise, where the comparison character area is character area 23, the same or synonymous words as words in the primary character area 21 are taken out and counted, whereby it will be found that there are:

「経済」: two locations

「改革」: one location

Accordingly, the total is equal to 2+1=3.

Since the total number of words in the comparison character area 23 is 19, its percentage is

3÷19=0.16

The continuity C is equal to 0.16 by adding 0.16 to it.
With the above, step S3002 is ended.

Then, at step S3003, the continuity C is compared with threshold α. Since the continuity C is 0.16, the program proceeds to step S3005.

At step S3005, it is determined that the primary character area and the comparison character area are not continuous.

Next, a seventh example of how to obtain the continuity C between character areas using the similarity of text expression, especially the similarity concerning the politeness.

In the following, this example of how to obtain the continuity C will be described in detail.

FIG. 45 is a flowchart of processing in detail at step S3002.

Referring now to the flowchart of FIG. 45, the processing is described below.

First, at step S4501, 0.0 is substituted into the continuity C for initialization.

Then, at step S4502, the similarity S concerning the politeness of text expression in the primary character area and in the comparison character area is calculated and added to C to increase the continuity.

For example, using dictionaries of honor words, humility words, and politeness words, the percentage X of them existing in the primary character area, and the percentage Y of them existing in the comparison character area are calculated, and the similarity S between the primary character area and the comparison character area is obtained according to the following expression (7).

$$S=1.0-(\text{difference between } X \text{ and } Y) \quad (7)$$

Then, the continuity C is added to the similarity S.

If the continuity C thus obtained is greater than threshold α, it is determined that the primary character area and the comparison character area are continuous.

More specifically, supposing that the percentage of honor words, humility words and politeness words in the primary character area is 0.25, and the percentage of honor words, humility words and politeness words is 0.3, the similarity S is $$S=1.0-(0.3-0.25)=0.95$$

The continuity C is equal to 0.95 by adding the similarity S to it.

With the above, step S3002 is ended, and the program proceeds to step S3003.

Then, at step S3003, the continuity C is compared with threshold α. If it is equal to or more than threshold α, the program proceeds to step S3004, or if it is below threshold α, the program proceeds to step S3005. Herein, the threshold is equal to 0.8.

In this example, since the continuity C is greater than the threshold, the program proceeds to step S3004 to determine that the primary character area and the comparison character area are continuous.

While in the example of the flowchart as shown in FIG. 45, the similarity between character areas is obtained using the similarity regarding the politeness of text expression, it should be noted that the similarity may be obtained using the similarity regarding the line end expression.

For example, the similarity between character areas may be obtained, according to the expression (7), by calculating the percentages that the line end expression is 「でます」 style from the texts in the primary character area and in the comparison character area, respectively.

Then, the similarity S is added to the continuity C.

If this continuity obtained is greater than threshold α, it is determined that the primary character area and the comparison character area are continuous.

More specifically, supposing that the percentage of 「でます」 style in the primary character area is 0.5 and the percentage of 「でます」 style in the comparison character area is 0.4, the similarity S is $$S=1.0-(0.5-0.4)=0.9$$

Then, the continuity C is equal to 0.9 by adding the similarity S to the continuity C.

If this continuity is greater than threshold α, it is determined that the primary character area and the comparison character area are continuous. Herein, the threshold α is 0.8.

While in the example as shown in the flowchart of FIG. 45, the similarity between character areas is obtained using the similarity regarding the politeness of text expression, it should be noted that the similarity may be obtained regarding the treatment expression. Herein, by the treatment expression is meant the language expression representing the attitudes such as honor, affection, and contempt of the talker to the person in conversation.

For example, the similarity between character areas may be obtained, according to the expression (7), by calculating the percentages of treatment expression from the texts in the primary character area and in the comparison character area, respectively.

Then, the similarity S is added to the continuity C.

If this continuity C is greater than threshold $\alpha$, it is determined that the primary character area and the comparison character area are continuous.

More specifically, supposing that the percentage of treatment expression in the primary character area is 0.2 and the percentage of treatment expression in the comparison character area is 0.3, the similarity S is $$S=1.0-(0.3-0.2)=0.9$$

Then, the continuity C is equal to 0.9 by adding the similarity S to the continuity C.

If this continuity C is greater than threshold $\alpha$, it is determined that the primary character area and the comparison character area are continuous. Herein, threshold $\alpha$ is 0.8.

While in the example as shown in the flowchart of FIG. 45, the similarity between character areas is obtained using the similarity regarding the politeness of text expression, it should be noted that the similarity may be obtained using the percentage of composition for each genre such as kanji, hiragana, katakana, symbol, number, and English character in the character area.

For example, the similarity may be obtained, according to the expression (7), by calculating the percentages of kanji relative to the total number of characters from the texts in the primary character area and in the comparison character area, respectively.

Then, the similarity S is added to the continuity C.

If this continuity C is greater than threshold $\alpha$, it is determined that the primary character area and the comparison character area are continuous.

More specifically, supposing that the percentage of kanji in the primary character area is 0.4 and the percentage of kanji in the comparison character area is 0.3, the similarity S is $$S=1.0-(0.4-0.3)=0.9$$

Then, the continuity C is equal to 0.9 by adding the similarity S to the continuity C.

If this continuity C is greater than threshold $\alpha$, it is determined that the primary character area and the comparison character area are continuous. Herein, threshold $\alpha$ is 0.8.

Instead of the example as above of obtaining the similarity only using the percentage of kanji relative to the total number of characters, the similarity may be obtained using the character size, the line length, the character pitch, the line pitch, the character-to-character gap, and the line-to-line gap, which can be calculated from the character image in the character area.

For example, if the averages X, Y of the character size from the character images in the primary character area and in the comparison character area are calculated, respectively, the similarity S can be obtained as follows.

$$S=1.0-(\text{difference between } X \text{ and } Y)\div\beta \qquad (8)$$

Then, the similarity S is added to the continuity C. In an expression (8), $\beta$ is constant.

If this continuity C is greater than threshold $\alpha$, it is determined that the primary character area and the comparison character area are continuous.

More specifically, supposing that the average of character size in the primary character area is 64.5 dots, and the average of character size in the comparison character area is 59.3 dots, the similarity S is $$S=1.0-(64.5-59.3)\div 100=0.95$$

Then, the continuity C is equal to 0.95 by adding the similarity S to the continuity C.

If this continuity C is greater than threshold $\alpha$, it is determined that the primary character area and the comparison character area are continuous. Herein, threshold $\alpha$ is 0.8, and constant $\beta$ is 100.

Instead of the example as above of obtaining the similarity between character areas using the character size, it is of course possible to utilize the line length, the character pitch, the line pitch, character-to-character gap, and the line-to-line gap. Also, some of them may be combined.

It should be noted that the similarity between character areas as above described may be obtained using the difference in font between the character images in the character area, instead of the example of obtaining the similarity using the similarity regarding the politeness of text expression.

For example, the similarity between character areas may be obtained, according to the expression (7), by calculating the percentages of the number of Mincho type characters relative to the total number of characters from the character images in the primary character area and in the comparison character area, respectively.

Then, the similarity S is added to the continuity C.

If this continuity C obtained is greater than threshold $\alpha$, it is determined that the primary character area and the comparison character area are continuous.

More specifically, supposing that the percentage of Mincho type in the primary character area is 0.9, and the percentage of Mincho type in the comparison character area is 0.91, the similarity S is $$S=1.0-(0.91-0.9)=0.99$$

Then, the continuity C is equal to 0.99 by adding the similarity S to the continuity C.

If this continuity C is greater than threshold $\alpha$, it is determined that the primary character area and the comparison character area are continuous. Herein, threshold $\alpha$ is 0.9.

Instead of the example as above of obtaining the similarity between character areas using the percentage of the number of Mincho type characters relative to the total number of characters, it is possible to suppose that the similarity is 0, that is, the continuity C is 0.0, thereby determining that the primary character area and the comparison character area are not continuous, as the font used in the primary character area is Gothic BBB type and the font used in the comparison character area is standard width Gothic type, for example.

Instead of the example as above of obtaining the similarity between character areas using the percentage of the number of Mincho type characters relative to the total number of characters, it will be appreciated that Gothic type and textbook type, as well as oblique type, small Mincho type, and bold Mincho type may be utilized, in place of Mincho type.

The similarity between character areas as above described may be obtained by using the difference in inclination of character or line between character images in the character area, instead of the example of obtaining the similarity using the similarity regarding the politeness of text expression. For example, the similarity between character areas may be obtained, according to the expression (8), by calculating the inclination angles from the character images in the primary character area and in the comparison character area.

Then, the similarity S obtained is added to the continuity C.

If this continuity C obtained is greater than threshold α, it is determined that the primary character area and the comparison character area are continuous.

More specifically, supposing that the inclination angle for the primary character area is 0.1° and the inclination angle for the comparison character area is 1.0°, the similarity S is $$S=1.0-(1.0-0.1)\div 90=0.99$$

Then, the continuity C is equal to 0.99 by adding the similarity S to the continuity C. If this continuity C is greater than threshold α, it is determined that the primary character area and the comparison character area are continuous. Herein, threshold α is 0.9 and constant β is 90.

It should be noted that the similarity between character areas as above described may be obtained using the difference in set direction between character images in the character areas, instead of the example of obtaining the similarity using the similarity regarding the politeness of text expression.

For example, the similarity between character areas may be obtained, according to the expression (7), by calculating the percentages of vertical writing characters relative to the total number of characters from the character images in the primary character area and in the composition character area, respectively.

Then, the similarity S obtained is added to the continuity C.

If this continuity C obtained is greater than threshold α, it is determined that the primary character area and the comparison character area are continuous.

More specifically, supposing that the percentage of vertical writing in the primary character area is 0.9 and the percentage of vertical writing in the comparison character area is 0.91, the similarity S is $$S=1.0-(0.91-0.9)=0.99$$

Then, the continuity C is equal to 0.99 by adding the similarity S to the continuity C. If this continuity C is Greater than threshold α, it is determined that the primary character area and the comparison character area are continuous. Herein, threshold α is 0.9.

It shoud be noted that instead of the example as above of obtaining the similarity between character areas using the percentage of the number of vertical writing characters relative to the total number of characters, it is possible to suppose that the similarity is equal to 0, that is, the continuity C is equal to 0, since the set direction of primary character area is vertical writing, and the set direction of comparison character area is lateral writing, and thereby to determine that the primary character area and the comparison character area are not continuous.

Also, instead of the example of obtaining the similarity between character areas using the percentage of the number of vertical writing characters relative to the total number of characters, as above described, the percentage of the number of vertical writing lines relative to the total number of lines may be used.

Figure 30:
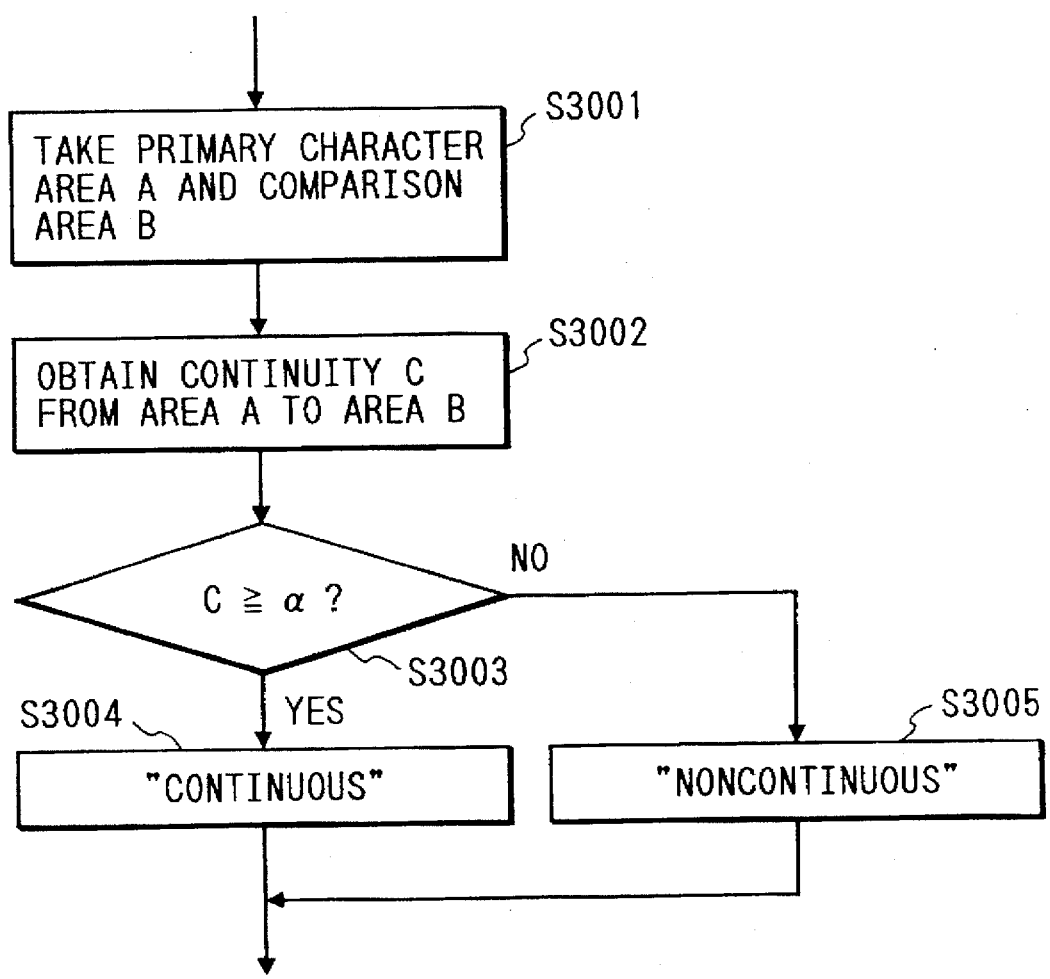
FIG. 30 is a flowchart of a process for determining the continuity of character areas.
Figure 46:
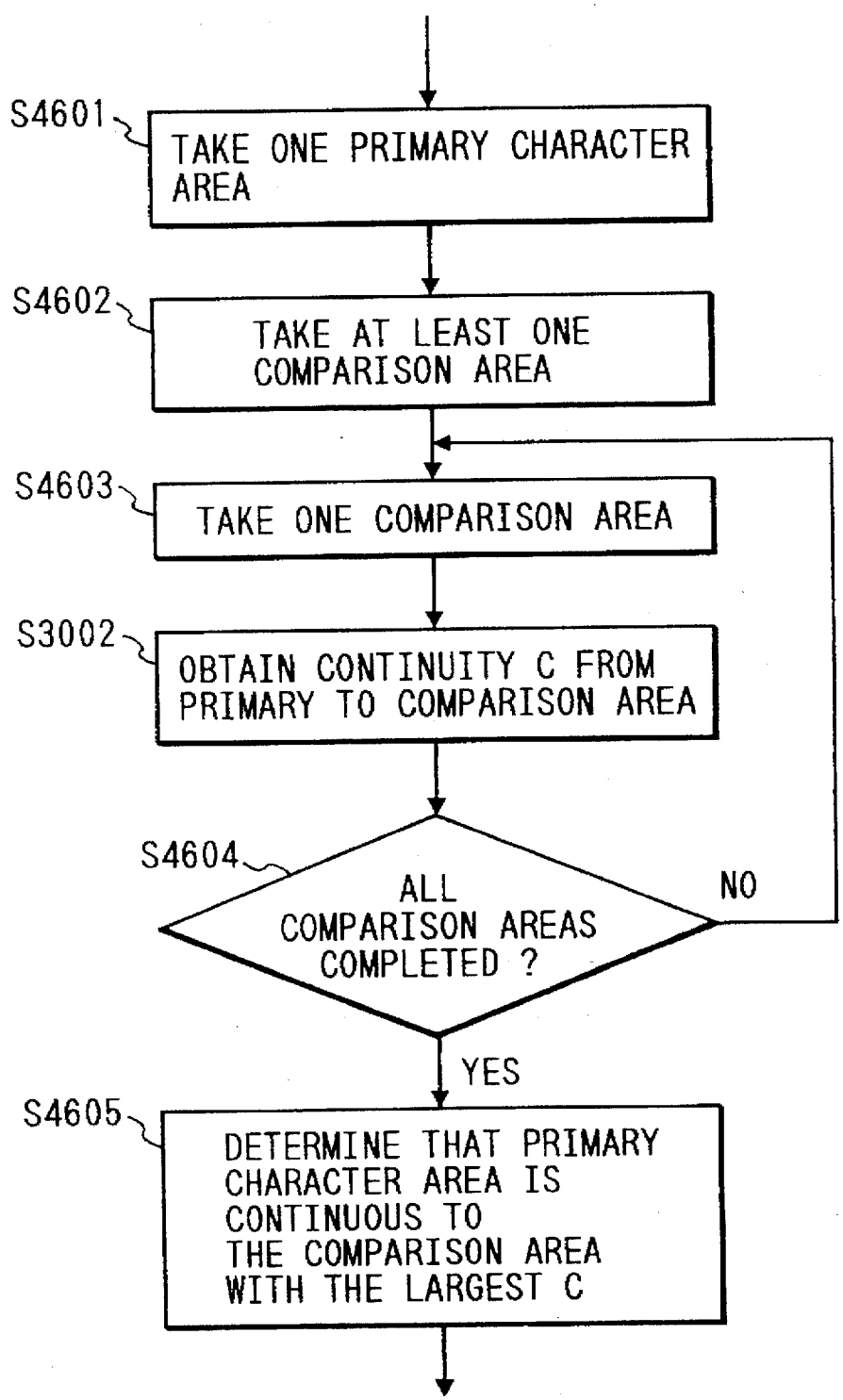
FIG. 46 is a flowchart of a process for determining the continuous area by comparison with plural areas.

In the flowchart of FIG. 30, the continuity was determined for two character areas of interest, but a process for determining the continuity where there are three or more ares of interest will be shown in a flowchart of FIG. 46 and described below.

The step S3002 is the same as in FIG. 30, and the way of determining the continuity C may be any method as previously described.

First, at step S4601, the primary character area that is continuous or desired to be investigated is taken out.

In the example of FIG. 34, the primary character areas is supposed to be character area 21.

Then, at step S4602, one or more comparison character areas that are continuous to the primary character area or to be compared are taken out.

In the example of FIG. 34, character areas 22 and 23 are made the comparison character area.

At step S4603, one comparison character area is taken out.

In the example of FIG. 34, character area 22 is first taken out as the comparison character area.

At step S3002, the continuity C from the primary character area to the comparison character area is obtained.

In the example of FIG. 34, the continuity C is equal to 1.0 for the character area 22.

Then, at step S4604, a check is performed to see whether or not all comparison character areas are completed to obtain the continuity. If all are completed, the program proceeds to step S4605. If any comparison character area remains, the program returns to step S4603 to continue the process of obtaining the continuity by taking out one area for which the continuity is not obtained among the areas taken out at step S4602.

In the example of FIG. 34, the program returns to step S4603 to continue the process, since the character area 23 remains. If the continuity is obtained, like the character area 22, the continuity C is equal to 0.0, as previously described. Thus, all the comparison character areas have been completed to obtain the continuity, and the program proceeds to step S4605.

At step S4605, it is determined that the primary character area is continuous to the comparison character area with the largest continuity C.

In the example of FIG. 34, since the continuity c to the comparison character area 22 is 1.0, and the continuity C to the comparison character area 23 is 0.0, it is determined that the character area continuous to the primary character area 21 is character area 22.

What is claimed is:

1. An image processing method, including the steps of:
   inputting an image;
   extracting text areas from the input image;
   dividing the text areas into groups; and
   determining the ordering of the text areas within the groups.

2. An image processing method according to claim 1, further including the step of taking into consideration the positional relation of the text areas with a separator image to divide the text areas into the groups.

3. An image processing method according to claim 1, further including the step of taking into consideration the positional relation of the text areas with a figure image to divide the text areas into the groups.

4. An image processing method according to claim 1, further including the step of classifying the extracted text areas into layers.

5. An image processing method according to claim 1, further including the step of determining the text areas that are connected from the similarity of the extracted text areas.

6. An image processing method according to claim 1, further including the steps of discriminating connectivity information contained in the extracted text areas, and determining the text areas that are connected in accordance with the discriminated connectivity information.

7. An image processing method according to claim 1, wherein said ordering step determines the order according to the order of reading.

8. An image processing apparatus comprising:

image input means for inputting an image;

text area extraction means for extracting text areas from the input image;

grouping means for grouping the text areas; and order determining means for determining the ordering of text areas within the groups.

9. An image processing apparatus according to claim 8, wherein said grouping means groups the text areas in consideration of the positional relation of the text areas with a separator image.

10. An image processing apparatus according to claim 8, wherein said grouping means groups the text areas in consideration of the positional relation of the text areas with a figure image.

11. An image processing apparatus according to claim 8, further comprising layer classifying means for classifying the extracted text areas into layers.

12. An image processing apparatus according to claim 8, further comprising connectivity determining means for determining the text areas that are connected from the similarity of the extracted text areas.

13. An image processing apparatus according to claim 8, further comprising connectivity information discriminating means for discriminating connectivity information contained in the extracted text areas, and connectivity determining means for determining the text areas that are connected in accordance with the discriminated connectivity information.

14. An image processing apparatus according to claim 8, wherein said order determining means determines the order of reading.

* * * * *

UNITED STATES PATENT AND TRADEMARK OFFICE
CERTIFICATE OF CORRECTION

PATENT NO. : 5,689,342
DATED : November 18, 1997
INVENTOR(S) : TADANORI NAKATSUKA It is certified that error appears in the above-identified patent and that said Letters Patent is hereby corrected as shown below:

DRAWING SHEET 6
    Fig. 7, S507, "HE" should read --THE--.

DRAWING SHEET 20
    Fig. 21A, S1708, "ORER" should read --ORDER--.

DRAWING SHEET 21
    Fig. 21B, S1709, "ORER" should read --ORDER--.

DRAWING SHEET 23
    Fig. 24, S507, "HE" should read --THE--.

COLUMN 2
    Line 51, "arrow" should read --the arrow--.
    Line 59, "a process" should read --the process--.

UNITED STATES PATENT AND TRADEMARK OFFICE
CERTIFICATE OF CORRECTION

PATENT NO. : 5,689,342
DATED : November 18, 1997
INVENTOR(S) : TADANORI NAKATSUKA It is certified that error appears in the above-indentified patent and that said Letters Patent is hereby corrected as shown below:

COLUMN 4

Line 66, "entire" should read --the entire--.

COLUMN 5

Line 1, "entire" should read --the entire--.
    Line 2, "separator" should read --the separator--, and "figure" should read --the figure--.
    Line 18, "are" (first occurrence) should be deleted, and "all" (second occurrence) should read --all are--.

COLUMN 6

Line 4, "Just" should read --just--.
    Line 21, "into" should read --into an--.
    Line 57, "into" should read --into an--.

UNITED STATES PATENT AND TRADEMARK OFFICE
CERTIFICATE OF CORRECTION

PATENT NO. : 5,689,342  Page 3 of 8
DATED : November 18, 1997
INVENTOR(S) : TADANORI NAKATSUKA It is certified that error appears in the above-indentified patent and that said Letters Patent is hereby corrected as shown below:

COLUMN 7

Line 1, "examined" should read --examined to see--.

Line 44, "all" should read --all are--.

Line 61, "made" should read --made a--.

COLUMN 8

Line 28, "article" should read --the article--.

Line 29, "other" should read --any other--.

Line 31, "article," should read --the article,--.

Line 32, "belonging" should read --to belong--.

Line 46, "other" should read --any other--, "way" should read --manner--, and "of" should read --of the--.

COLUMN 9

Line 38, "of" should be deleted.

UNITED STATES PATENT AND TRADEMARK OFFICE
CERTIFICATE OF CORRECTION

PATENT NO. : 5,689,342
DATED : November 18, 1997
INVENTOR(S) : TADANORI NAKATSUKA It is certified that error appears in the above-indentified patent and that said Letters Patent is hereby corrected as shown below:

COLUMN 11
  Line 4, "If all" should read --If all are--.

COLUMN 12
  Line 1, "If" should not be indented.
  Line 52, "S705" should read --S1705--.

COLUMN 13
  Line 4, "columns" should read --column--.

COLUMN 16
  Line 49, "as" should read --is--.

COLUMN 17
  Line 6, "words)" should read --word)--.

COLUMN 19
  Line 31, "length," should read --length, the--, and "or" should read --or the--.

UNITED STATES PATENT AND TRADEMARK OFFICE
CERTIFICATE OF CORRECTION

PATENT NO. : 5,689,342
DATED : November 18, 1997
INVENTOR(S) : TADANORI NAKATSUKA It is certified that error appears in the above-identified patent and that said Letters Patent is hereby corrected as shown below:

COLUMN 21
    Line 2, "separator" should read --the separator--.
    Line 11, "than" should read --than a--.
    Line 33, "in" should read --in the--.

COLUMN 22
    Line 37, "area" (second occurrence) should read --an area--.

COLUMN 23
    Line 10, "an" should read --is an--.
    Line 14, "is" should read --is a--.
    Line 40, "of" should read --of the--.
    Line 53, "it is" should read --it is a--.

COLUMN 24
    Line 21, "an other" should read --another--.
    Line 25, "of" should read --of the--.

UNITED STATES PATENT AND TRADEMARK OFFICE
CERTIFICATE OF CORRECTION

PATENT NO. : 5,689,342  Page 6 of 8
DATED : November 18, 1997
INVENTOR(S) : TADANORI NAKATSUKA It is certified that error appears in the above-identified patent and that said Letters Patent is hereby corrected as shown below:

Line 39, "it is" should read --it is a--.
Line 43, "nor" should read --not a--.
Line 46, "it is," should read --it does,--.
Line 61, "of" should read --of the--.

COLUMN 25
Line 15, "of" should read --) of--.
Line 43, "primary" should read --the primary--.
Line 53, "subject" should read --a subject--.
Line 54, "equal" should read --is equal--.
Line 60, "other" should read --another--.
Line 67, "original" should read --an original--.

COLUMN 26
Line 4, "after "tence", insert [pictogram].
Line 35, "subject" should read --a subject--, and "predicate," should read --a predicate,--.
Line 58, "of" should be deleted.
Line 66, "of" should read --of the--.

UNITED STATES PATENT AND TRADEMARK OFFICE
CERTIFICATE OF CORRECTION

PATENT NO. : 5,689,342
DATED : November 18, 1997
INVENTOR(S) : TADANORI NAKATSUKA It is certified that error appears in the above-identified patent and that said Letters Patent is hereby corrected as shown below:

COLUMN 28
   Line 54, "⌈ " should be deleted.
   Line 55, align pictograms on same line.

COLUMN 29
   Line 3, "Herein," should begin a new paragraph.

COLUMN 30
   Line 19, "pitch," should read --pitch, the---.

COLUMN 31
   Line 47, "Greater" should read --greater--.
   Line 50, "shoud" should read --should--.

UNITED STATES PATENT AND TRADEMARK OFFICE
CERTIFICATE OF CORRECTION

PATENT NO. : 5,689,342
DATED : November 18, 1997
INVENTOR(S) : TADANORI NAKATSUKA It is certified that error appears in the above-identified patent and that said Letters Patent is hereby corrected as shown below:

CLAIM 32
    Line 1, "ares" should read --areas--.
    Line 8, "areas" should read --area--.

Signed and Sealed this

Second Day of June, 1998

Attest:

BRUCE LEHMAN

Attesting Officer    Commissioner of Patents and Trademarks